United States Patent
Baxter et al.

(10) Patent No.: US 7,908,871 B2
(45) Date of Patent: *Mar. 22, 2011

(54) SYSTEMS AND METHODS FOR DISPENSING PRODUCT

(75) Inventors: James R Baxter, Taunton, MA (US); Steven A. Lowe, Canterbury, NH (US); Paul R. Kateman, Wellesley, MA (US); Charles S. Brunner, N. Reading, MA (US); John M. DeCarlo, York, ME (US); Roderick H. Beaulieu, Cumberland, RI (US); Christopher T. Zirps, Sharon, MA (US); Jennie Kwo, Cambridge, MA (US)

(73) Assignee: MooBella, Inc., Taunton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/490,072

(22) Filed: Jun. 23, 2009

(65) Prior Publication Data

US 2010/0028501 A1 Feb. 4, 2010

Related U.S. Application Data

(60) Continuation of application No. 11/140,624, filed on May 27, 2005, now Pat. No. 7,726,136, which is a continuation-in-part of application No. 10/726,815, filed on Dec. 3, 2003, now Pat. No. 6,952,928, which is a division of application No. 10/160,674, filed on Jul. 31, 2002, now Pat. No. 6,698,228, said application No. 11/140,624 and a continuation-in-part of application No. 10/359,834, filed on Feb. 7, 2003, now Pat. No. 6,907,741.

(60) Provisional application No. 60/644,258, filed on Jan. 14, 2005.

(51) Int. Cl.
*F25C 1/00* (2006.01)
(52) U.S. Cl. ............. 62/66; 62/389; 99/460; 222/146.6; 426/524
(58) Field of Classification Search ................ 62/66–74, 62/389–390; 99/460, 348, 455, 468; 222/129, 222/146.6; 426/524
See application file for complete search history.

(56) References Cited

U.S. PATENT DOCUMENTS

| | | | |
|---|---|---|---|
| 2,524,673 A | 10/1950 | Martin | 53/168 |
| 3,876,110 A | 4/1975 | Logie | 222/80 |
| 4,604,875 A | 8/1986 | Keller | 62/354 |
| 4,687,120 A | 8/1987 | McMillin | 222/1 |
| 5,292,030 A | 3/1994 | Kateman et al. | 222/1 |
| 5,433,967 A | 7/1995 | Kateman et al. | 426/565 |
| 5,473,909 A | 12/1995 | Kateman et al. | 62/306 |
| 5,603,257 A | 2/1997 | Kateman et al. | 99/455 |

(Continued)

FOREIGN PATENT DOCUMENTS

JP 2-504423 12/1990
WO WO 2006/076733 A2 7/2006

OTHER PUBLICATIONS

International Search Report and Written Opinion for PCT/US06/01958, mailed Nov. 22, 2006.

*Primary Examiner* — William E Tapolcai
(74) *Attorney, Agent, or Firm* — Cesari and McKenna, LLP

(57) ABSTRACT

The present invention relates to systems and methods for producing and dispensing aerated and/or blended products, such as food products.

30 Claims, 49 Drawing Sheets

U.S. PATENT DOCUMENTS

| | | | |
|---|---|---|---|
| 5,727,713 A | 3/1998 | Kateman et al. | 222/145.6 |
| 5,758,571 A | 6/1998 | Kateman et al. | 99/455 |
| 6,325,250 B1 | 12/2001 | Feola | 222/190 |
| 6,604,374 B2 * | 8/2003 | Ito et al. | 62/238.3 |
| 6,698,228 B2 | 3/2004 | Kateman et al. | 62/346 |
| 6,907,741 B2 | 6/2005 | Kateman | 62/60 |
| 6,941,858 B2 | 9/2005 | Kateman | 99/455 |
| 6,952,928 B2 | 10/2005 | Kateman et al. | 62/71 |
| 7,032,780 B2 | 4/2006 | Crisp, II | 222/129.1 |
| 7,052,728 B2 | 5/2006 | Kateman et al. | 426/515 |
| 2004/0251270 A1 | 12/2004 | Davis et al. | 222/2 |
| 2006/0003065 A1 | 1/2006 | Kateman | 426/506 |

* cited by examiner

SYSTEMS AND METHODS FOR DISPENSING PRODUCT

RELATED APPLICATIONS

This application is a continuation-in-part of U.S. application Ser. No. 10/726,815, filed Dec. 3, 2003, which is a Division of U.S. application Ser. No. 10/160,674 (now U.S. Pat. No. 6,698,228), filed Jul. 31, 2002. This application is also a continuation-in-part of U.S. application Ser. No. 10/359,834, filed Feb. 7, 2003. This application also claims the benefit of U.S. Provisional Applications No. 60/336,252, filed Nov. 2, 2001 (the benefit of which was claimed in U.S. Ser. No. 10/359,834), and No. 60/644,258, filed Jan. 14, 2005. The entire teachings of each of these references is hereby incorporated by reference in its entirety.

FIELD OF THE INVENTION

This invention relates to systems and methods for producing and dispensing aerated and/or blended products, such as food products. While the invention may be used to produce a variety of products, it has particular application to the production and dispensing of frozen confections such as ice cream and frozen yogurt. Consequently, we will describe the invention in that context. It should be understood, however, that various aspects of the invention to be described also have application to the making and dispensing of various other food products.

BACKGROUND

Aerated frozen food products can be produced by mixing selected liquid ingredients with a prescribed volume of air and then freezing and dispensing the resultant mixture. The desirability of the finished product is often related directly to the manner in which, and to the degree to which, the air is metered and blended with the liquid ingredients of the mixture, referred to as overrun, and the manner in which the blended mix is frozen and then dispensed. Prior machines include many examples that dispense ice cream and other semi-frozen dairy products such as soft ice cream and frozen yogurt.

Conventionally, such machines are usually dedicated to dispensing one or two flavors of product and, in some cases, a combination of the two. For example, in an ice cream shop, there may be one machine with two separate freezing chambers for making and dispensing chocolate and vanilla ice cream, a second two-chamber machine for making and dispensing strawberry and banana ice cream, a third machine dedicated to making and dispensing coffee and frozen pudding flavors, and so on. The reason for employing multiple machines is that each chamber typically contains a volume of ice cream greater than is required for a single serving. In order to dispense a different flavor ice cream, that chamber must be emptied and cleaned before the new flavor can be made in that chamber and appear at the outlet of the dispenser. Additionally, the vat of pre-flavored mix from which the frozen product is made must also be clean enough to at least meet applicable health regulations. While high volume ice cream shops and confectionery stores may be able to accommodate several dispensing machines dispensing many different products and flavors, smaller sales outlets can usually only accommodate one or two such machines and are thus restricted in the number of flavors that they can offer to customers.

Further, because the product is typically formed in a quantity that is greater than that to be dispensed at any one serving, the excess product remains in the chamber after formation and until additional servings draw it down. The excess is thus subjected to further freezing, which promotes crystallization. Because of the relatively large quantity of the premixed flavors, and the continuous freezing of several quarts of the product, the freshness and palatability of the product may be adversely affected in outlets with relatively slow sales of the product.

Another disadvantage of many prior dispensers is that they have multiple interior surfaces and moving parts, as the cleaning and maintenance of those surfaces and parts at the end of each day or at intervals prescribed by local Health Department regulations is difficult and time-consuming. Each dispenser must be purged of any remaining product, and it's chamber walls, pumps and other internal parts cleaned thoroughly to prevent growth of bacteria that could otherwise contaminate the product being delivered by the dispenser. Not only is the cleaning operation expensive in terms of down time, it is also costly in terms of product waste. Furthermore, it can be an unpleasant task that is difficult to get employees to do properly.

While machines that dispense ice cream exist, until now no way has been found to provide a single machine capable of efficiently and economically making and dispensing different frozen food confections in a wide variety of flavors and in different formats, e.g., in a cup or cone.

SUMMARY

Described herein are systems and methods for producing and dispensing aerated and/or blended products, such as food products. One embodiment of an apparatus for producing a food product includes a frame to which is coupled a base-mix module, a flavor module, a flavor-selection assembly, a conduit configuration, and a food-preparation assembly.

The base-mix module supplies a base mix, while the flavor module provides flavoring. Both the base-mix module and the flavor module can include a plurality of holding bays, each bay being filled with a different base mix or flavor so as to allow selection from amongst the different base mixes and flavors. The base mixes and flavors can be contained in sealed packets that are loaded into the respective holding bays. A plurality of positive-displacement pumps can be coupled with the holding bays for the flavors so as to be able to receive the flavors as they are dispensed from the bays. The flavoring flows through a flavor-selection assembly and mixed with the base mix, which is aerated. Mix-ins, such as chips or nuts, can also be added from a mix-in module and mixed with the base mix.

After mixing and aeration, the flavored base mix is sprayed into a food-preparation assembly, where the mix is spread across a rotating freeze surface of a food-surface assembly. Refrigerant can be passed through the food-surface assembly to freeze the mix to form, e.g., ice cream.

The operation of the apparatus is governed by a main controller and a plurality of sub-controllers. Separate sub-controllers can be provided for the base-mix module, the flavor module, the flavor-selection assembly, and the food-preparation assembly, as well as for sub-components of these modules/assemblies.

BRIEF DESCRIPTION OF THE ILLUSTRATED EMBODIMENTS

Figure 1:
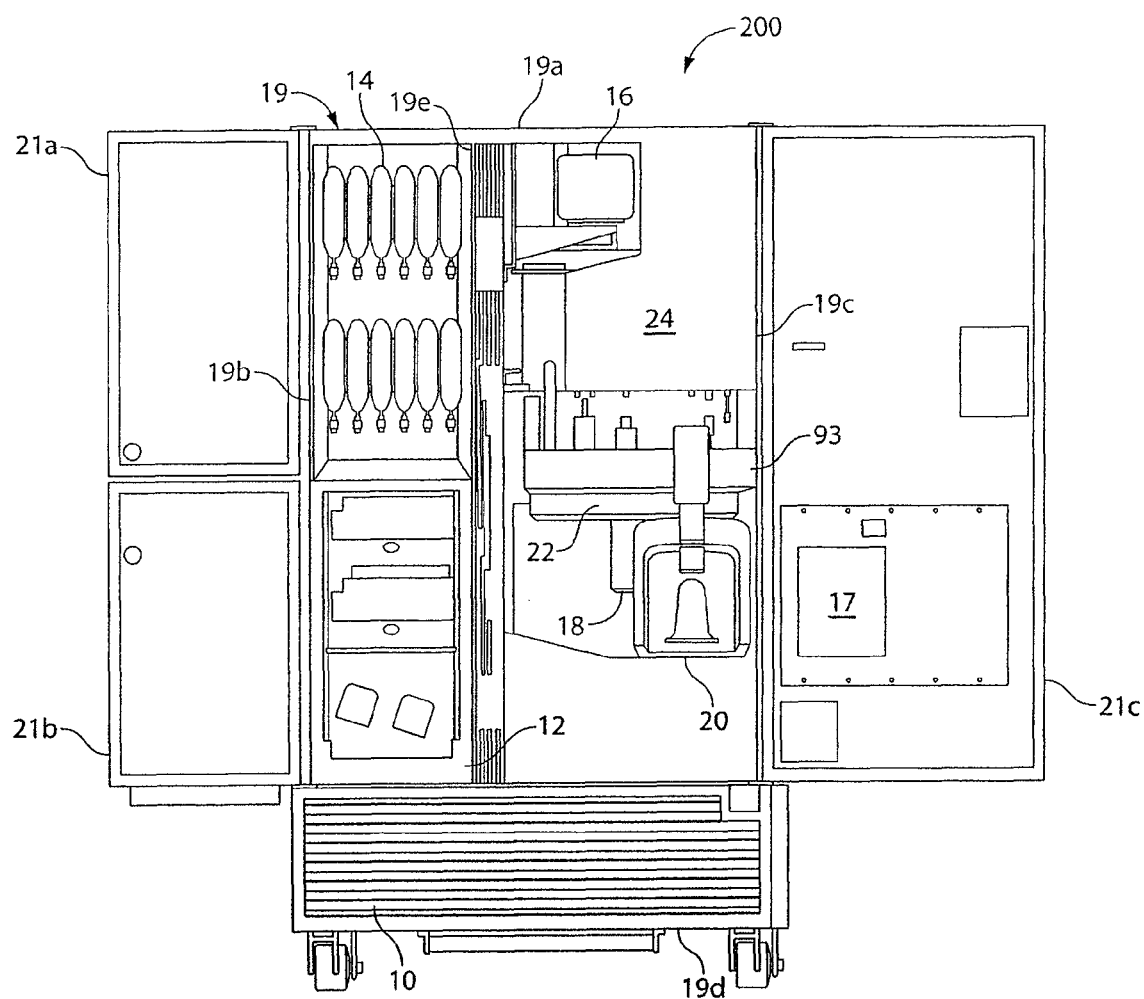
FIG. 1 is a front view of a food service machine according to one embodiment of the invention.
Figure 13:
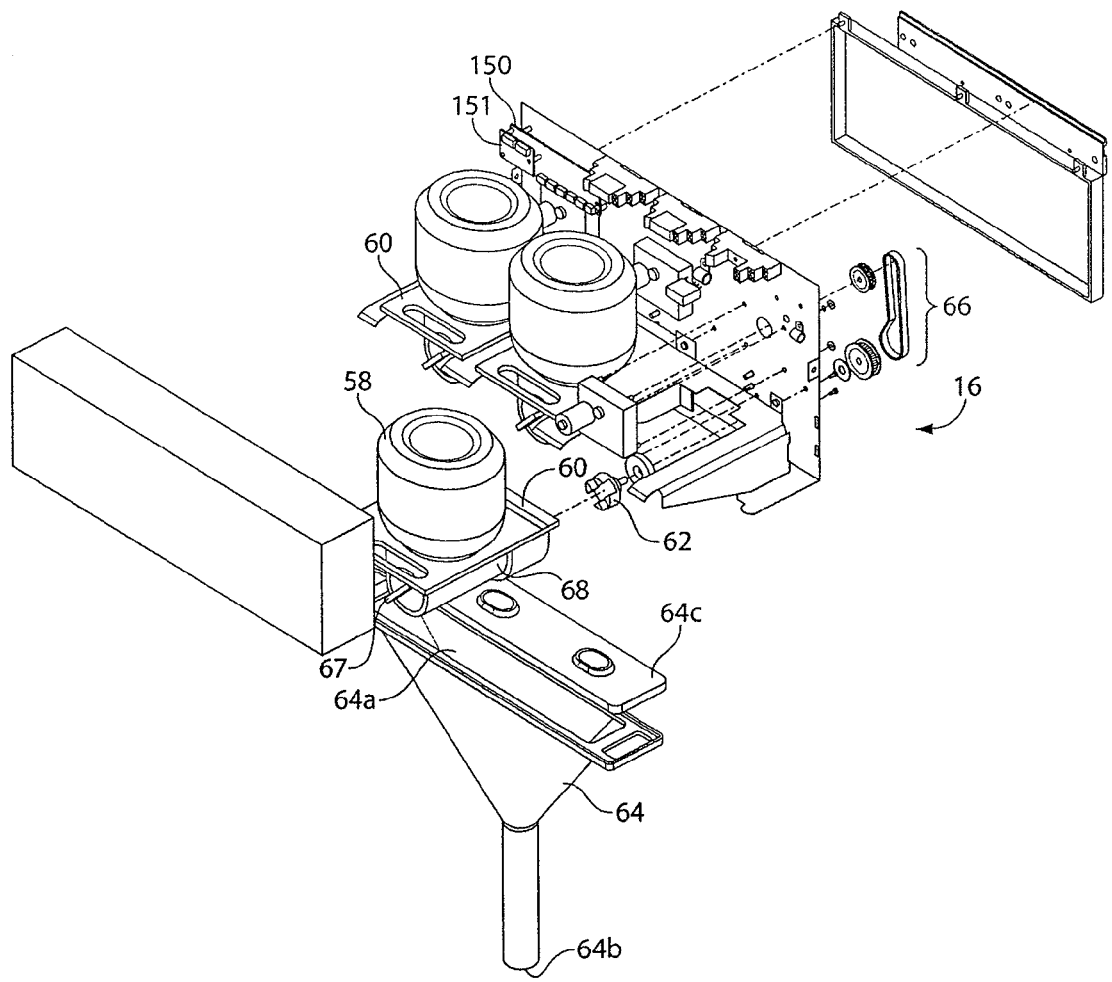
FIG. 13 is an exploded schematic perspective view of one embodiment of a mix-ins module for use in the food service machine of FIG. 1.
Figure 14:
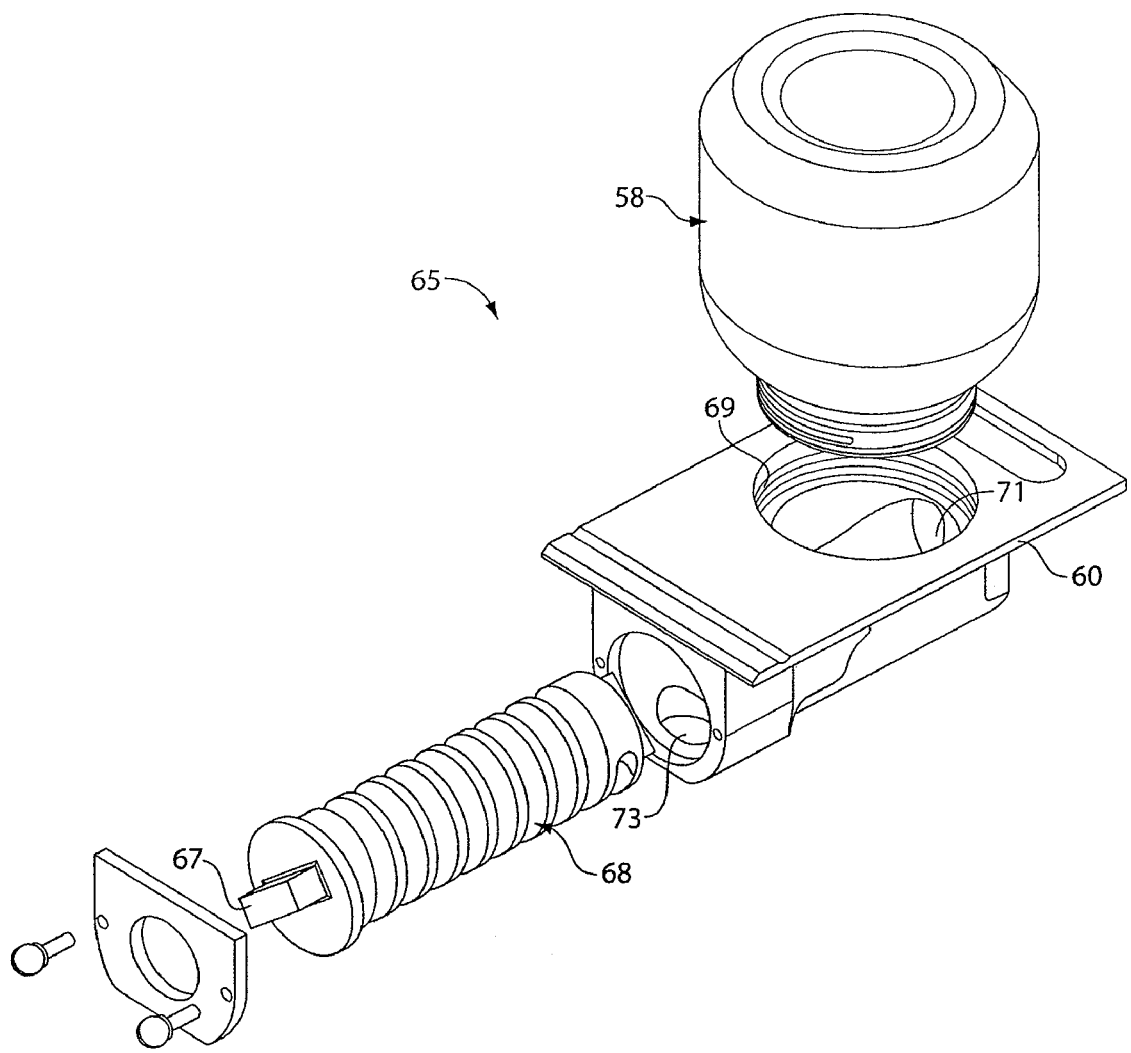
Figure 15:
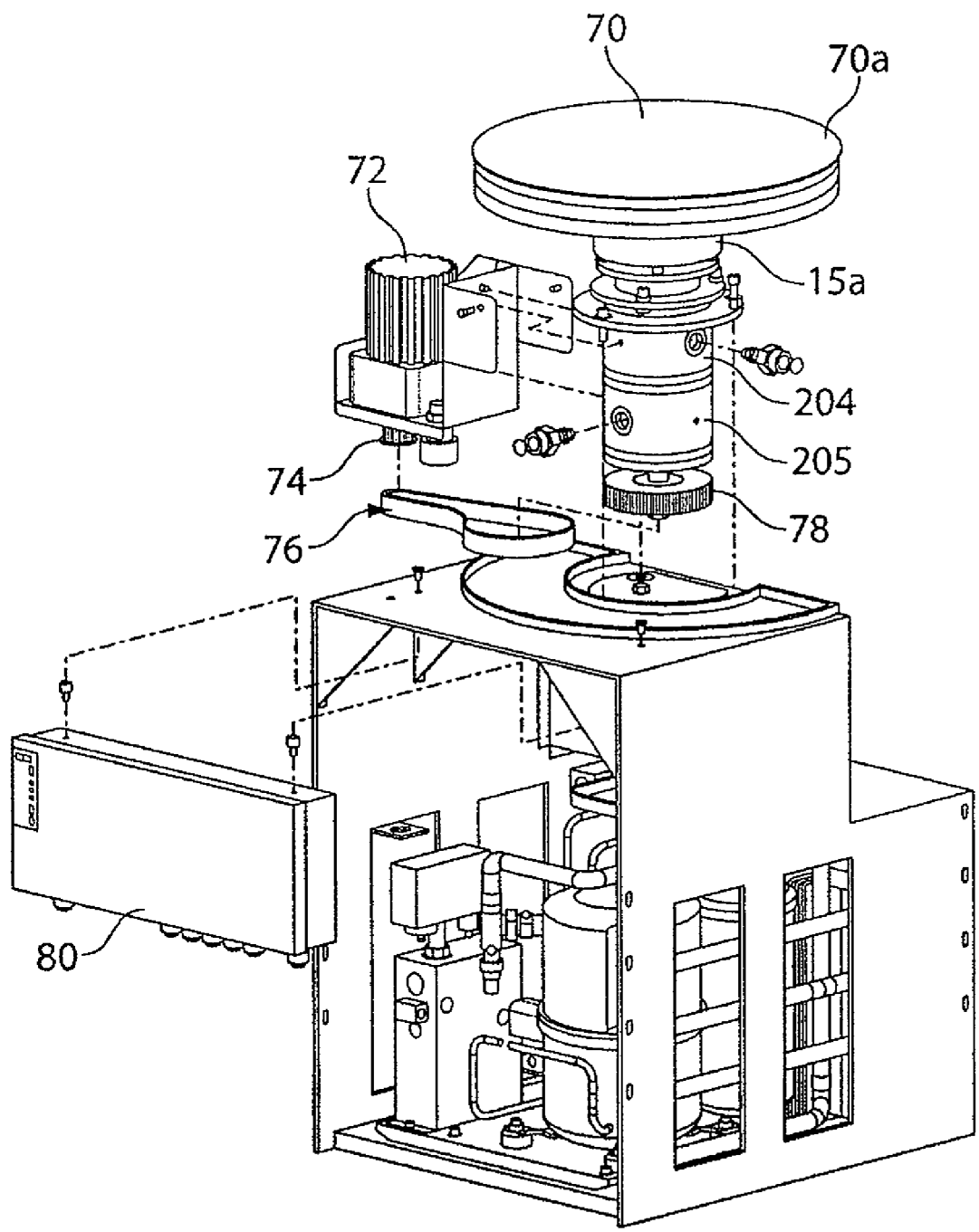
Figure 16:
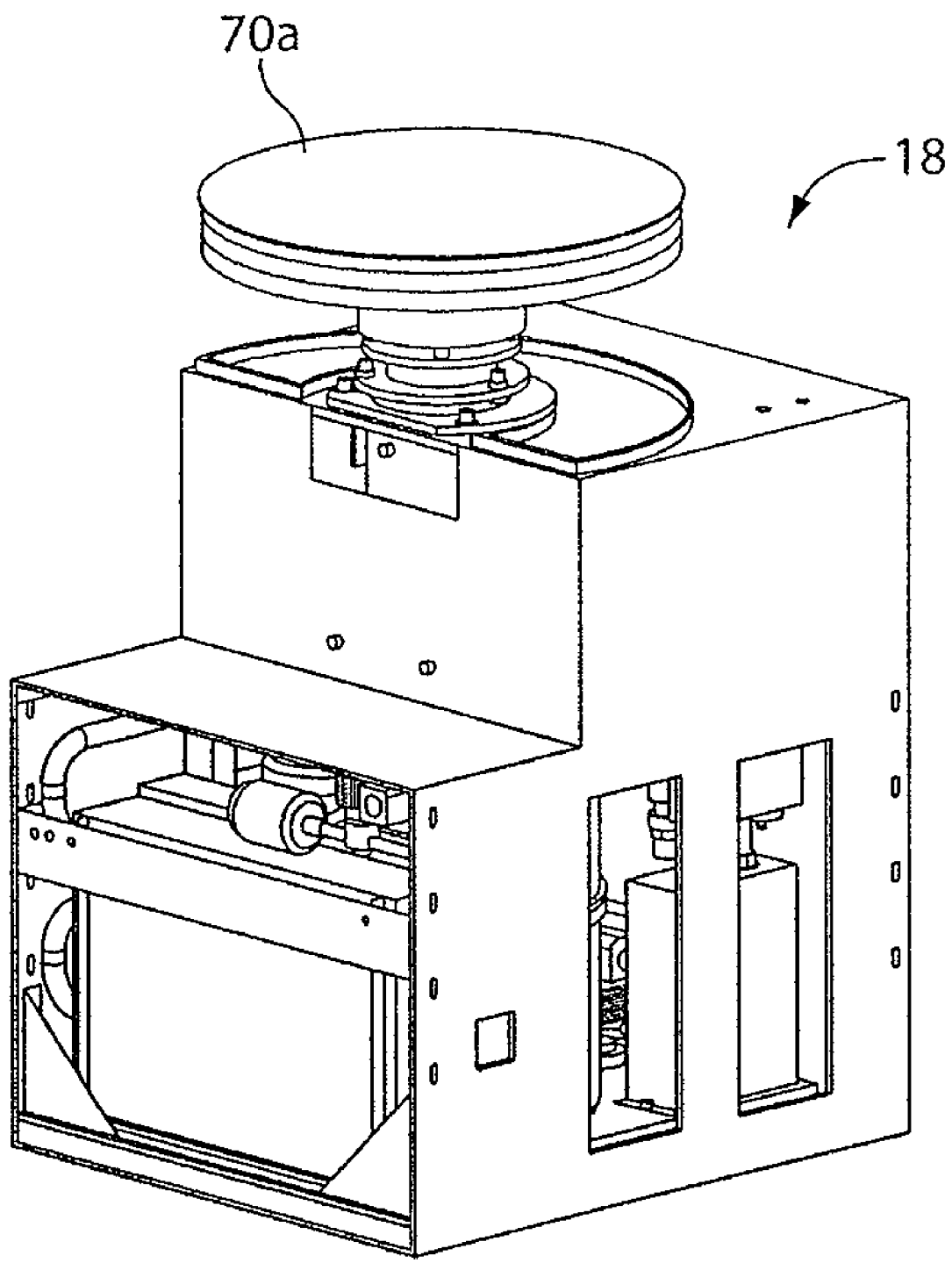
Figure 17:
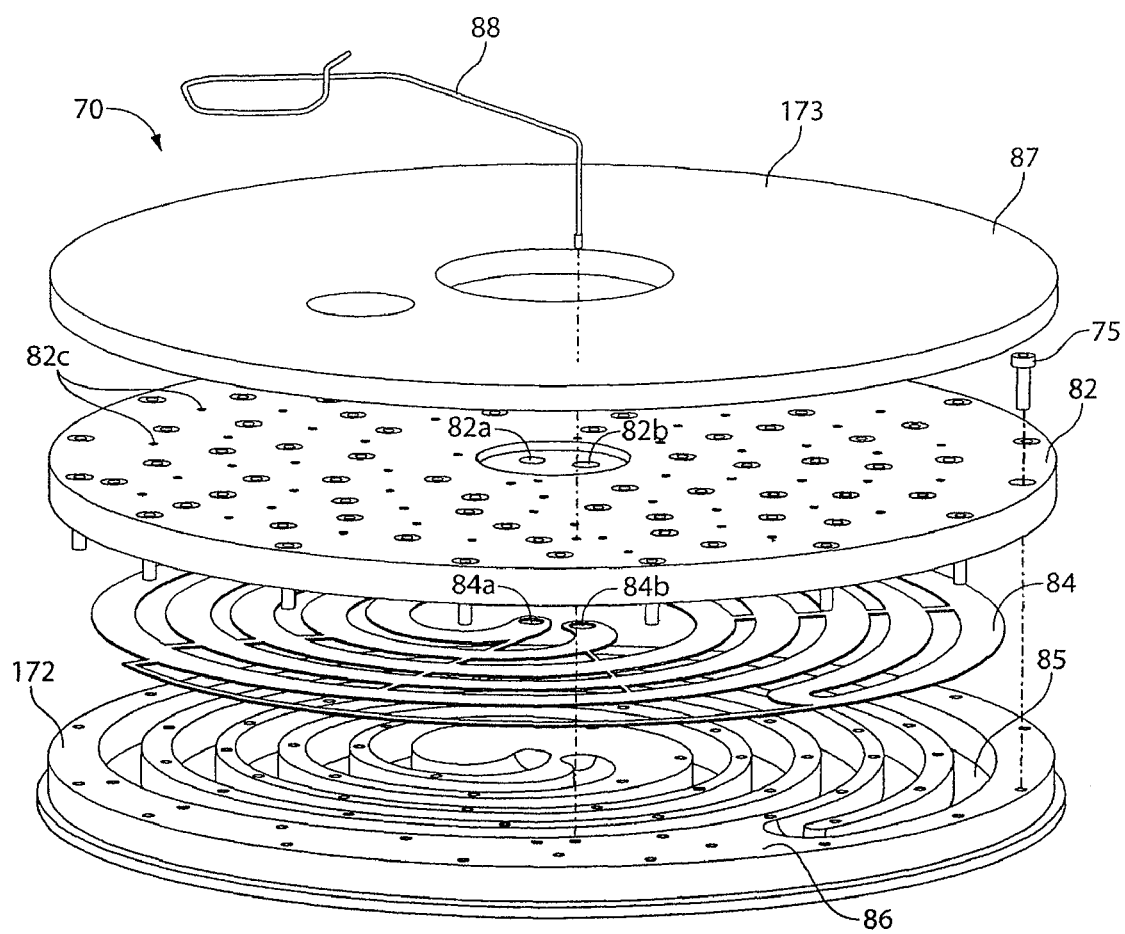
Figure 18:
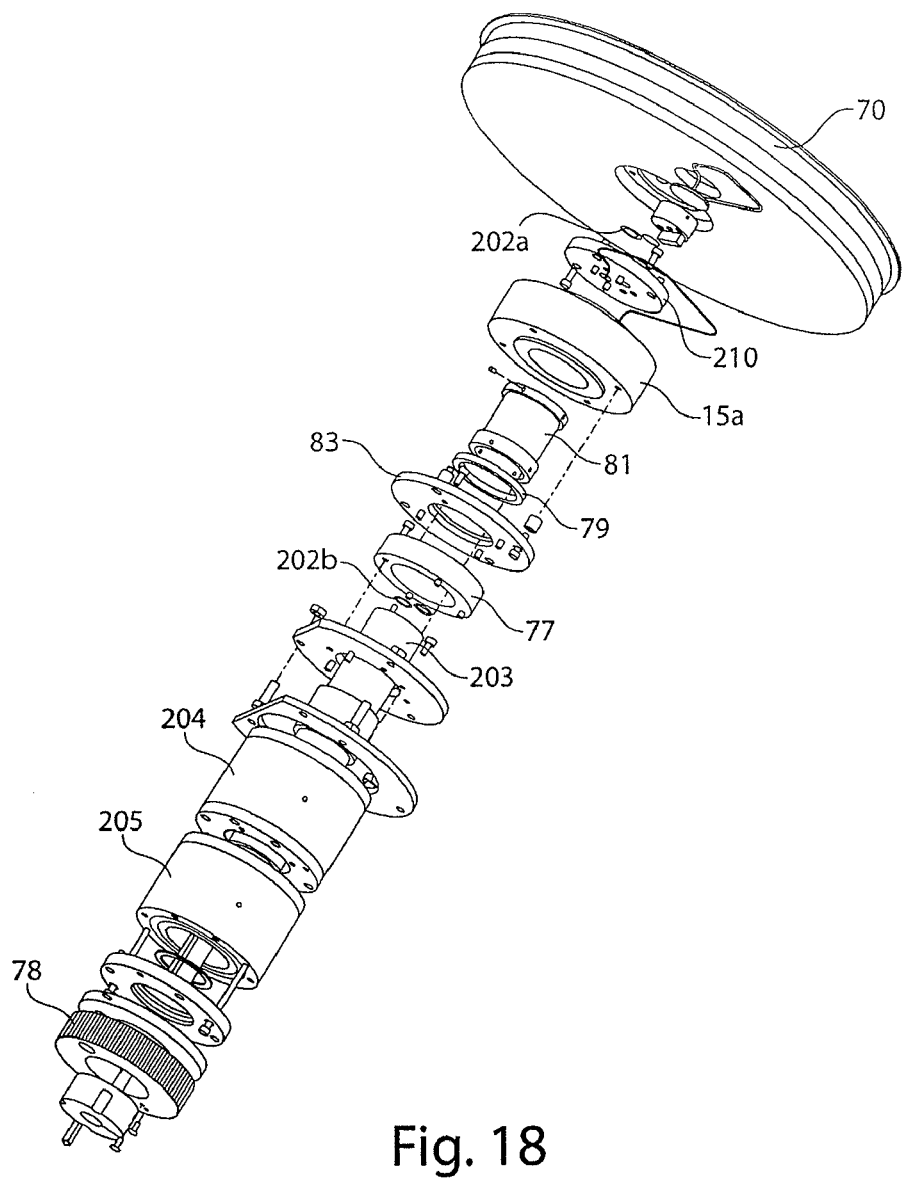
Figure 19:
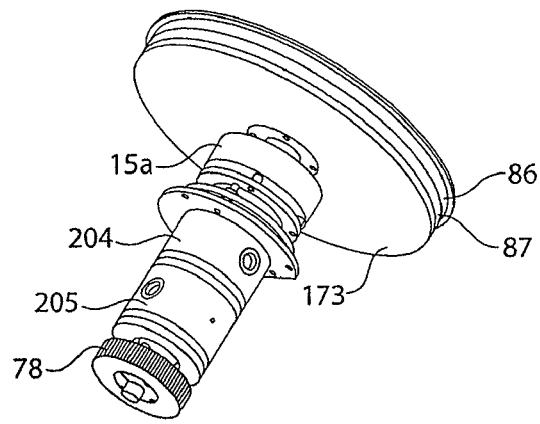
Figure 20:
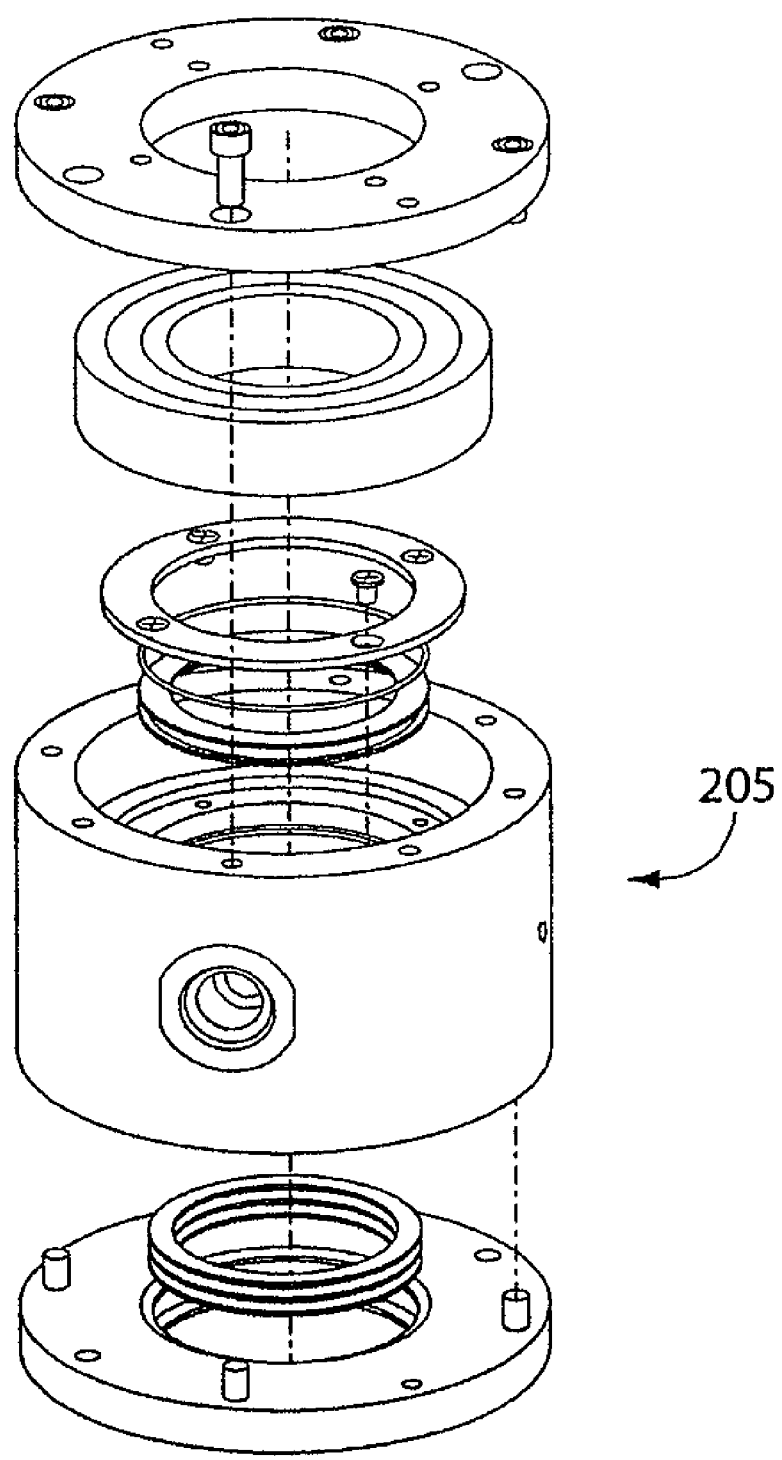
Figure 21:
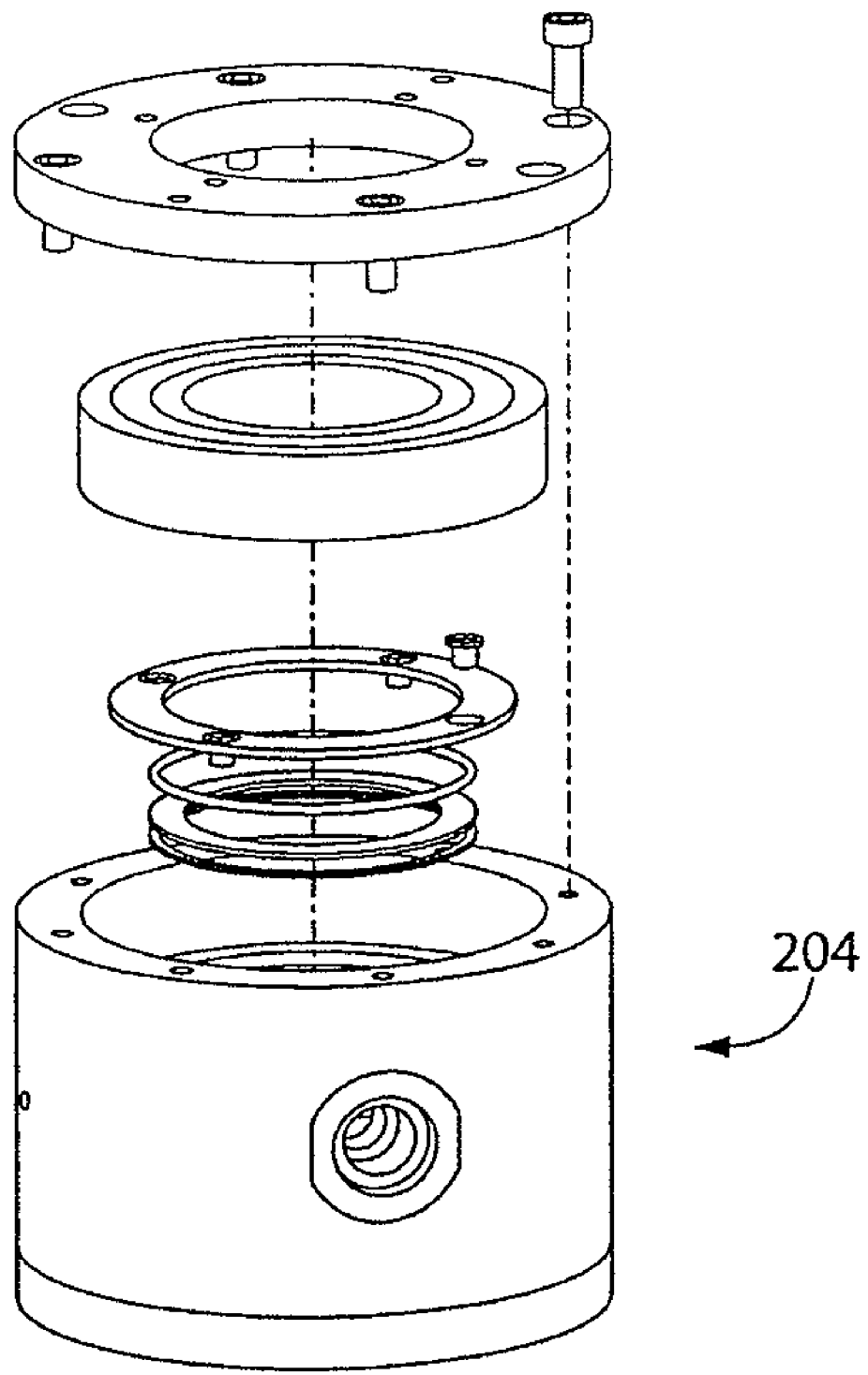
Figure 22:
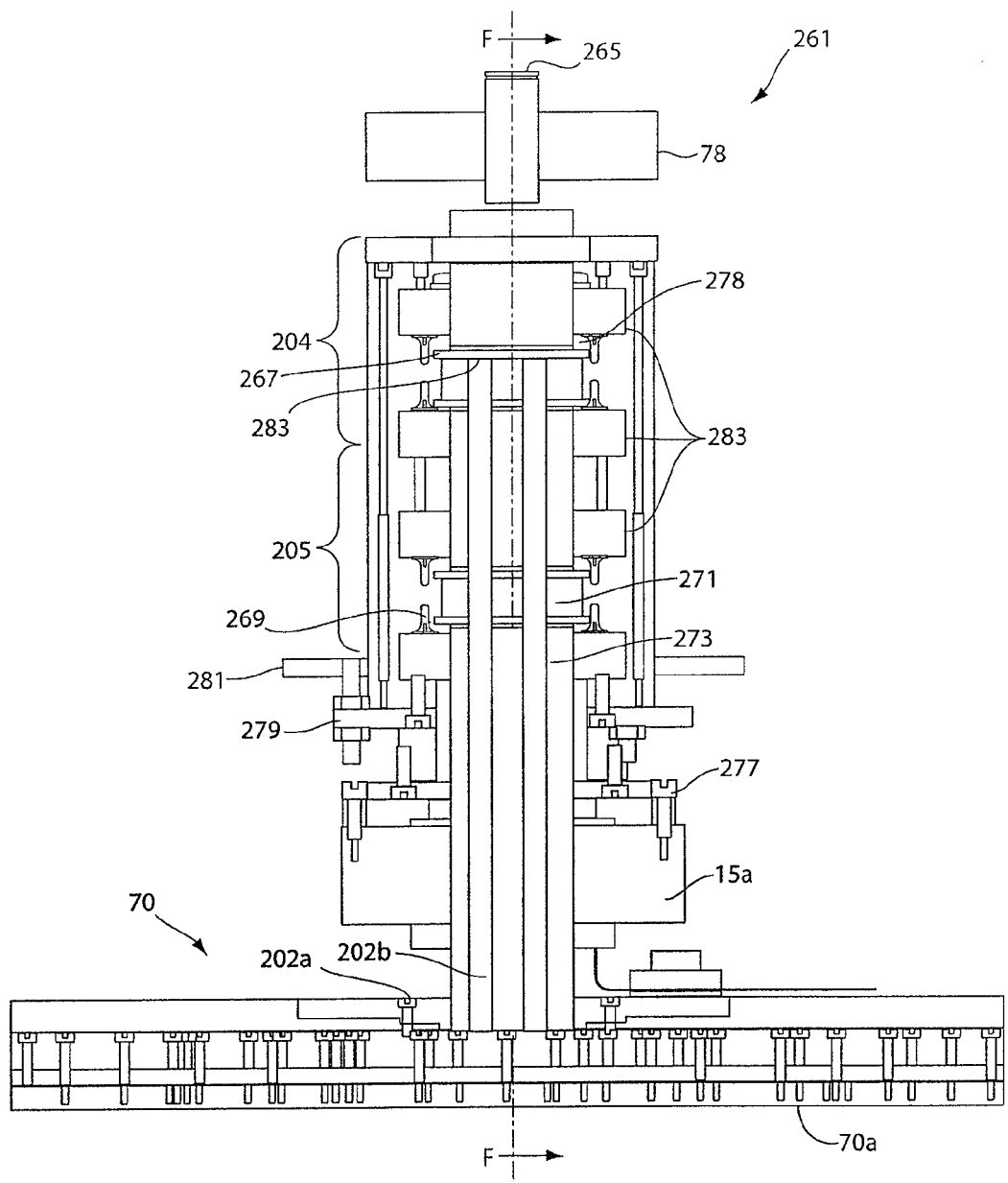
Figure 23:
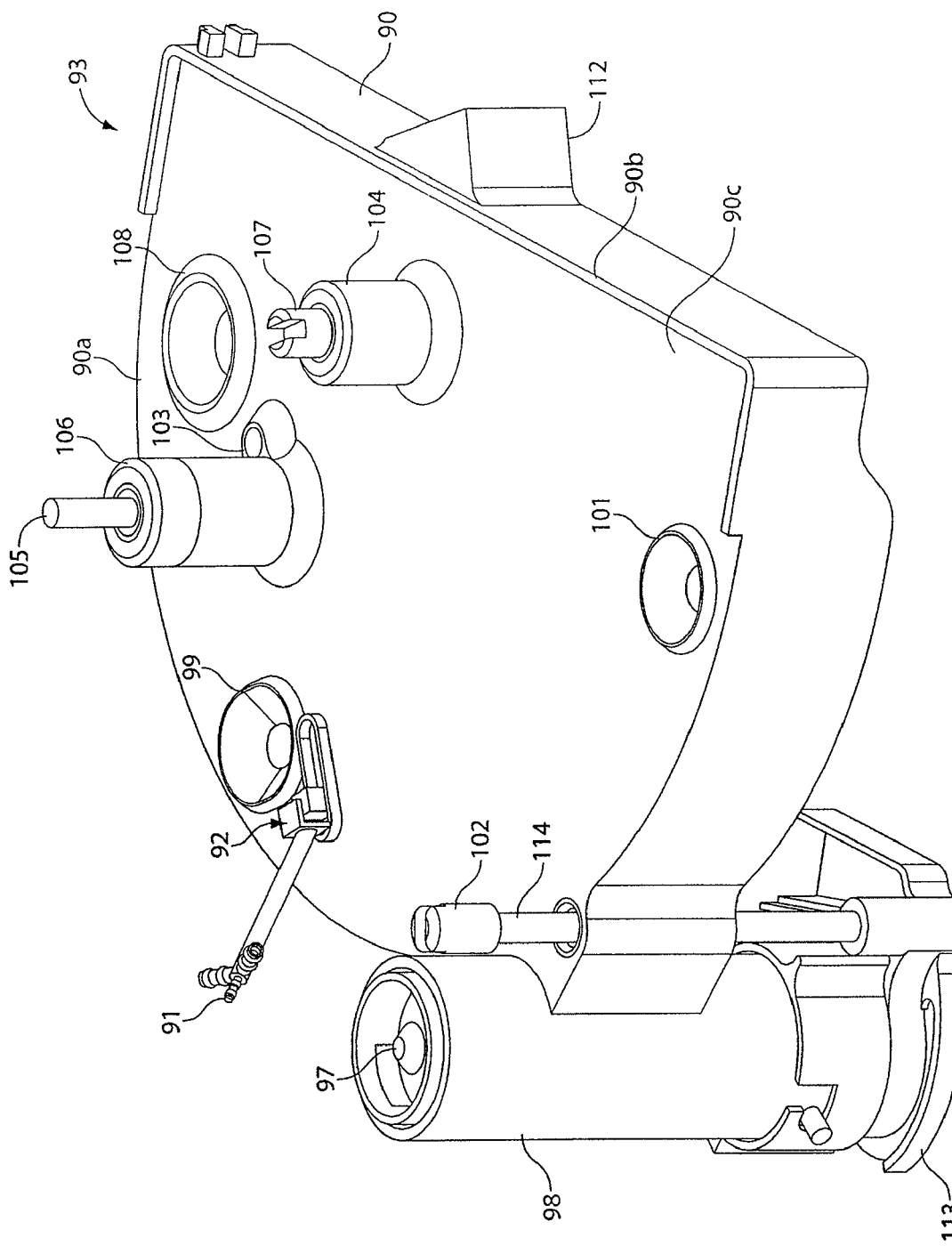
Figure 24:
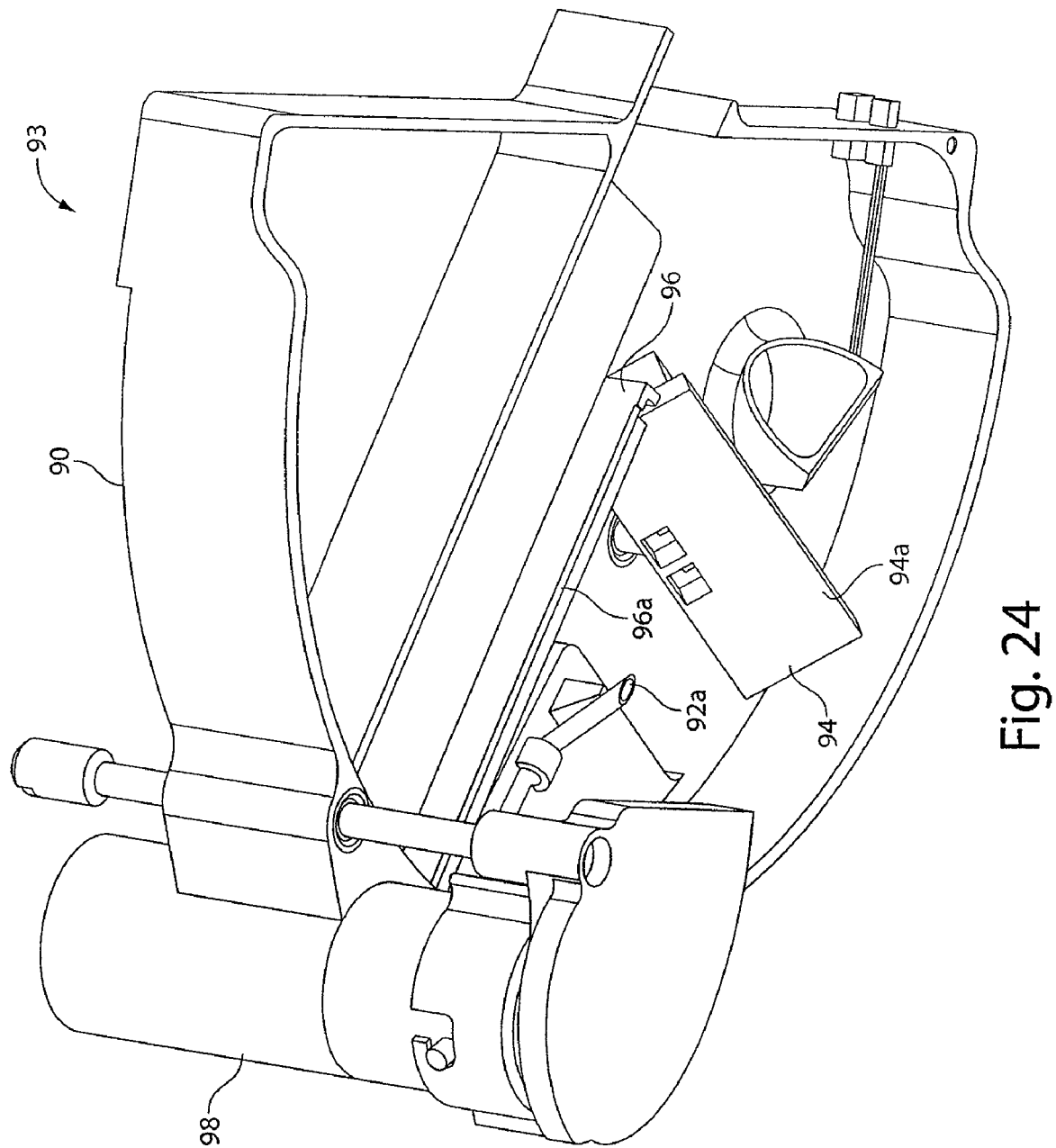
Figure 25:
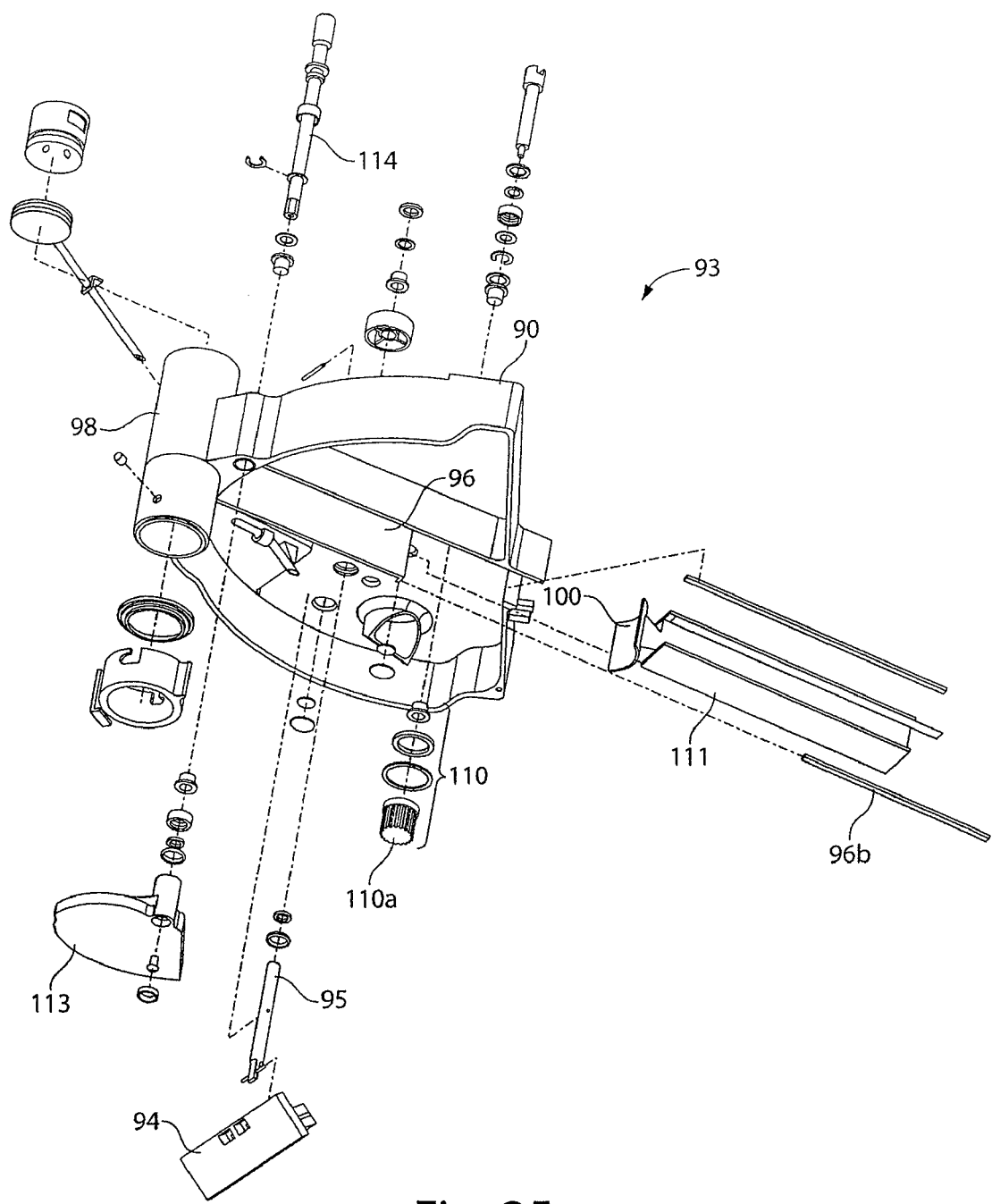
Figure 26:
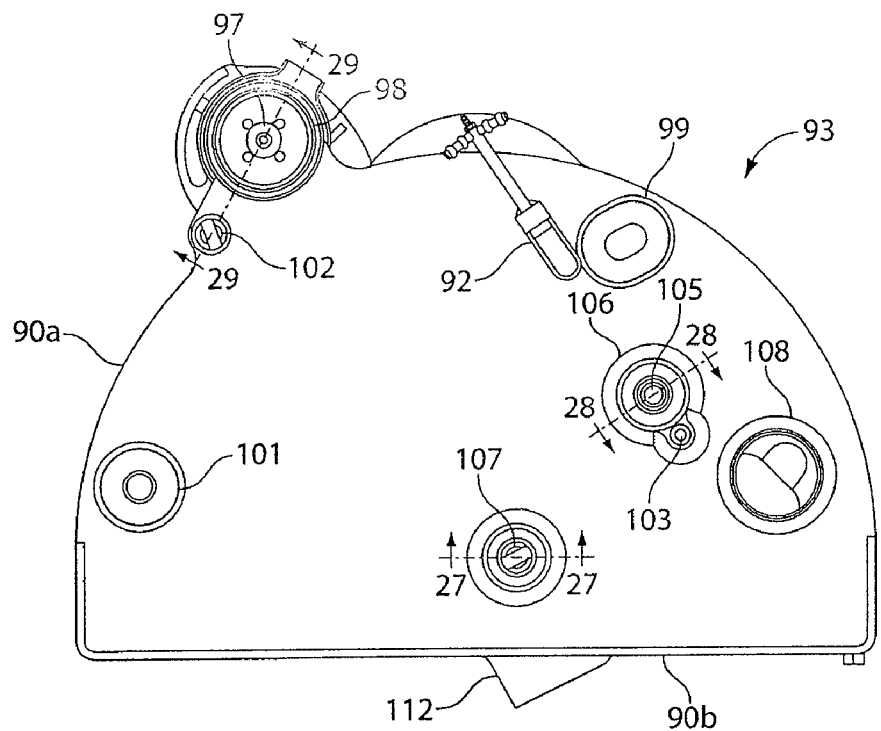
Figure 27:
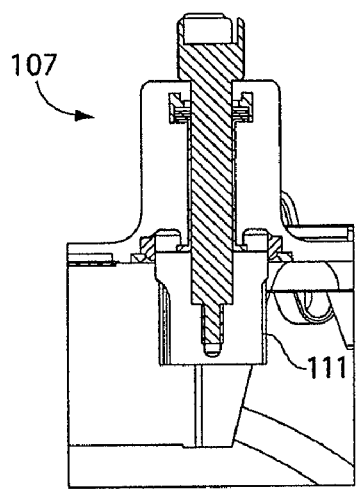
Figure 28:
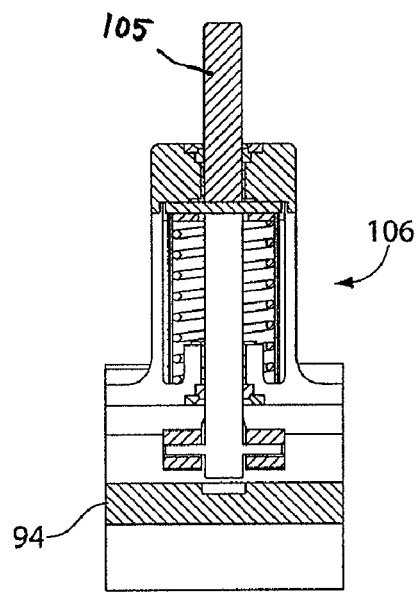
Figure 29:
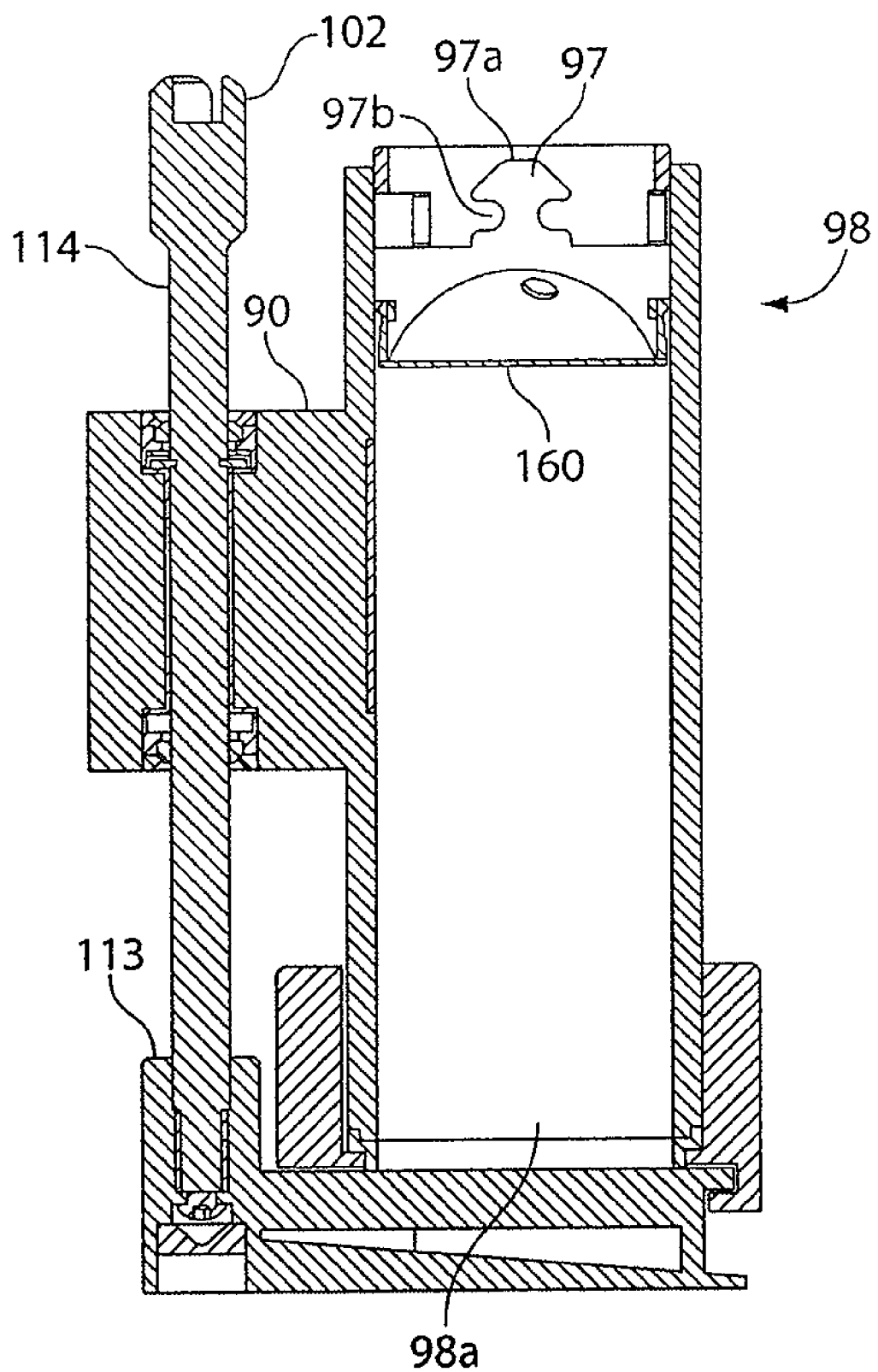
Figure 30:
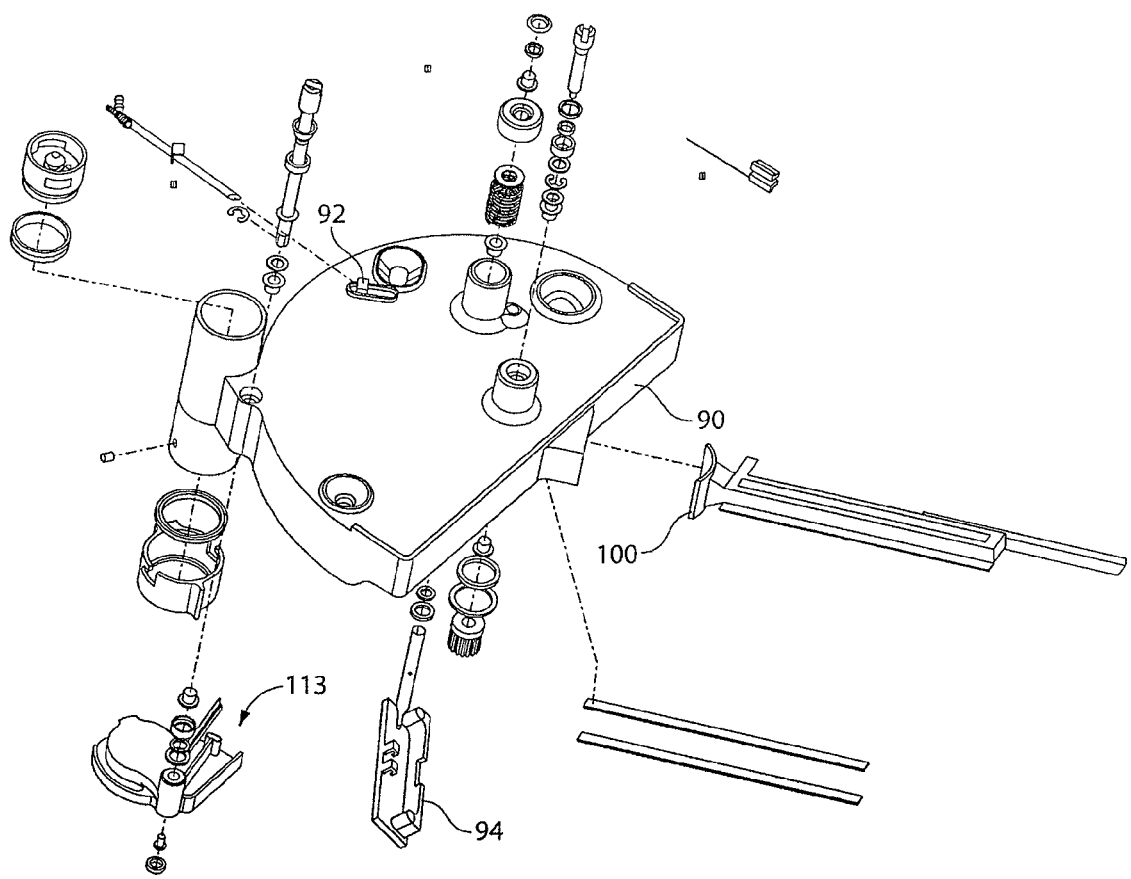
Figure 31:
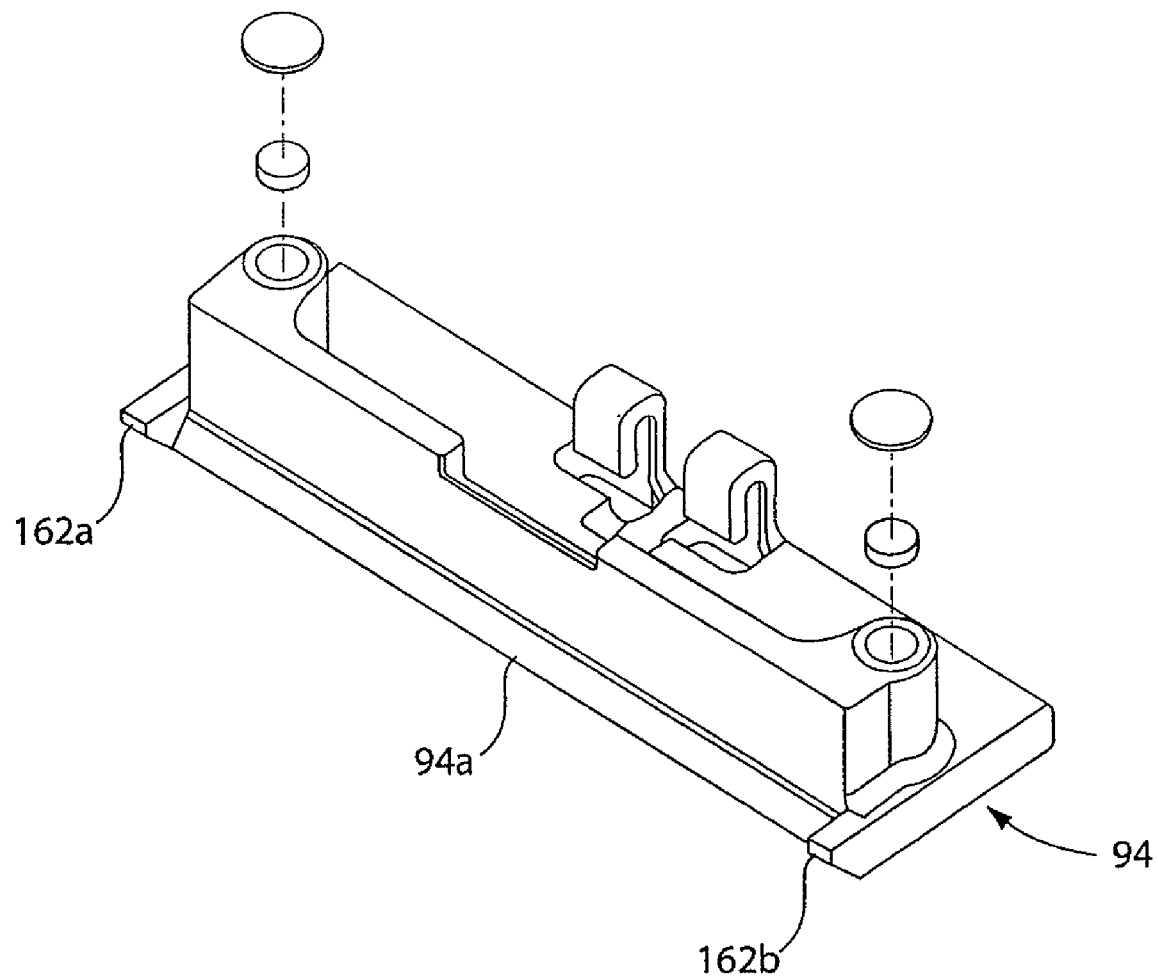
Figure 32:
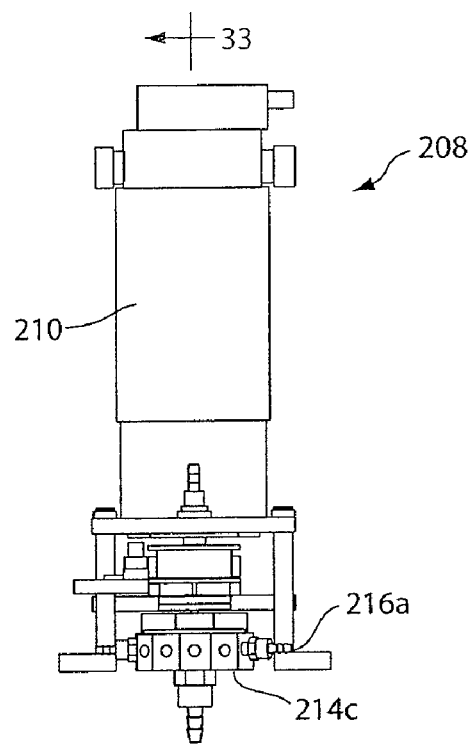
Figure 33:
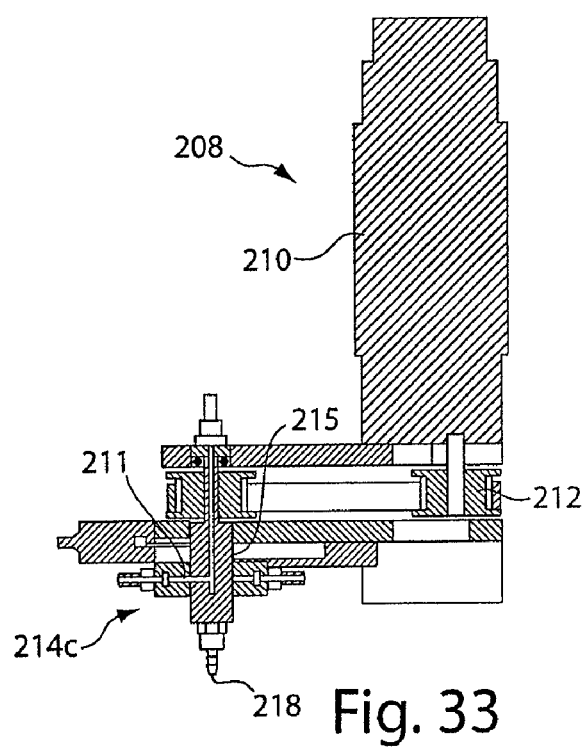
Figures 34, 35:
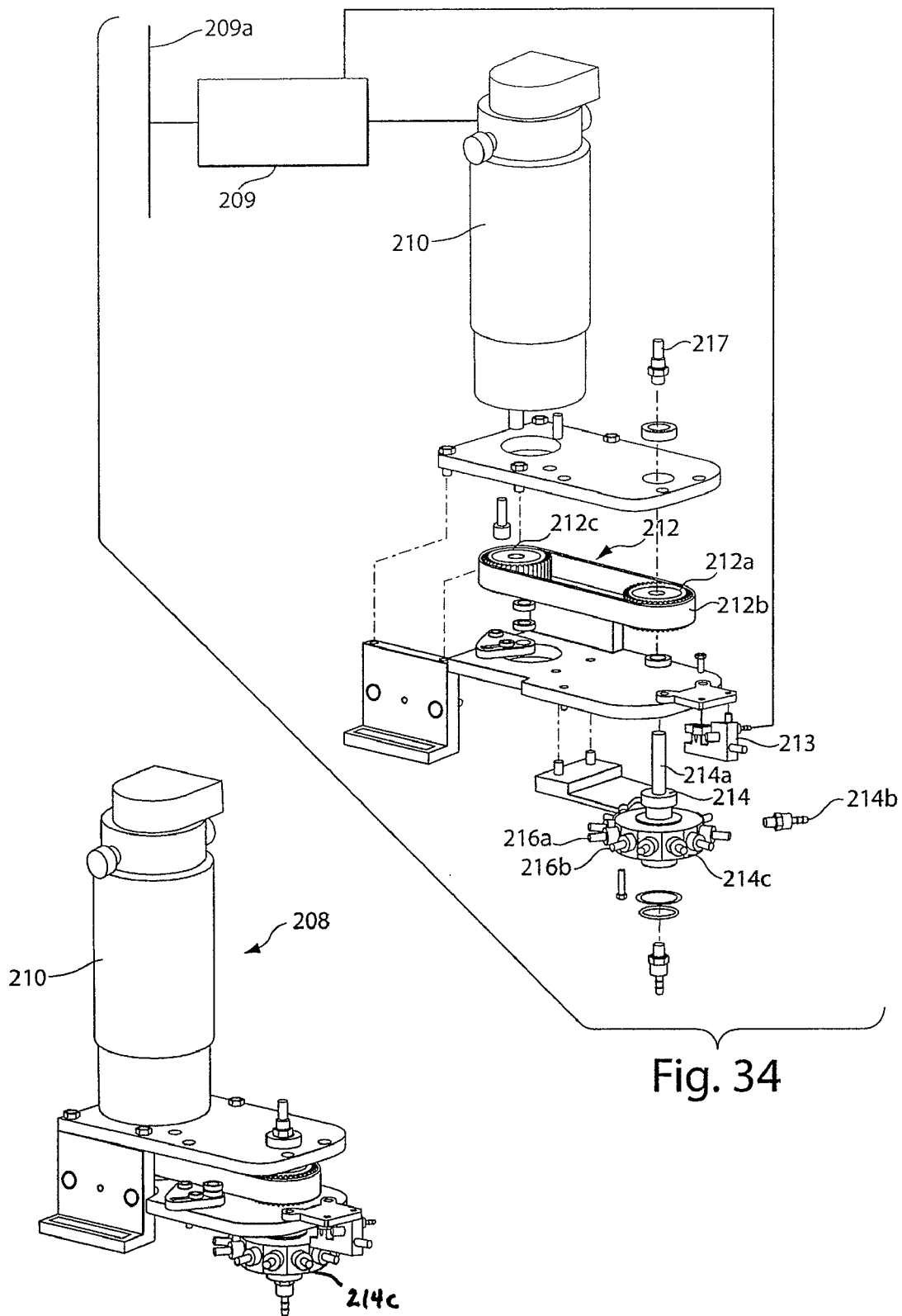
Figure 36:
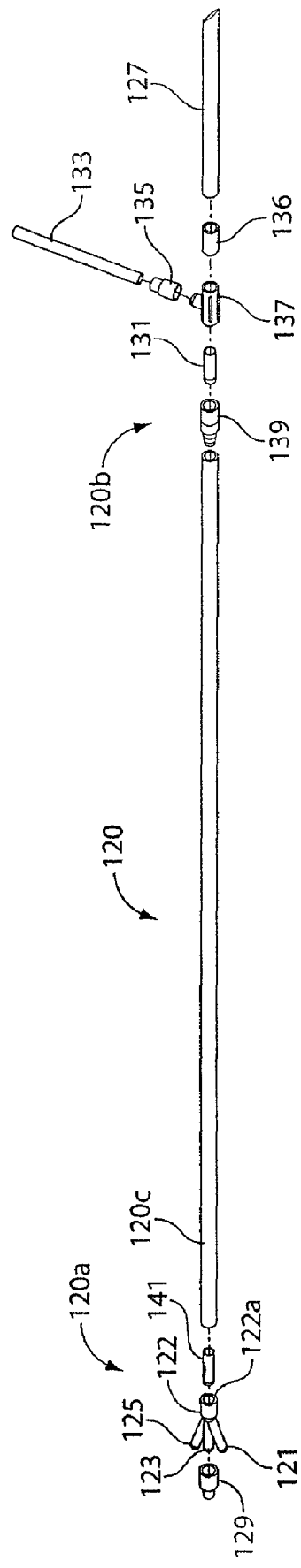
Figure 37:
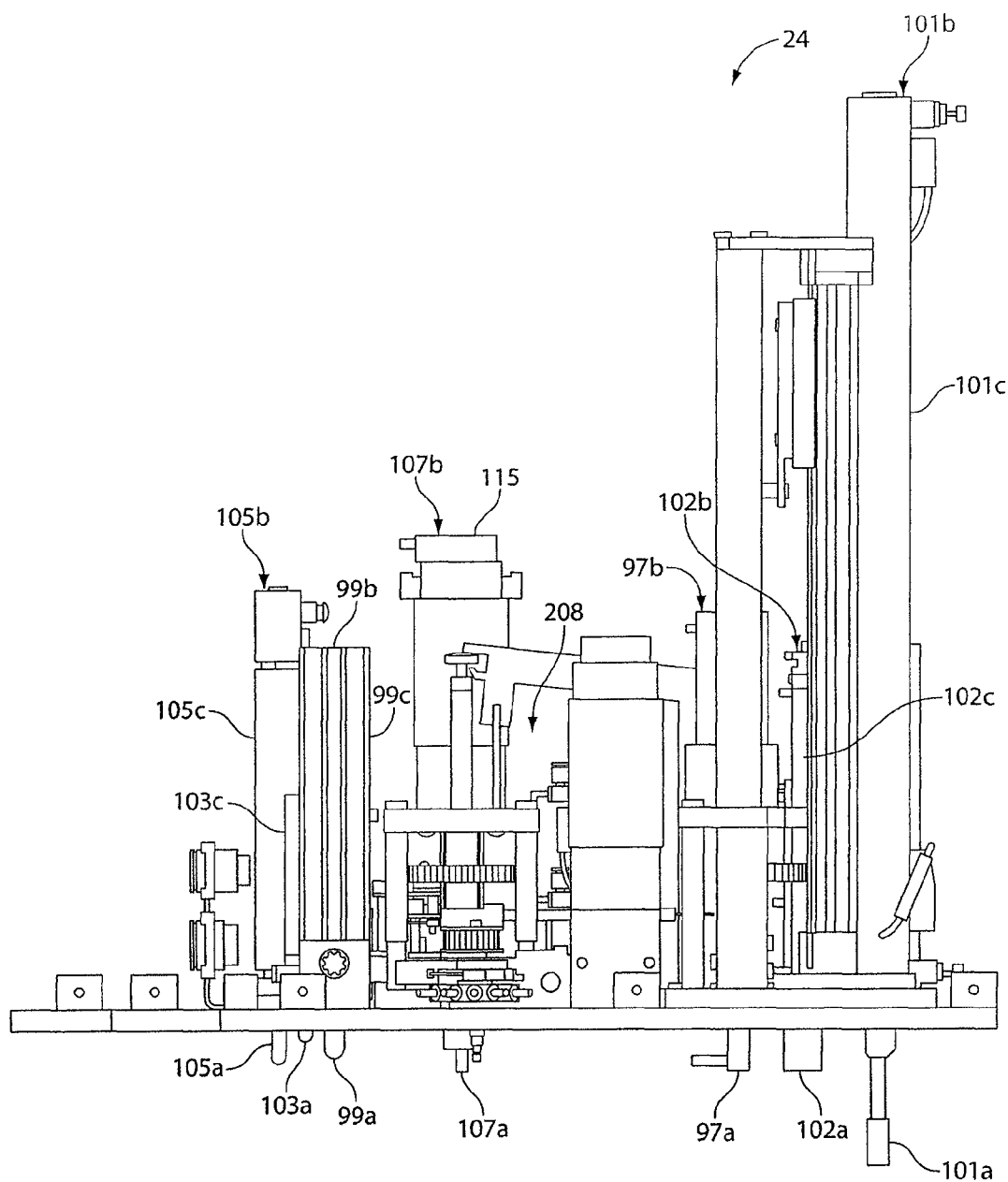
Figure 38:
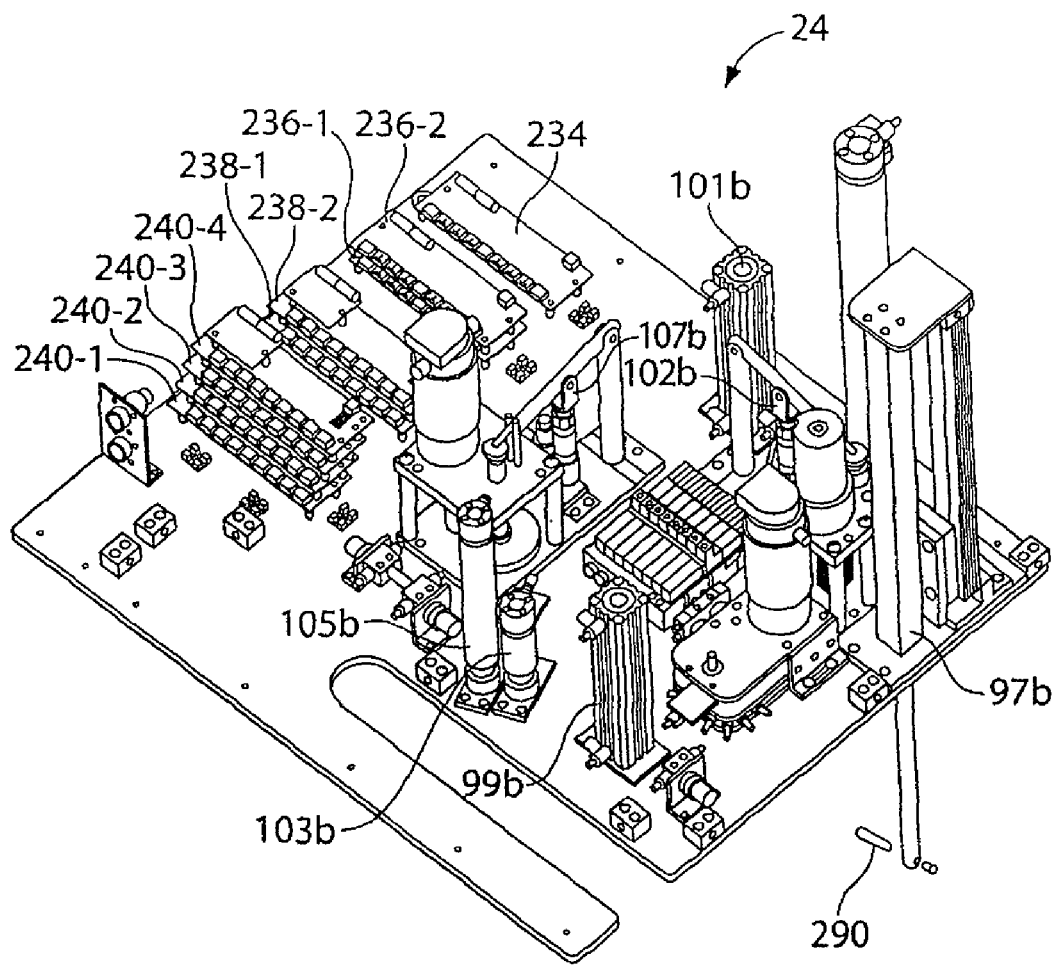
Figure 39:
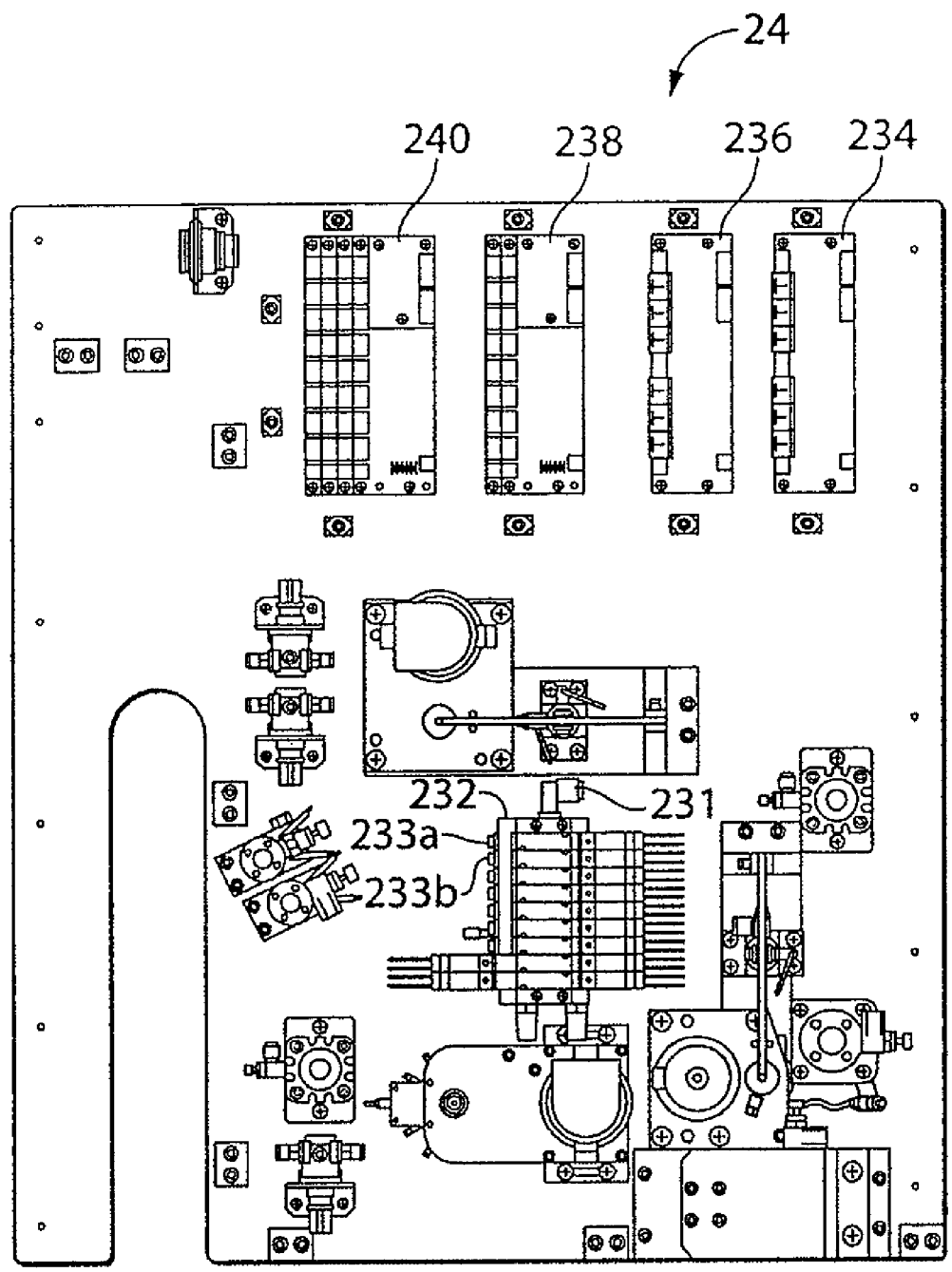
Figure 40:
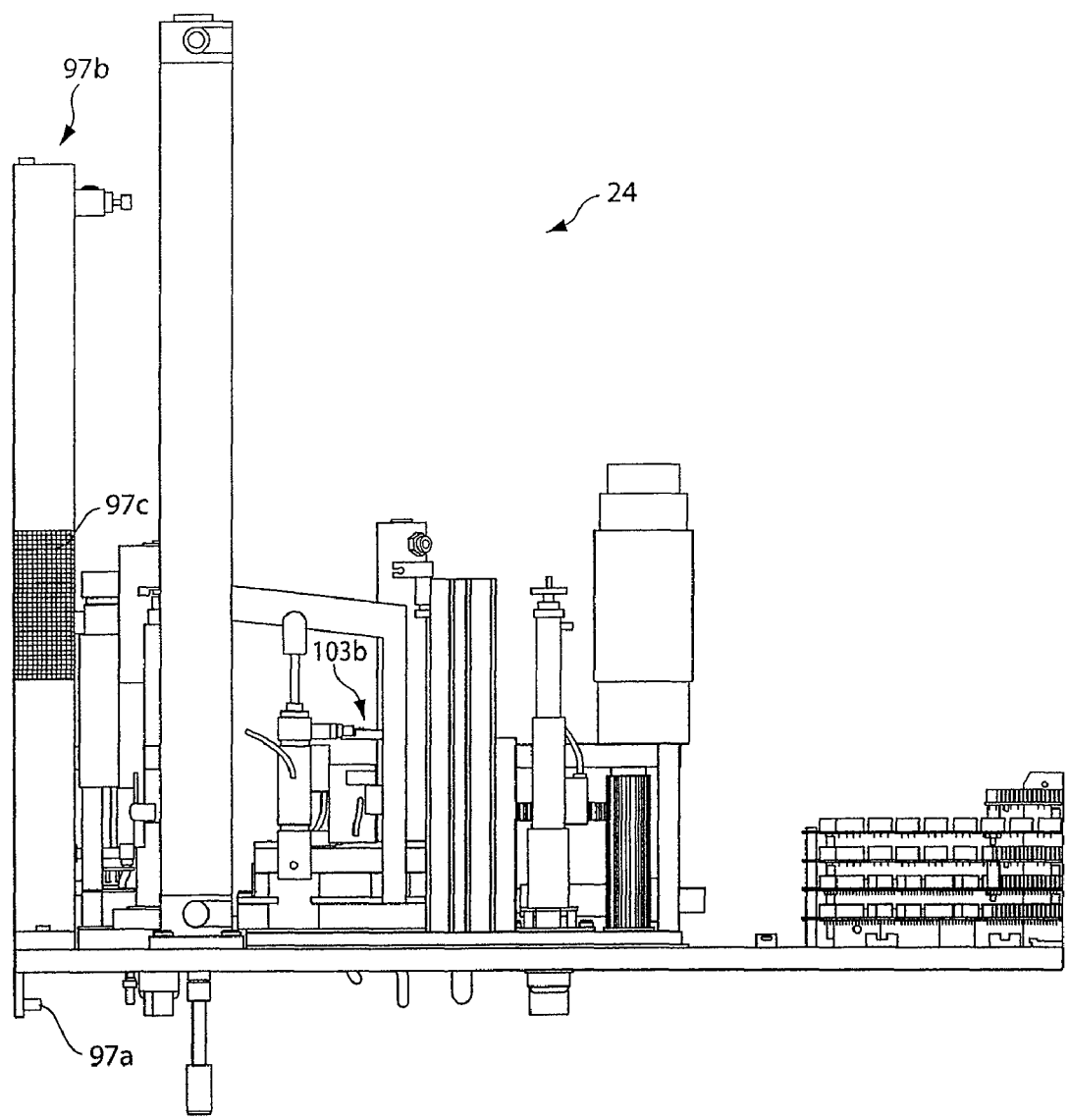
Figure 41:
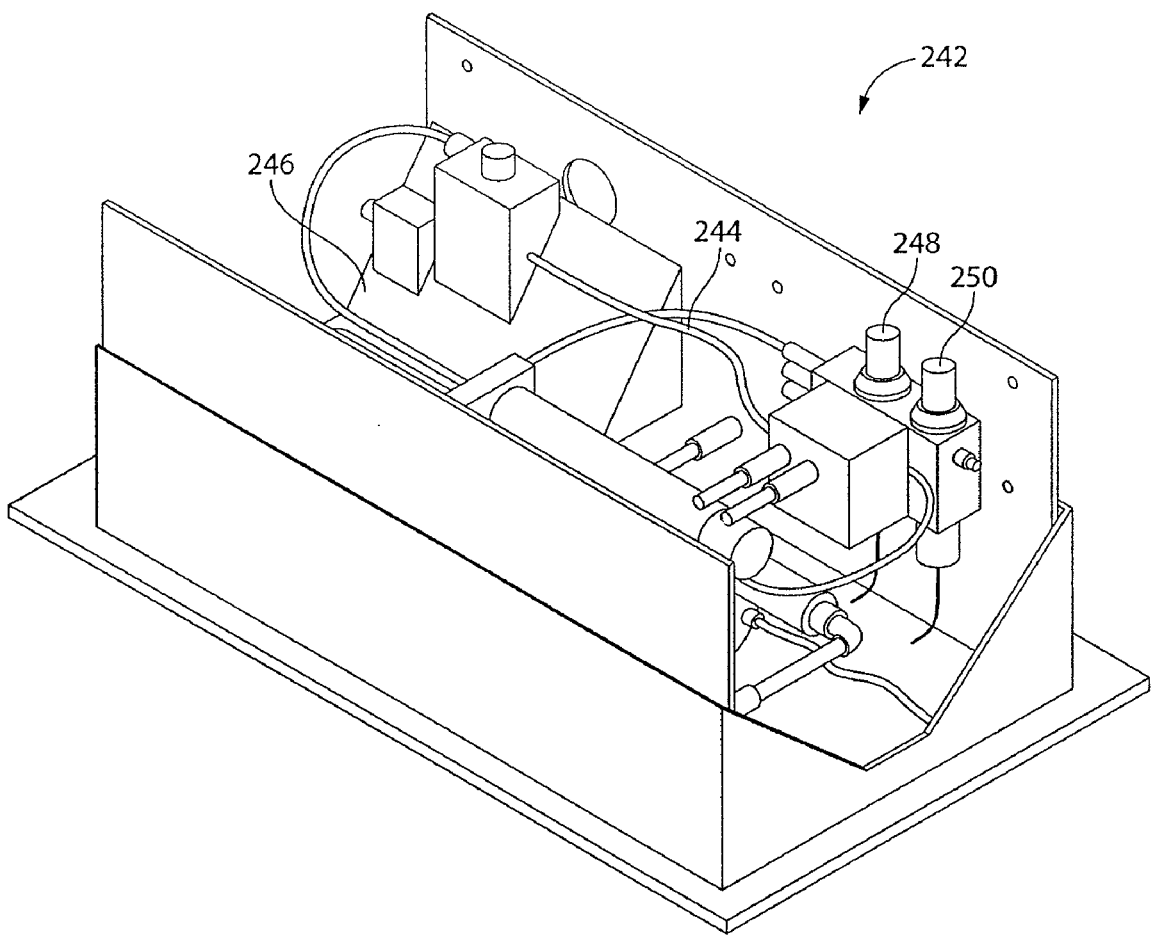
Figure 42:
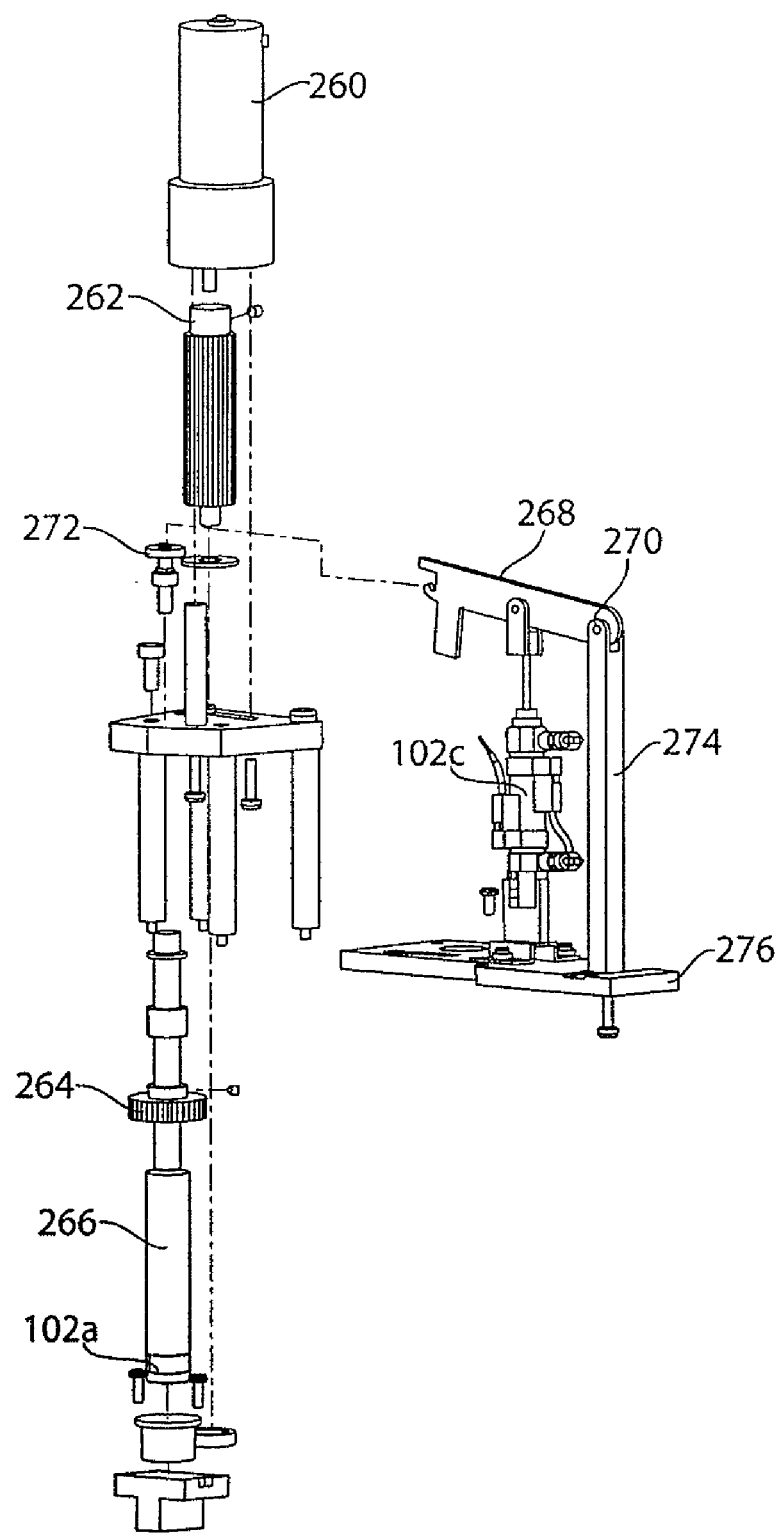
Figure 43:
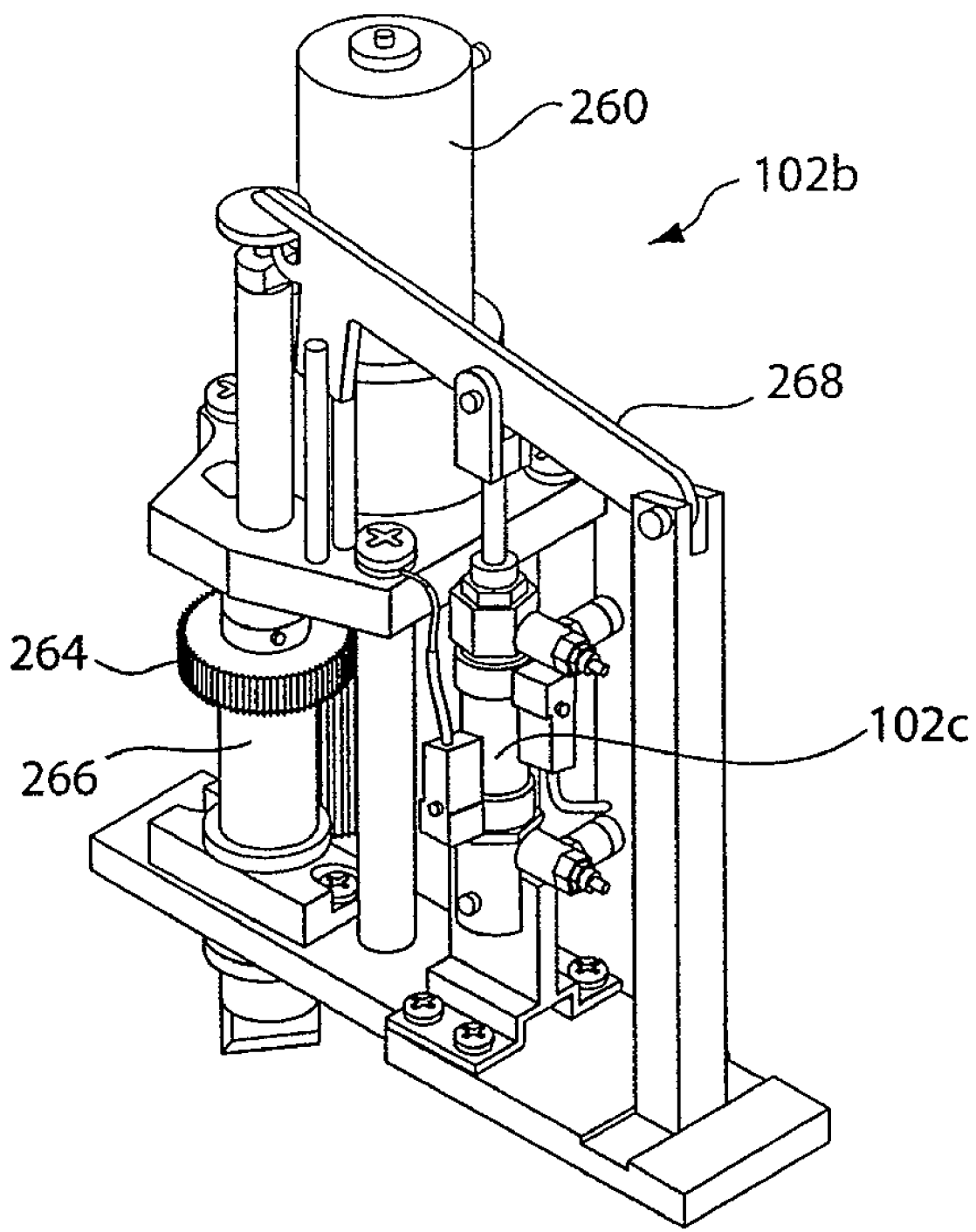
Figure 44:
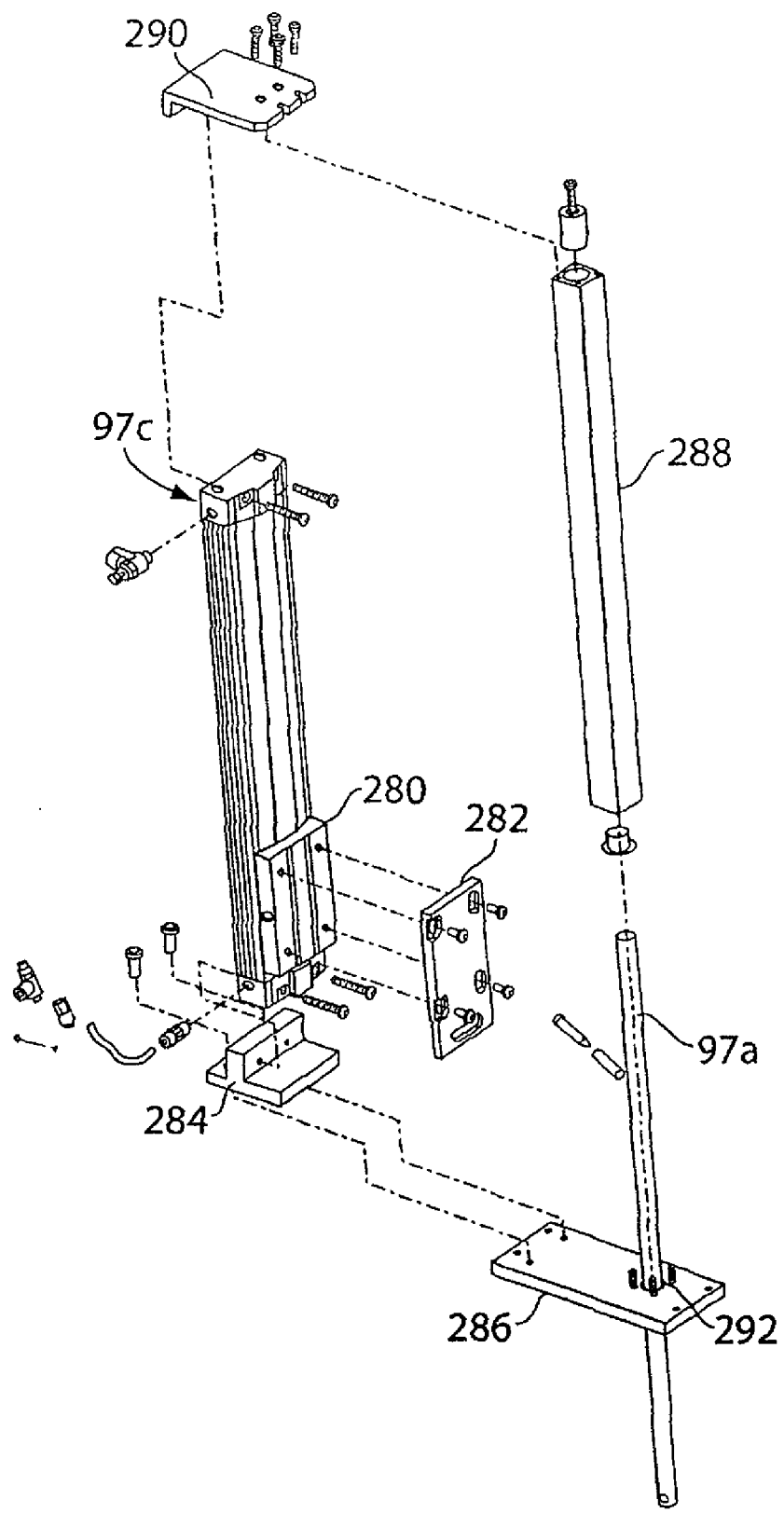
Figure 45:
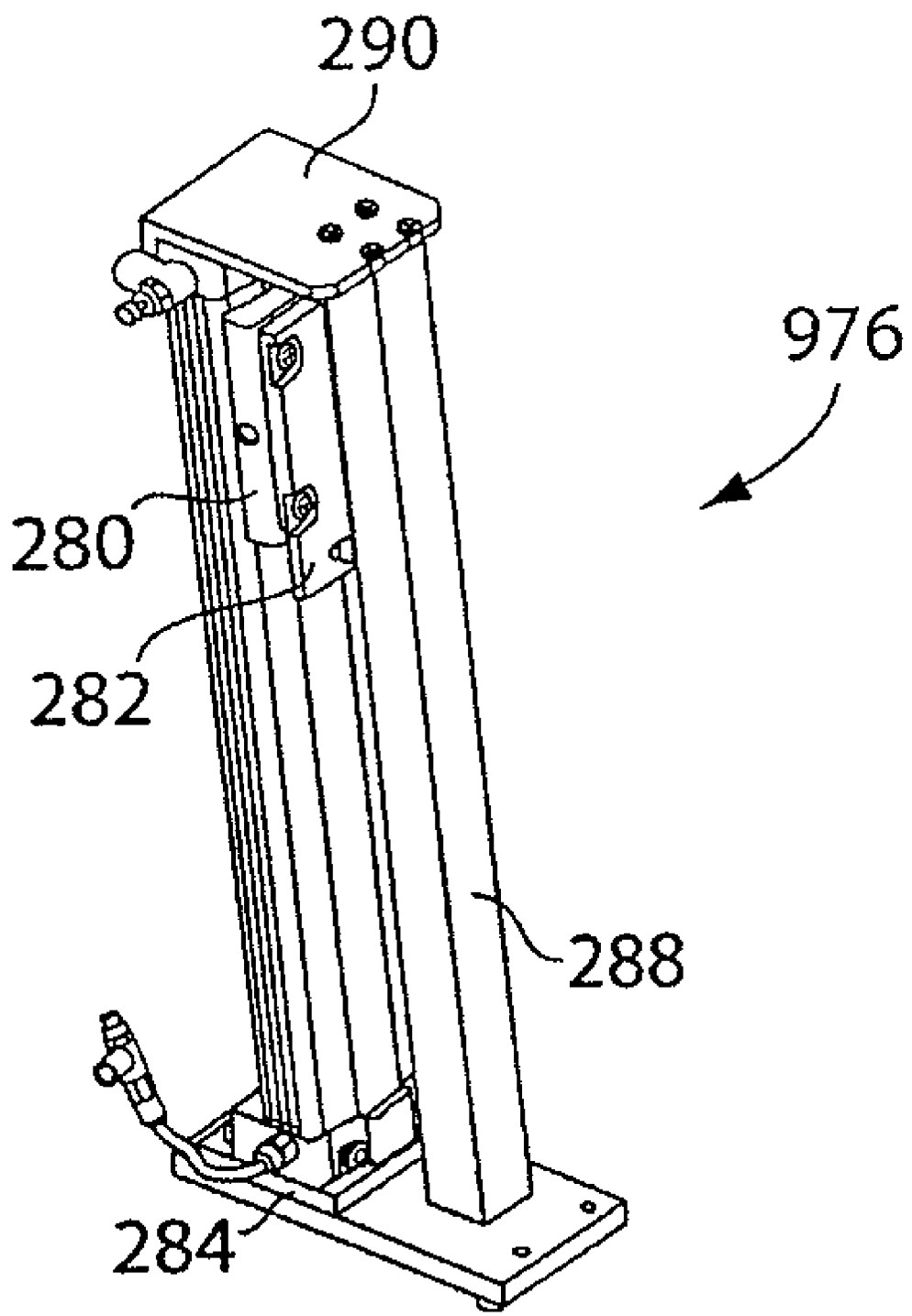
Figure 46:
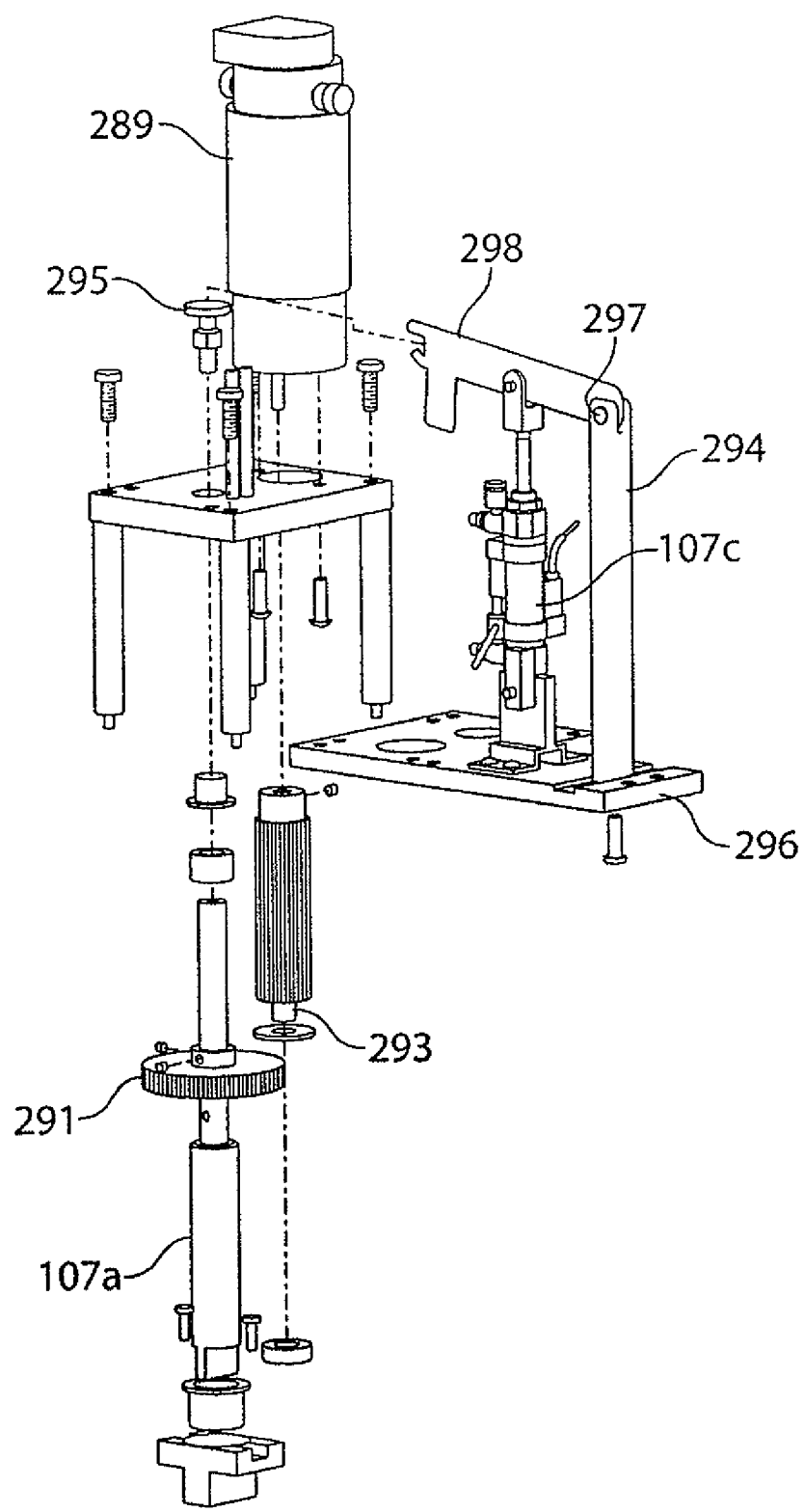
Figure 47:
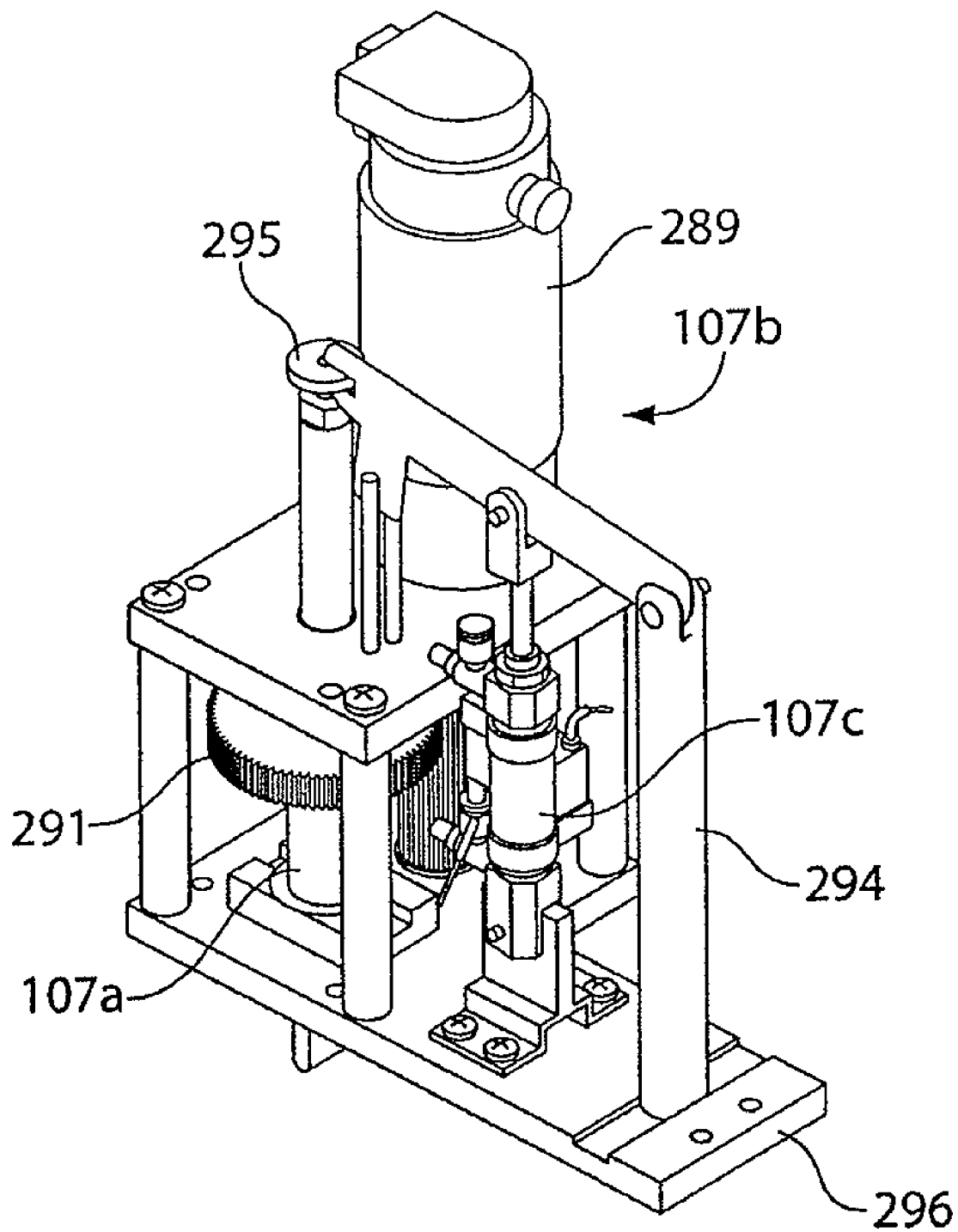
Figure 48:
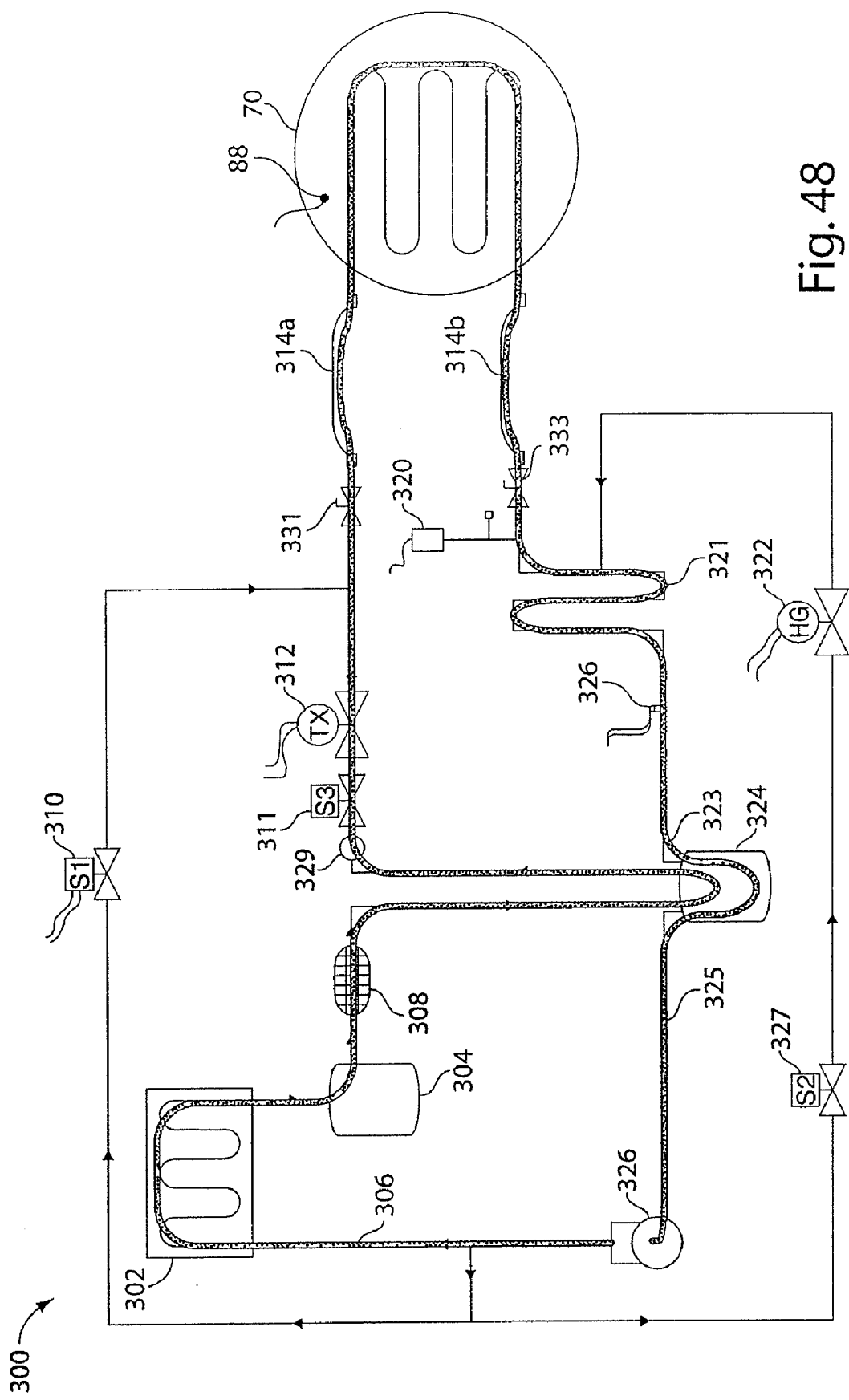
Figure 49:
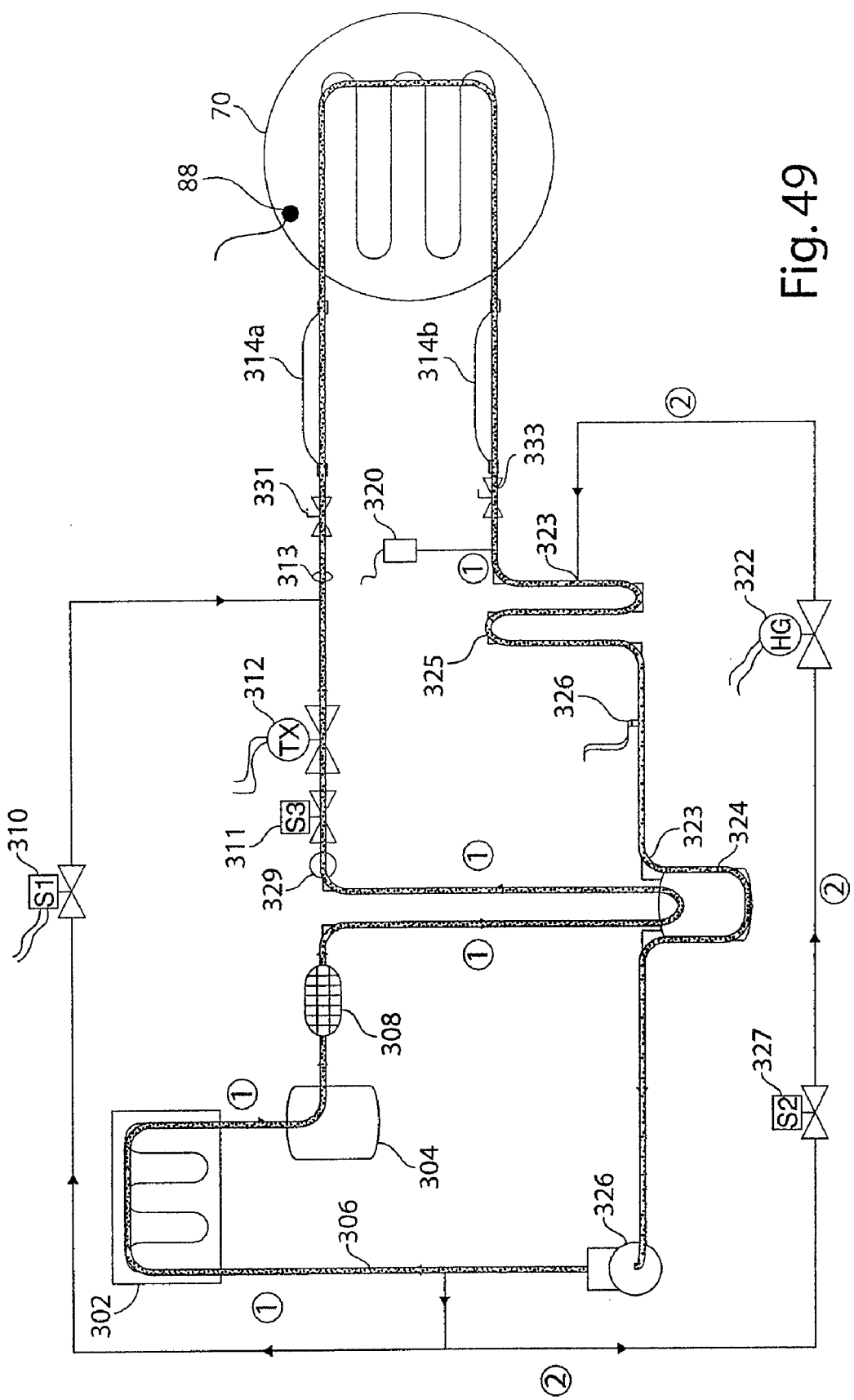
Figure 50:
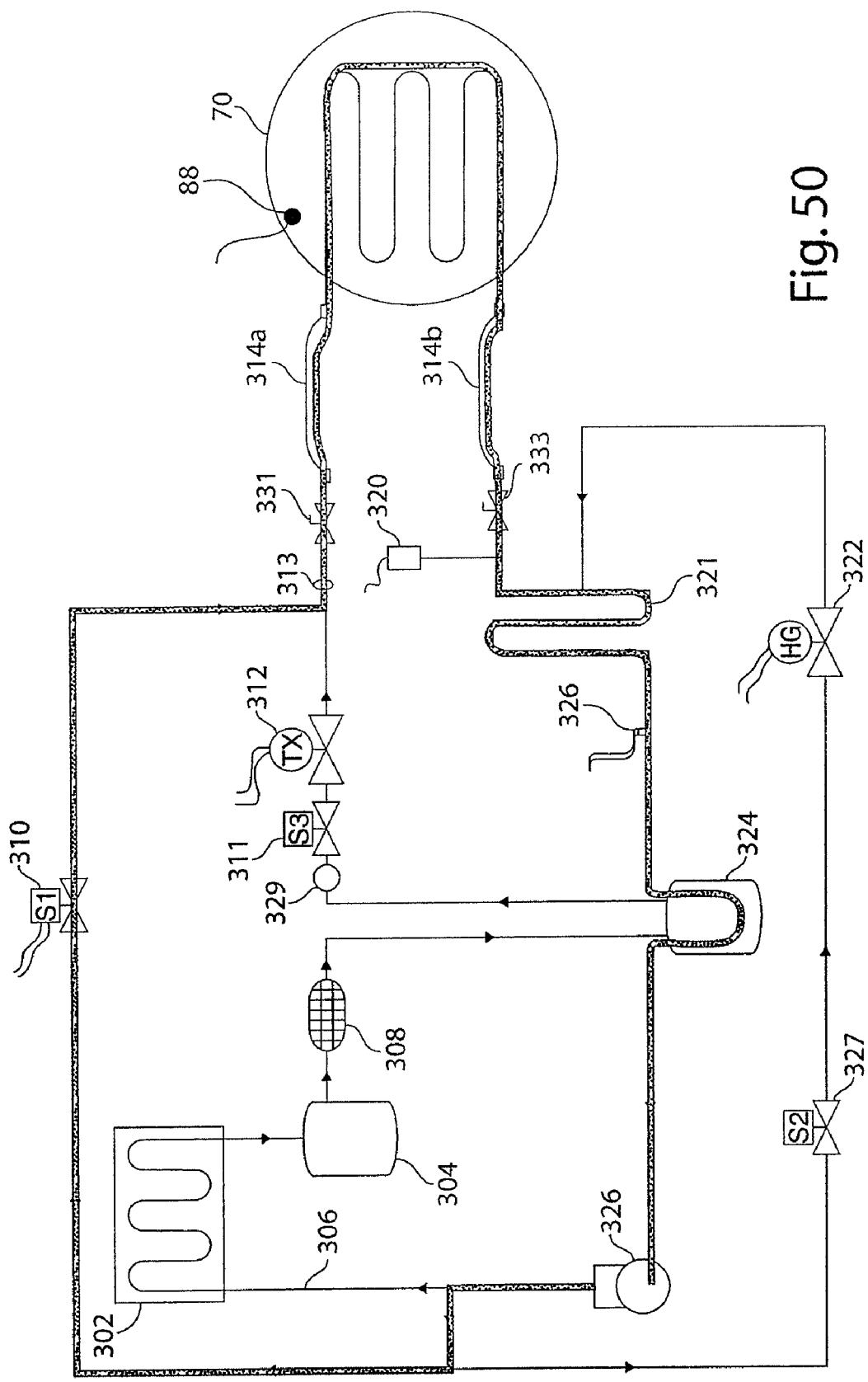
Figure 51:
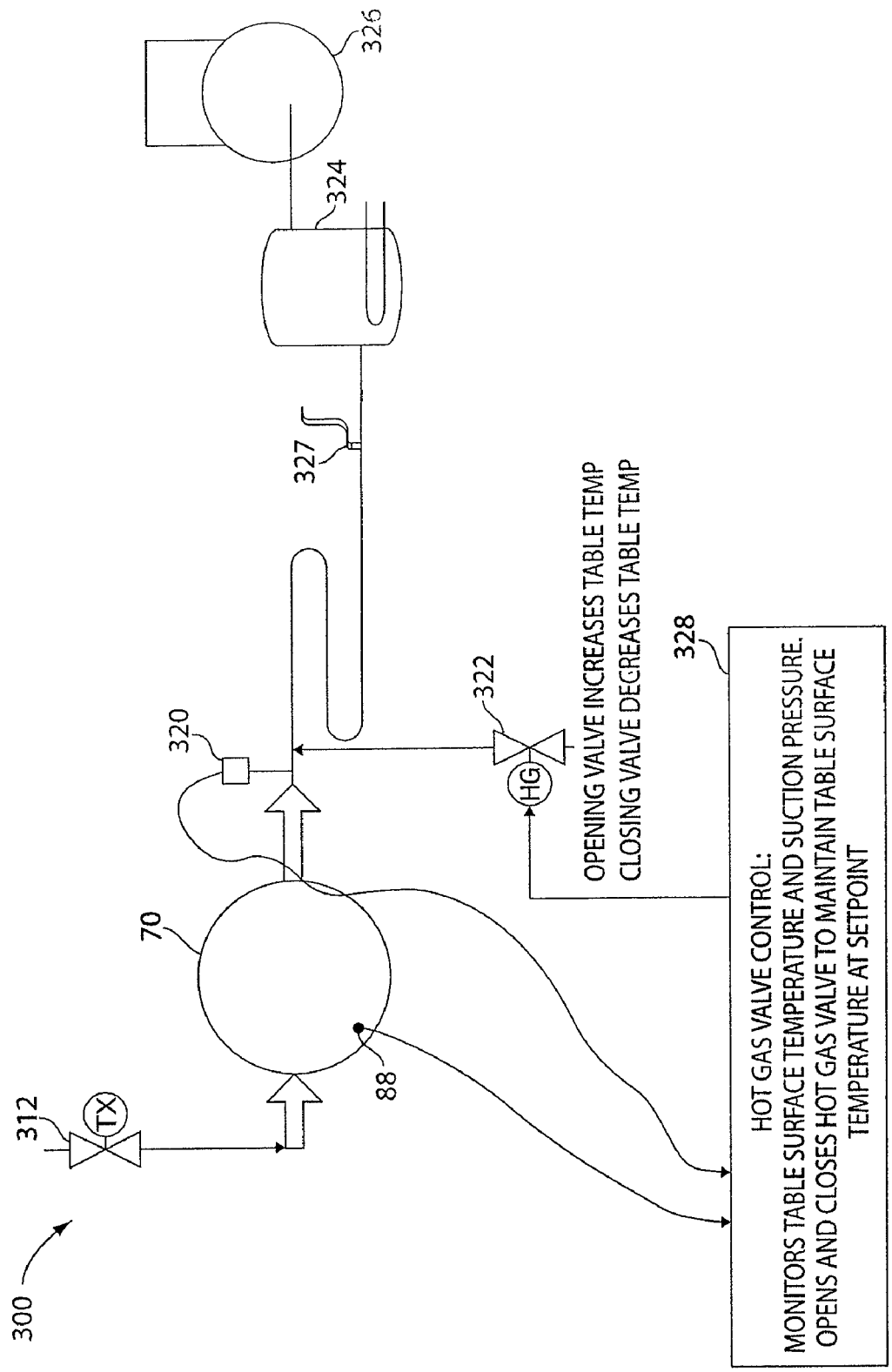
Figure 52:
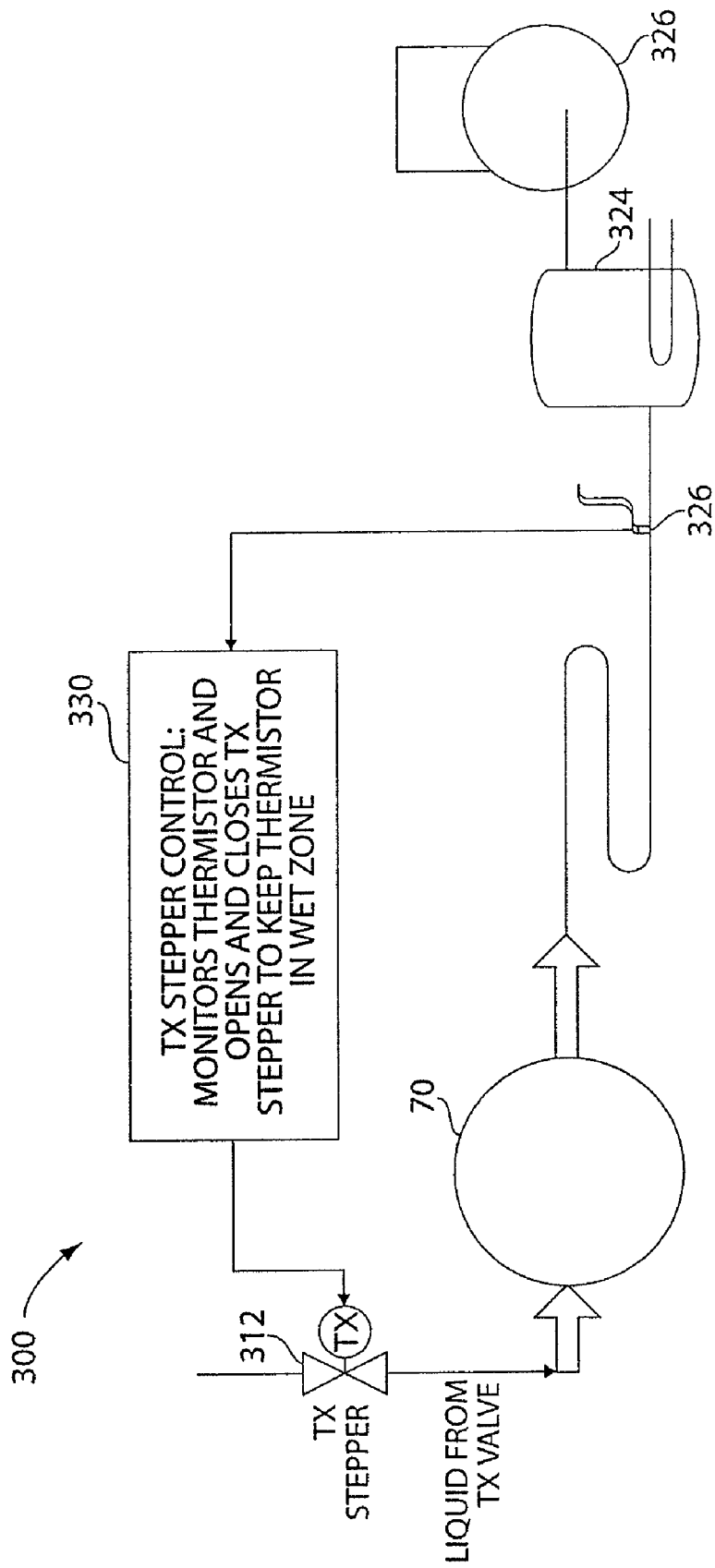
Figure 53:
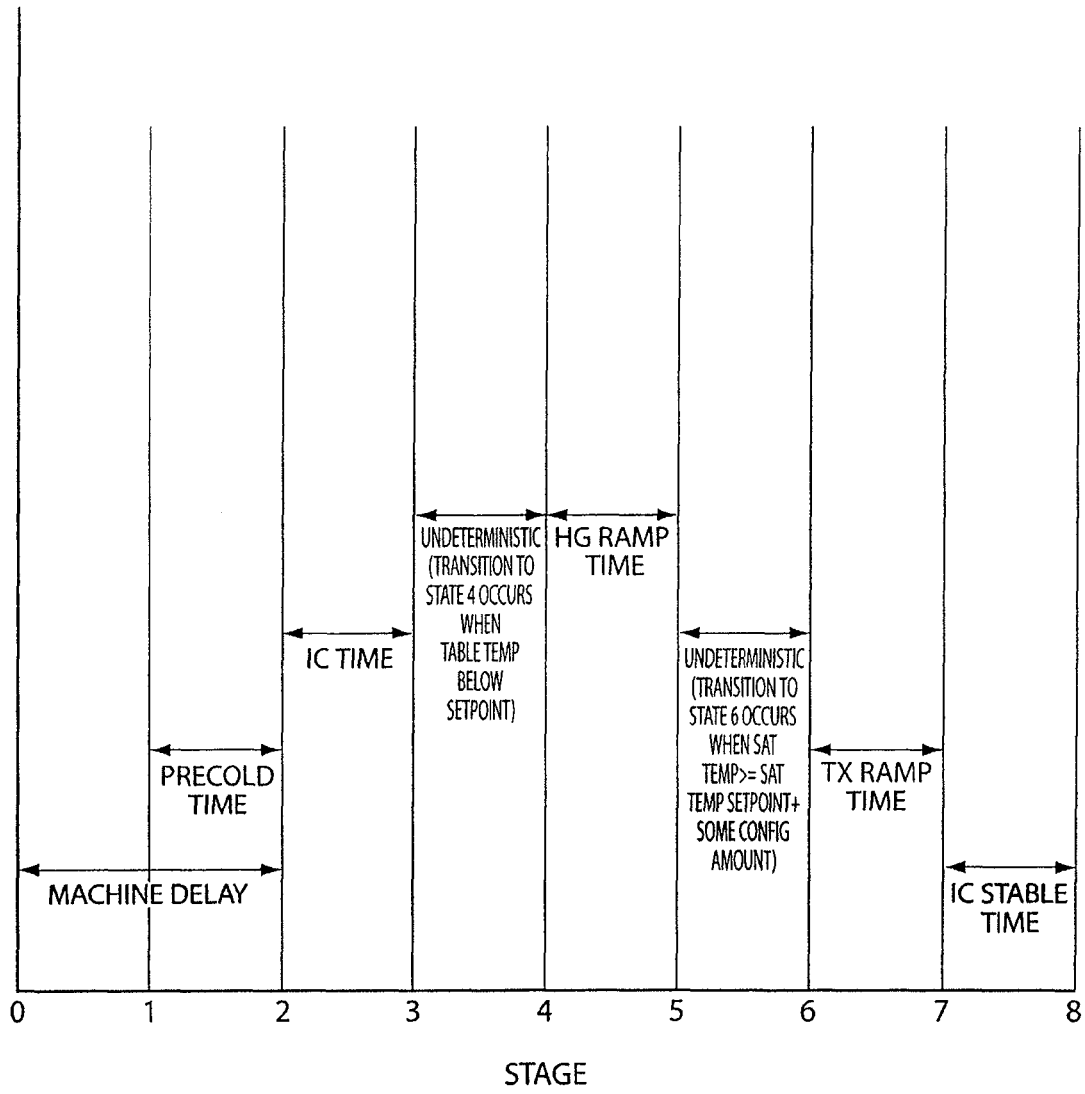
Figure 54:
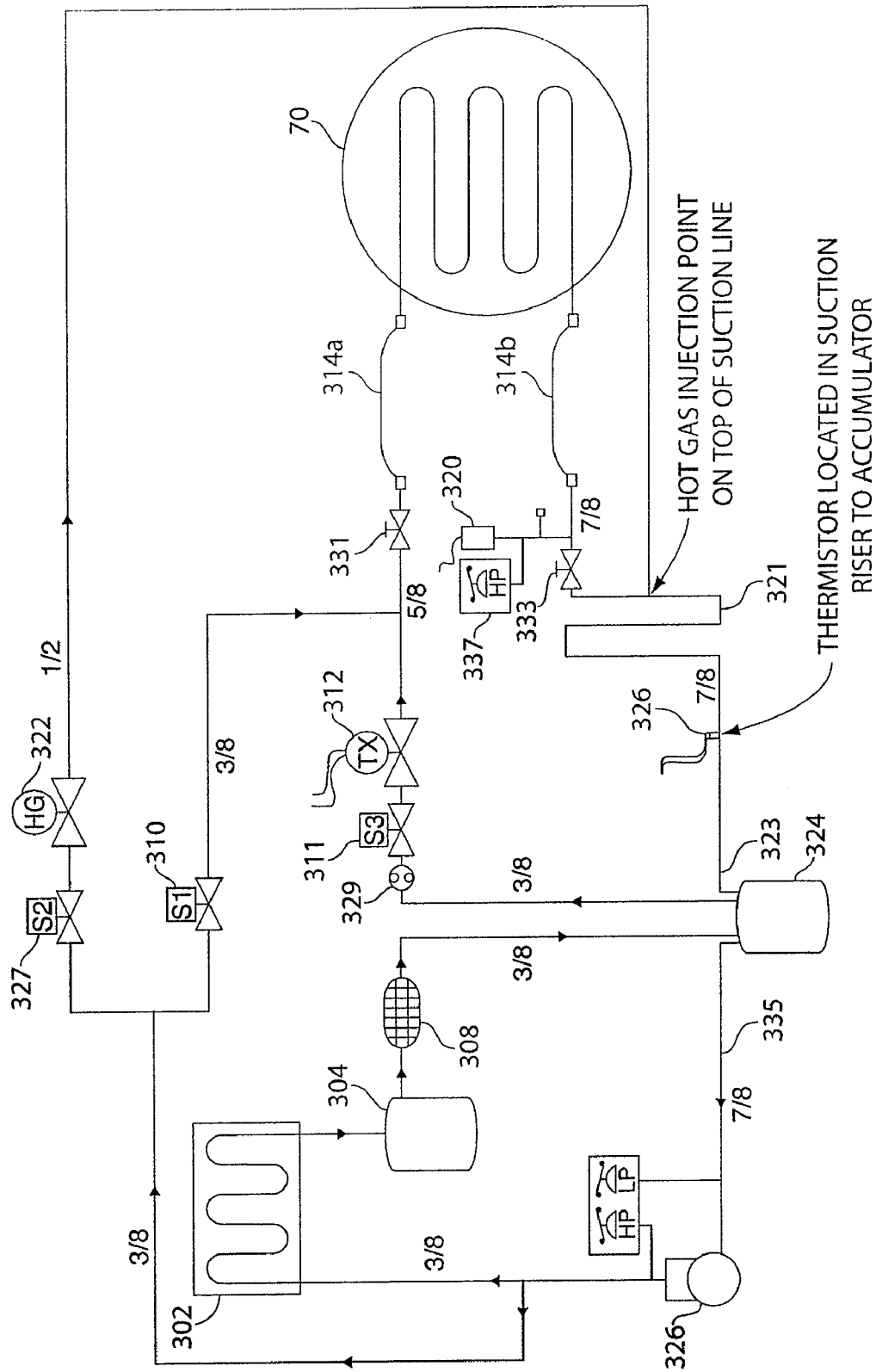
Figure 55:
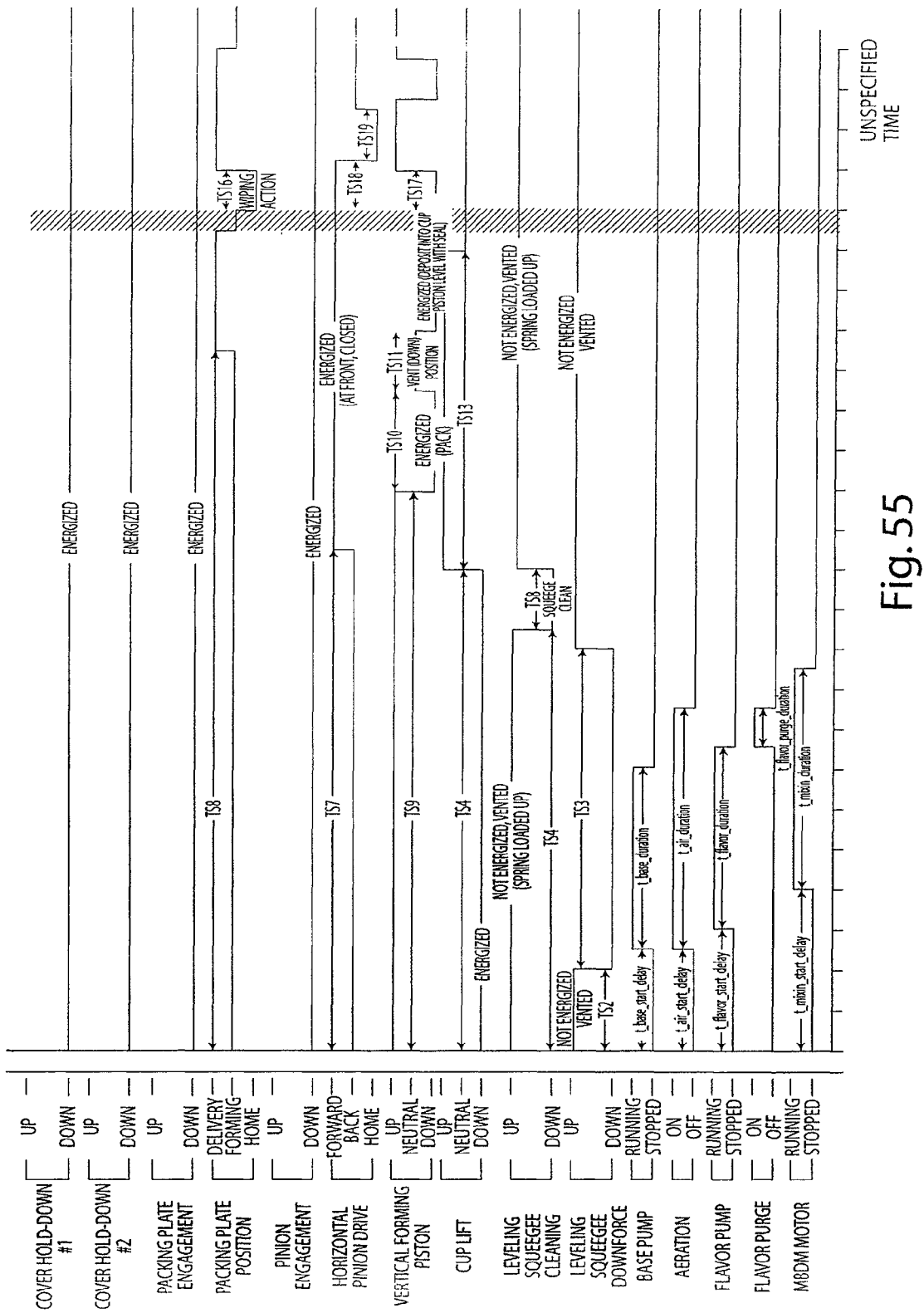

FIG. 14 a mix-in assembly used in the mix-ins module of FIG. 13;

FIG. 15 is an exploded schematic perspective view of one embodiment of a primary refrigeration system and food preparation apparatus for use in the food service machine of FIG. 1;

FIG. 16 is an assembled schematic perspective view of the primary refrigeration system and food preparation apparatus of FIG. 15;

FIG. 17 is an exploded perspective view of a freeze-surface assembly of the food preparation apparatus of FIG. 15;

FIG. 18 is an exploded perspective view of a rotating freeze-surface assembly (i.e., the food preparation apparatus) of FIG. 15;

FIG. 19 is an assembled perspective view of the food preparation apparatus of FIG. 18;

FIG. 20 is an exploded perspective view of a lower seal housing assembly of the food preparation apparatus of FIG. 18;

FIG. 21 is an exploded perspective view of an upper seal housing assembly of the food preparation apparatus of FIG. 18;

FIG. 22 is a cross-sectional view of a portion of the food preparation apparatus of FIG. 15;

FIG. 23 is a top perspective view of one embodiment of a food cover assembly for use in the food service machine of FIG. 1;

FIG. 24 is a bottom perspective view of the food cover assembly of FIG. 23;

FIG. 25 is an exploded perspective view of the food cover assembly of FIG. 23;

FIG. 26 is a top perspective view of the food cover assembly of FIG. 23;

FIG. 27 is a sectional view of the pinion interface of the food cover assembly of FIG. 26;

FIG. 28 is a sectional view of a level interface (including a squeegee) of the food cover assembly of FIG. 26;

FIG. 29 is a sectional view of the forming/dispensing cylinder of the food cover assembly of FIG. 26;

FIG. 30 is a top perspective exploded view of the food zone cover of FIG. 23;

FIG. 31 is an illustration of one embodiment of the squeegee of FIG. 23;

FIG. 32 is a schematic view of one embodiment of a flavor wheel assembly for use in the food service machine of FIG. 1;

FIG. 33 is a cross-sectional view of the flavor wheel assembly of FIG. 32;

FIG. 34 is an exploded top perspective view of the flavor wheel assembly of FIG. 32;

FIG. 35 is a top perspective view of the flavor assembly wheel of FIG. 32;

FIG. 36 is an exploded perspective view of one embodiment of a base aeration conduit assembly (with a connection for connecting to the flavor module) for use in the food service machine of FIG. 1;

FIG. 37 is a front view of one embodiment of a process plate assembly, i.e., a process box, for use in the food service machine of FIG. 1;

FIG. 38 is a perspective view of the process box of FIG. 37;

FIG. 39 is a top view of the process box of FIG. 37;

FIG. 40 is a right side view of the process box of FIG. 37;

FIG. 41 is a top perspective view of one embodiment of a pneumatic module for use in the food service machine of FIG. 1;

FIG. 42 is an exploded view and FIG. 43 is a perspective view of the packing plate piston assembly of the process box of FIG. 37;

FIG. 44 is an exploded view and FIG. 45 are perspective views of the packing piston assembly of the process box of FIG. 37;

FIG. 46 is an exploded view and FIG. 47 is a perspective view of the pinion drive piston assembly of the process box of FIG. 37;

FIG. 48 is a schematic illustration of one embodiment of the primary refrigeration system of FIG. 15 and highlights a cooling loop;

FIG. 49 is the schematic illustration of FIG. 48 highlighting the cooling loop in combination with a temperature-control loop;

FIG. 50 is the schematic illustration of FIG. 48 highlighting a defrost loop;

FIG. 51 is a schematic illustration of the hot-gas valve control used with the system of FIG. 48;

FIG. 52 is a schematic illustration of the liquid stepper control used with the system of FIG. 48;

FIG. 53 is one embodiment of a timing diagram for operation of the primary refrigeration system during a serving sequence;

FIG. 54 is the schematic illustration of FIG. 48 with each of the parts called out for use with a parts list; and FIG. 55 is one embodiment of a serving sequence timing diagram for operation of the food service machine of FIG. 1.

DETAILED DESCRIPTION

The present invention relates to systems and methods for producing aerated and/or blended food products. While the invention may be used to produce a variety of products, it has particular application to the production of frozen confections such as ice cream and frozen yogurt. Consequently, we will describe the invention in that context. It should be understood, however, that various aspects of the invention to be described also have application to the making and dispensing of various other food products.

Referring to FIG. 1 of the drawings, one embodiment of an apparatus for producing food according to the invention is a stand-alone unit 200 housed in a cabinet 19 having a top wall 19a, opposite sidewalls 19b and 19c, a bottom wall 19d, and a middle separation wall 19e as well as a rear wall (not shown). In one embodiment these walls are merely covers. The front of the cabinet is open for the most part except for a low front wall 10 containing louvers to provide inlet air to a primary refrigeration unit, a base refrigeration unit and to pneumatics. The front opening into the cabinet may be closed by hinged doors 21*a*, 21*b*, 21*c* which may be swung between an open position wherein the doors allow access to the interior of the cabinet and a closed position wherein the doors cover the openings into the cabinet. Suitable means are provided for latching or locking each door in a closed position.

As shown in FIG. 1, a relatively large opening or portal 17 is provided in door 21*c* so that when the door is closed, the portal 17 provides access to a dispensing station 20 within the cabinet at which a customer may pick up a food product dispensed by the apparatus. Preferably, the portal is provided with a door so that the portal is normally closed blocking access to station 20. A customer may select the particular product to be dispensed by depressing the appropriate keys of a control panel mounted in door 21*c* after viewing product availability. In the event the apparatus is being used as an automatic vending machine, the control panel may include the usual mechanisms for accepting coins, debit cards and currency and possibly delivering change in return. For advertising purposes, an illuminated display may be built into the front of a door, e.g., door 21*c*.

Having described the housing and the doors for the housing, this description now turns to an overview of the apparatus 200 of FIG. 1. One embodiment of an apparatus for producing a food product includes: a housing/frame 19; a base-mix module 12 coupled to the frame and operative to provide refrigerated base mix and; a flavor module 14 coupled to the frame and operative to provide flavoring; a flavor-selection assembly 208 (shown in FIGS. 32-34 and 37) coupled to the frame and having an outlet 118 and a plurality of, e.g., twelve, flavoring inlets 116*a*, 116*b*, each inlet operative to receive a flavoring. The flavor-selection assembly 208 allows passage of a flavoring from a selected inlet to the outlet. The apparatus further includes a conduit assembly 120 (shown in FIG. 36) having a proximal end 120*a* including a first opening 121 coupled to the base-mix module and a second opening 123 for receiving air. The conduit assembly 120 has a distal end 120*b* coupled to the outlet of the flavor-selection assembly 208. The conduit assembly 120 combines base mix, air and flavoring to produce a flavored, aerated mix.

The apparatus for producing a food product can further include a mix-ins module 16 (shown in FIG. 1). The apparatus includes a food-preparation assembly 22 (shown in FIG. 1) coupled to the frame below a process box 24. In one embodiment, the food-preparation assembly 22 includes a food-zone cover apparatus 93 (see FIG. 23) adapted to receive the flavored, aerated mix from the distal end of the conduit assembly 120 and mix-ins from the mix-ins module 16. The food-preparation assembly 22 then prepares food from the flavored aerated mix and mix-ins.

In one embodiment, the invention uses distributed computing to facilitate the testing, repair and/or replacement of the individual modules/components described above. More specifically, in one embodiment various modules/components have dedicated sub-controllers. Thus, in one embodiment, the base-mix module 12 has a dedicated base-mix-module sub-controller adapted to operate the base-mix module, the flavor module 14 has a dedicated flavor-module sub-controller adapted to operate the flavor module, the flavor-selection assembly has a flavor-selection assembly sub-controller adapted to operate the flavor-selection assembly, and the food-preparation assembly 22 has a dedicated food-preparation assembly sub-controller adapted to operate the food-preparation assembly 22. In one embodiment, the sub-controllers can be conventional cards implemented in a combination of hardware and firmware and designed to comply with the controller area network open (CANopen) specification, a standardized embedded network with flexible configuration capabilities. The CANopen specification is available from CAN in Automation (CiA) of Erlangen, Germany, an international users' and manufacturers' organization that develops and supports CAN-based higher-layer protocols.

The apparatus further includes a control and power distribution box. The box includes an apparatus or main controller in communication with the base-mix-module sub-controller, the flavor-module sub-controller, the flavor-selection assembly sub-controller, and the food-preparation assembly sub-controller to provide instructions to the sub-controllers so as to operate the apparatus. Similarly, the mix-ins module 16 can include a dedicated mix-ins-module sub-controller in communication with the apparatus/main controller adapted to operate the mix-ins module 16. In one embodiment, the main controller communicates with the sub-controllers over a bus using CANOpen, a controller area network-based higher layer protocol. CANOpen is designed for motion-oriented machine control networks, such as handling systems.

The main controller includes a digital I/O board with an associated CANOpen gateway, a CANOpen adaptor in communication with the CANOpen gateway, a motherboard in communication with the digital I/O board, the motherboard having an associated hard drive. The main controller further includes an Ethernet connection and two USB connectors in communication with the motherboard for providing external access to the motherboard.

The Base-Mix Module

Figure 2:
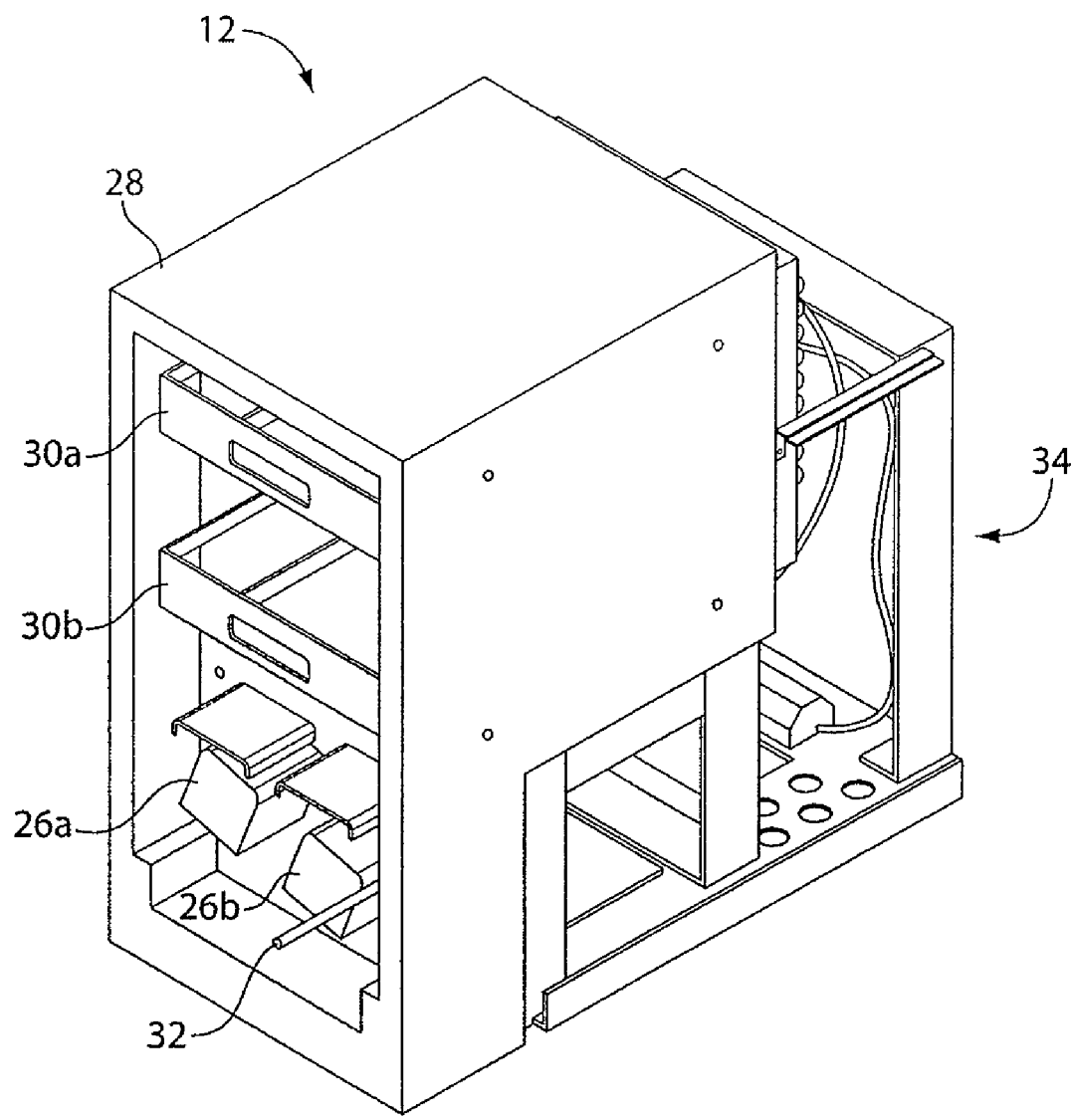
FIG. 2 is a perspective view of one embodiment of a base-mix module for use in the food service machine of FIG. 1.
Figure 3:
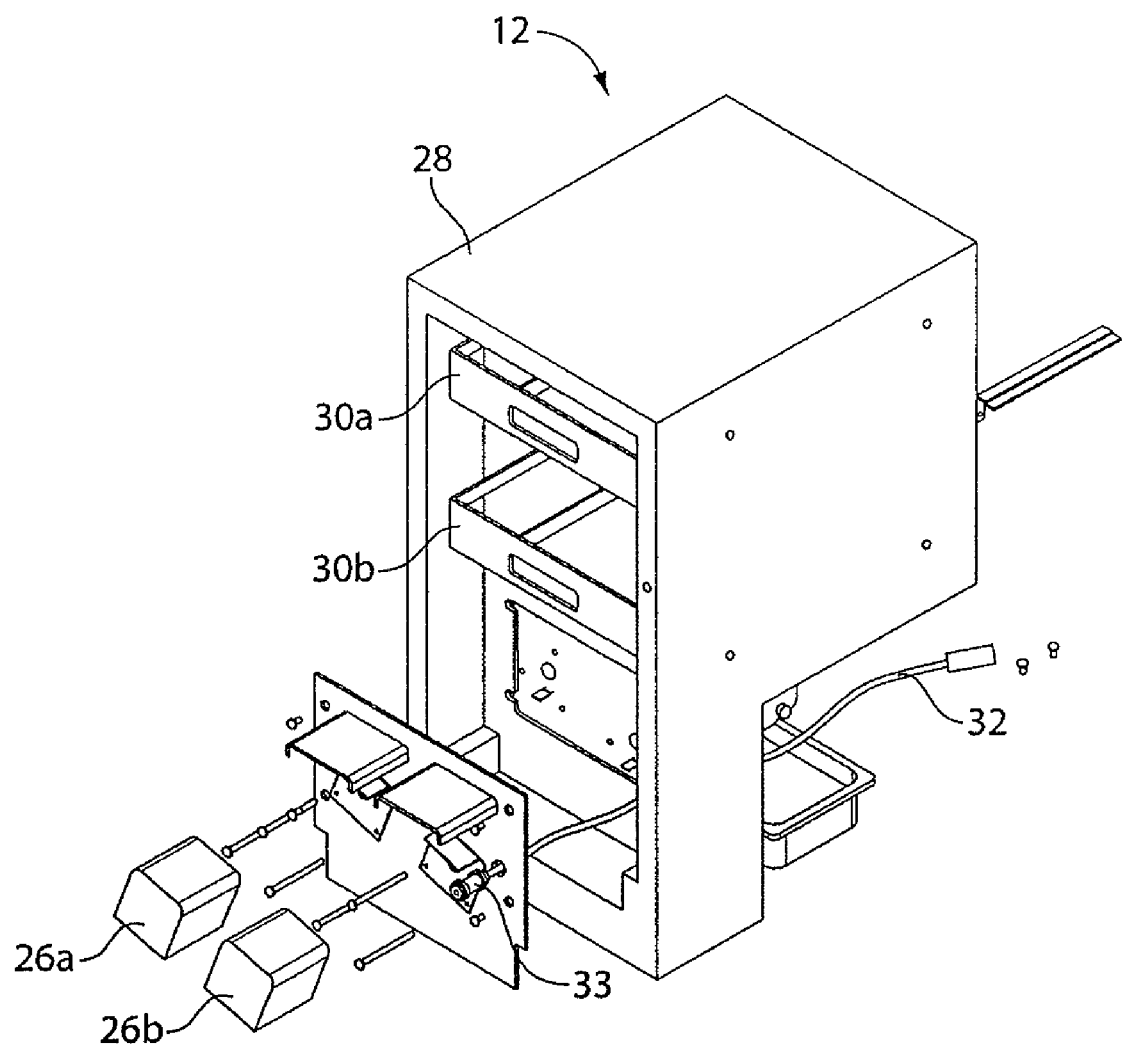
FIG. 3 is an exploded view version of FIG. 2.
Figure 4:
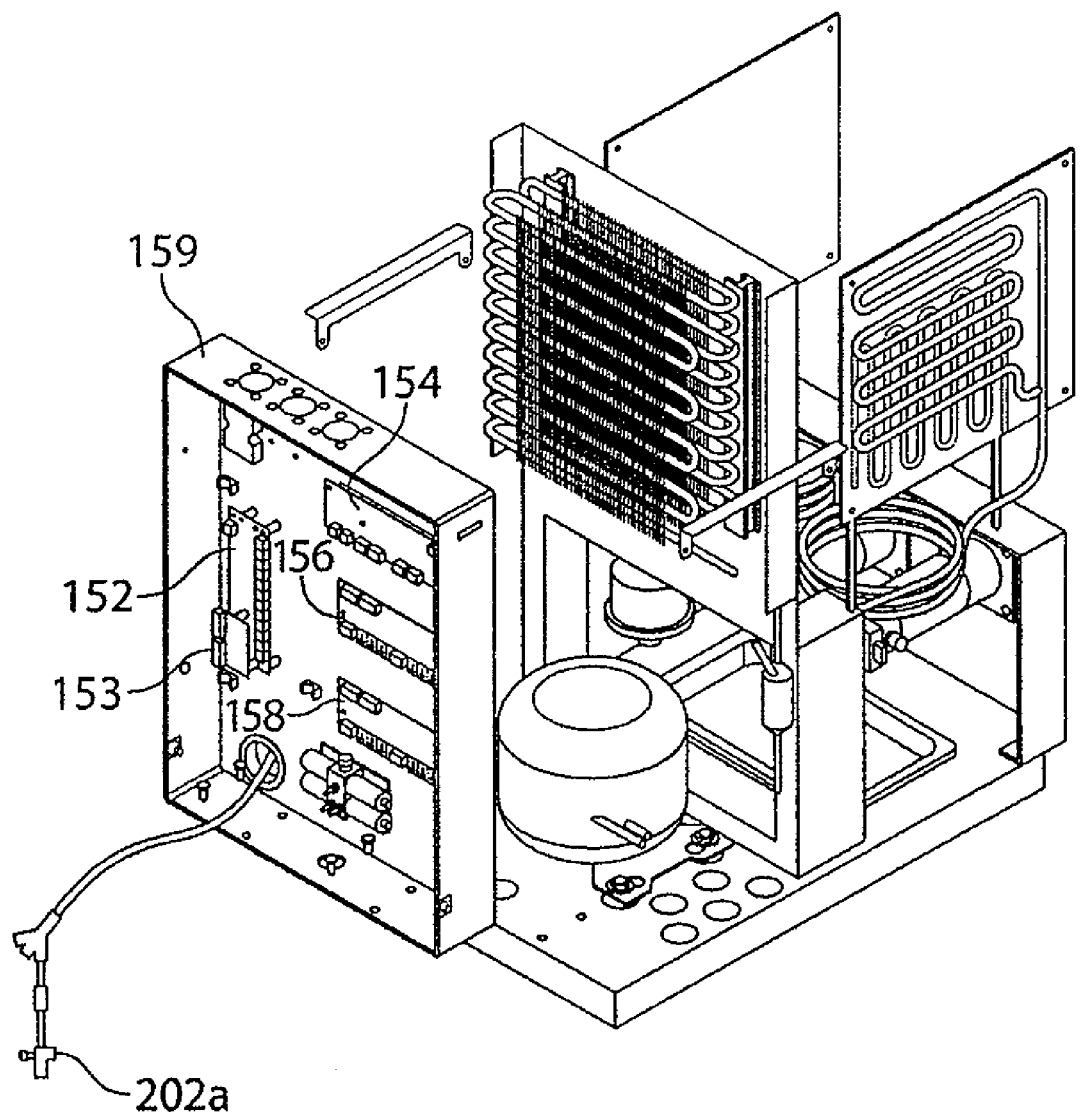
FIG. 4 is a perspective views of the base refrigeration subsystem of the base-mix module of FIG. 2.

With reference to FIGS. 2 and 3, one embodiment of a base-mix module includes: two base-mix holding bays 30*a*, 30*b*; two base mix conduits 32 each having a proximal end and a distal end (the proximal end adapted for coupling to a bag held in one of the base-mix holding bays); two pumps 26*a*, 26*b*, e.g., peristolic pumps, each pump coupled to a base mix conduit, the base mix conduits couple to a conduit assembly (shown in FIG. 36) forming a conduit assembly; a source of compressed air 244 (shown in FIG. 42) couples to the base mix conduit, the source of compressed air controlled in part by an air-control valve 202*a* (shown in FIG. 4). The air-control valve is operative to control the amount of air provided to the conduit assembly; and a base-mix-module sub-controller coupled to the pumps and operative to control the pumps and the air-control valve so that, when base mix is loaded into the base-mix holding bay, the base-mix-module sub-controller controls the amount of base mix and air injected into the conduit assembly.

Figure 5:
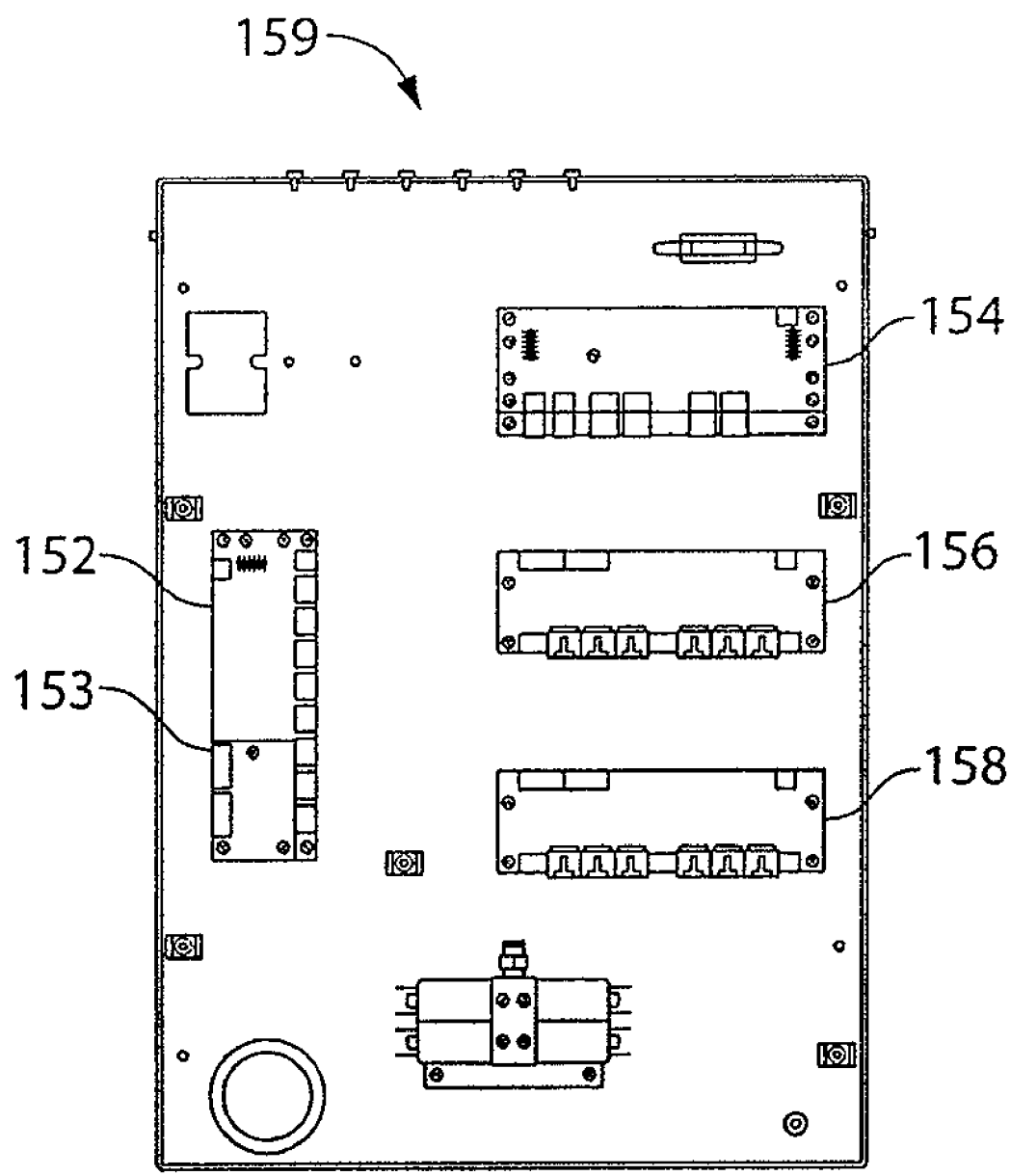
FIG. 5 is a schematic view of the control box for the base-mix module of FIGS. 2-4.
Figure 6:
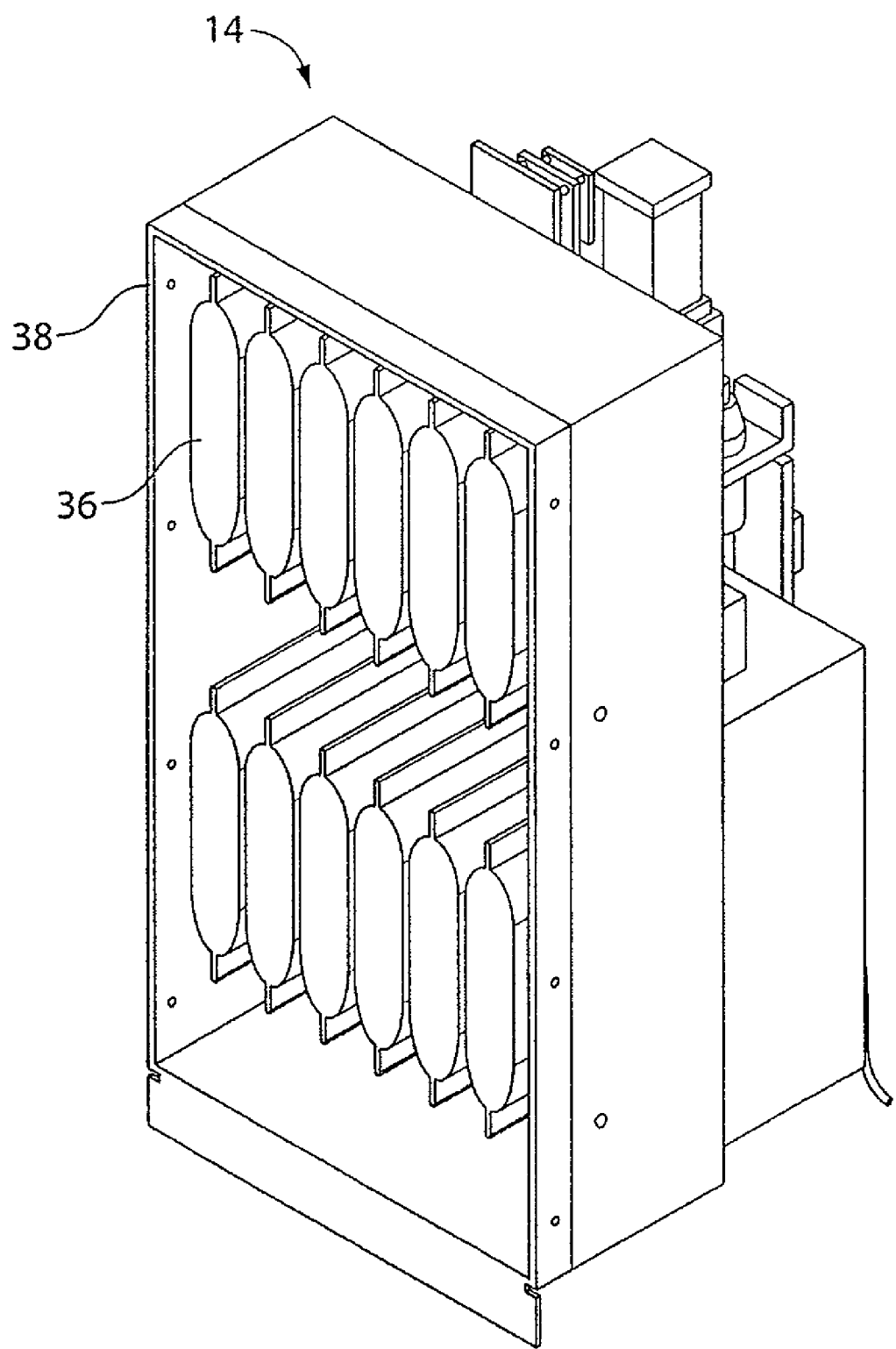
FIG. 6 is a perspective view of one embodiment of a flavor module for use in the food service machine of FIG. 1.
Figure 7:
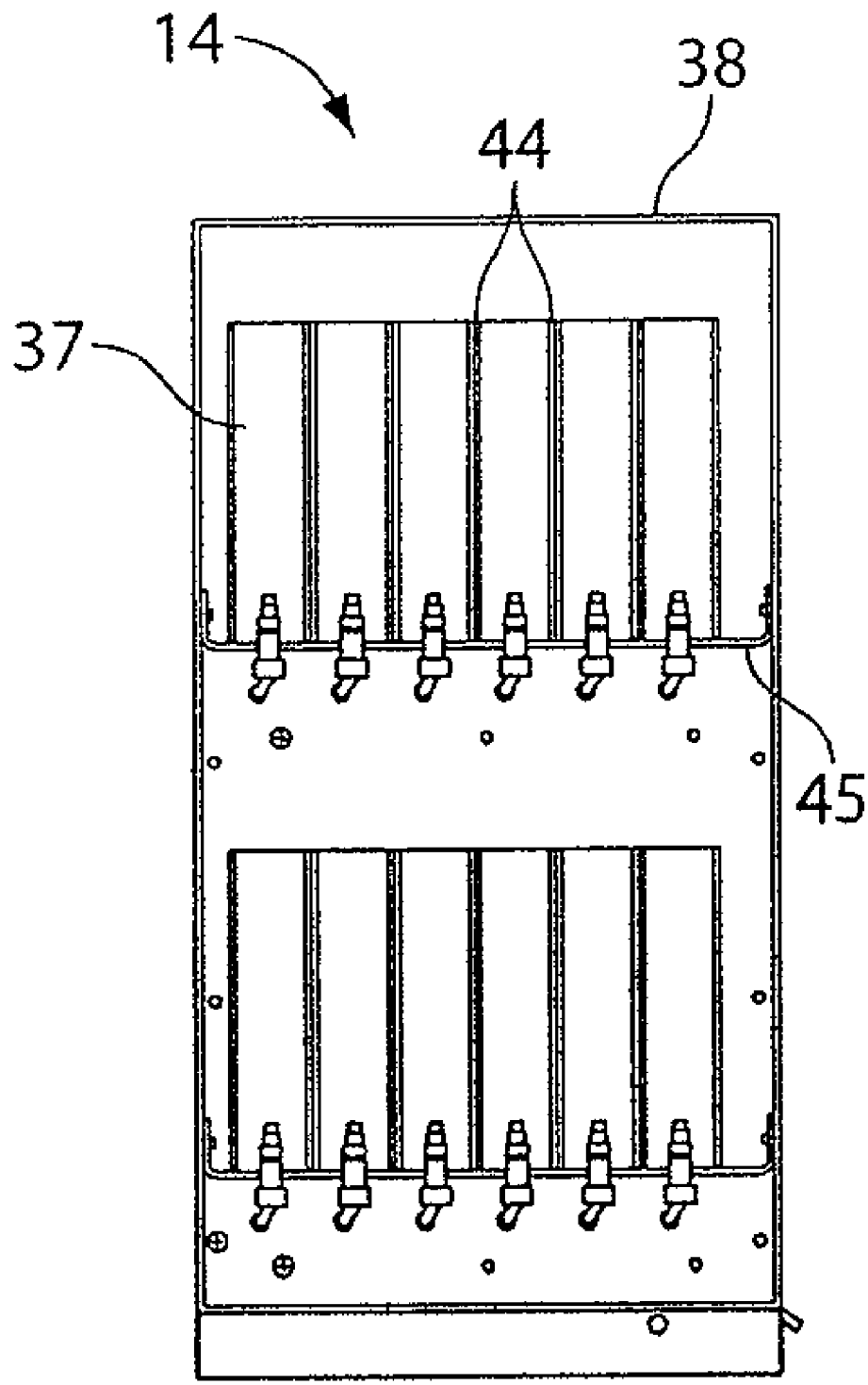
FIG. 7 is a front view and FIG. 8 is an exploded schematic perspective view of FIG. 6.
Figure 8:
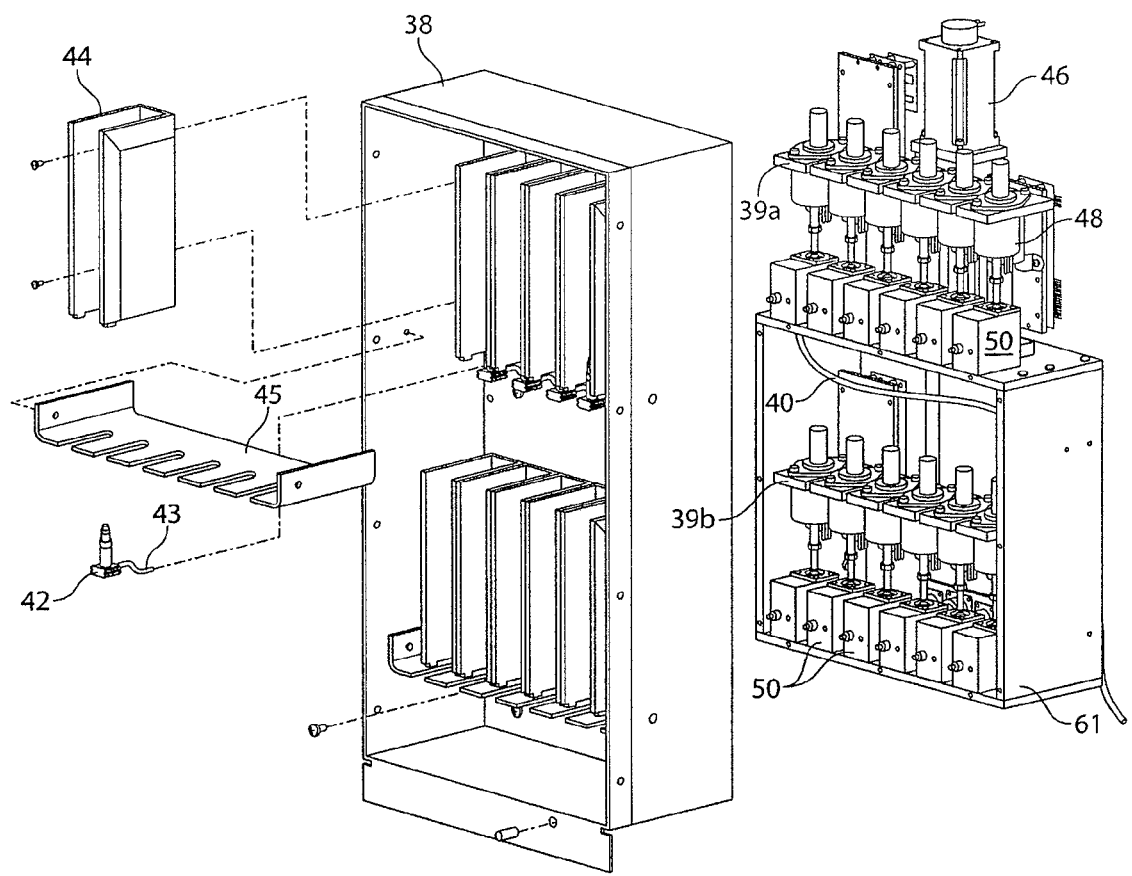

More specifically and with reference to the embodiment illustrated in FIGS. 4 and 5, the base-mix-module sub-controller 159 includes four (4) cards, i.e., a digital input/output (I/O) board 153 with a CANOpen gateway 153, an analog I/O board 154, a first motor control board 156 for operating the first pump 26*a*, and a second motor control board 158 for operating the second pump 26*b* (the pumps are shown in FIG. 2). In one embodiment, the analog board and the motor control boards are daisy-chained to the digital I/O board. The purpose of the analog card is to receive thermocouple information from appropriately placed thermocouple(s), the thermocouple information allows the system to control the base refrigeration system to hold the base mix temperature within a specified temperature range, e.g., at or below about 41 degrees Fahrenheit (5° C.).

The Flavor Module

With reference to FIGS. 6 to 12, one embodiment of a flavor module 14 includes a plurality of flavor-packet holding bays 37 defined by brackets 44 and shelf (shelves) 45. Each holding bay 37 holds a flavor packet 36. The illustrated flavor module 14 includes a plurality of, e.g., 12, positive-displacement pumps 50 attached to pump frame 61 (shown in FIGS. 7-9) to form two pump banks 50a, 50b. Each pump 50 couples to a holding bay 37 via a fitting 42 and tubing 43. An operator can attach the fitting 42 to a container (e.g., a bag) of flavoring and insert the flavor container into a holding bay 37. Flavor flows from a flavor container through the fitting 42 and tubing 43 into a displacement pump 50. Thus, displacement pumps 50 receive flavoring from flavor containers/packets held in the holding bays 37.

Figure 11:
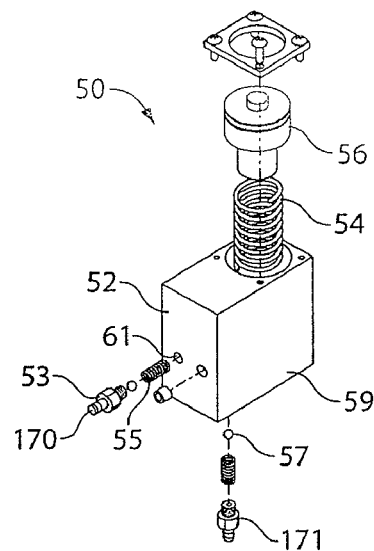
FIG. 11 is an exploded perspective view of a positive-displacement pump.

With reference to the embodiment of FIG. 11, the pump 50 includes a piston 56 seated on top of the pump body 59 and supported by a piston spring 54. The pump 50 further includes a check valve system. Each check valve includes a barb fitting 53, a spring 55, and a ball 57. An inlet check valve 170 is on the front side 59, i.e., the side having two orifices; and an outlet check valve 171 is on the bottom of the pump 50.

The illustrated flavor module 14 includes a plurality of, e.g., twelve, electrical solenoids 48 coupled to slidable support plates 39a, 39b to form two solenoid banks 39c, 39d. Support plate 39a slidably couples with two support shafts (one of which is designated 59a and the other of which is not shown). Similarly, support plate 39b slidably couples to two support shafts 59b, 59c. Thus, the support plates can slide up and down on their support shafts.

The flavor module 14 includes a linear-drive motor 46 coupled to the slidable, support plates 39a, 39b to drive the support plates along the support shafts so as to bring the solenoid banks 36c, 39d in (or out of) contact with the pump banks 50a, 50b. When the solenoid banks 39c, 39d come in contact with the pump banks 50a, 50b, each solenoid 48 engages with an associated displacement pump 50 to cause at least one displacement pump 50 to dispense flavoring. The flavor module 14 further includes a flavor-module sub-controller in communication with each of the solenoids 48 and with the linear-drive motor 46. The sub-controller controls each of the solenoids 48 and the linear-drive motor 46 so as to select and energize at least one solenoid 48 and to operate the linear-drive motor 46 to drive a slidable support plates 39a/39b, moving the associated solenoid bank 39c/39d relative to the displacement pumps 50 such that an energized solenoid 48 causes an associated displacement pump 50 to dispense flavoring. More specifically, in the illustrated embodiment (see FIGS. 9, 10 and 12), the flavor-module sub-controller includes a linear-drive board 13 for operating the linear drive 46, a first solenoid-bank board 11 for operating the first solenoid bank 39c, and a second solenoid bank board 15 for operating the second solenoid bank 39d. Thus, in one embodiment the system uses a single precisely controlled conventional linear actuator to drive and pump a number of, e.g., twelve, different flavors.

Figure 9:
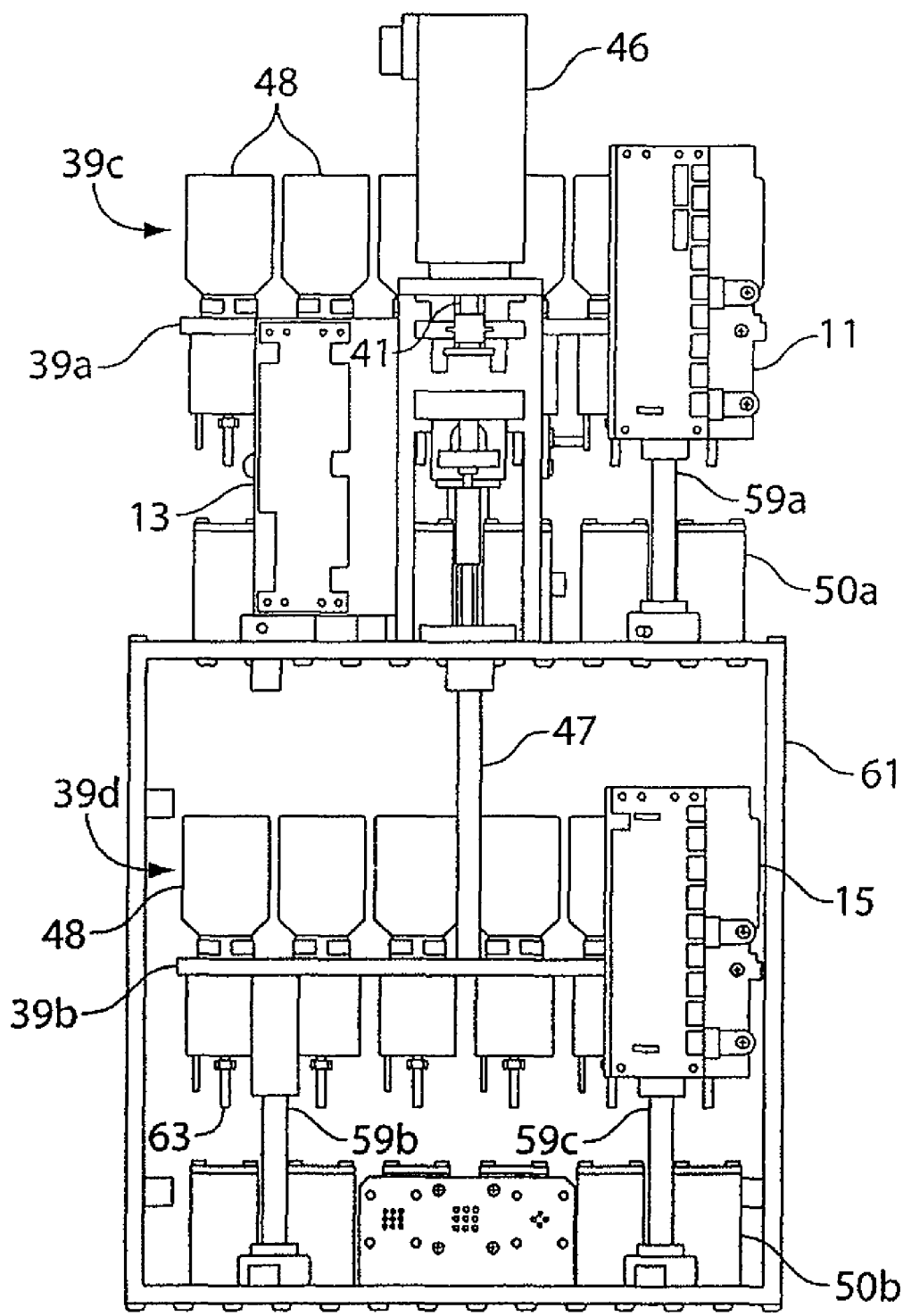
FIG. 9 is a back view of the flavor module of FIG. 6.
Figure 10:
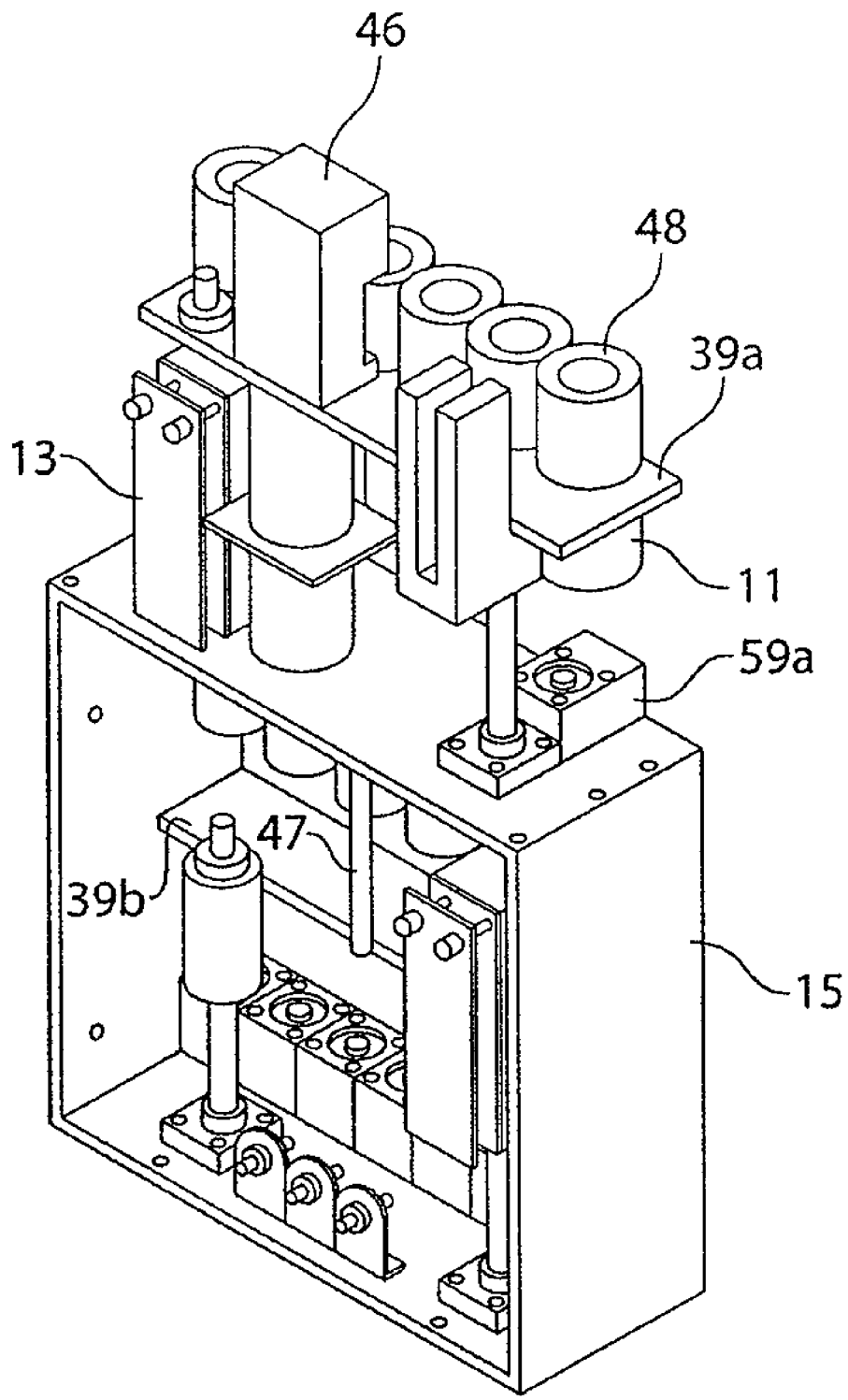
FIG. 10 is perspective view of the back of the flavor module of FIG. 6.
Figure 12:
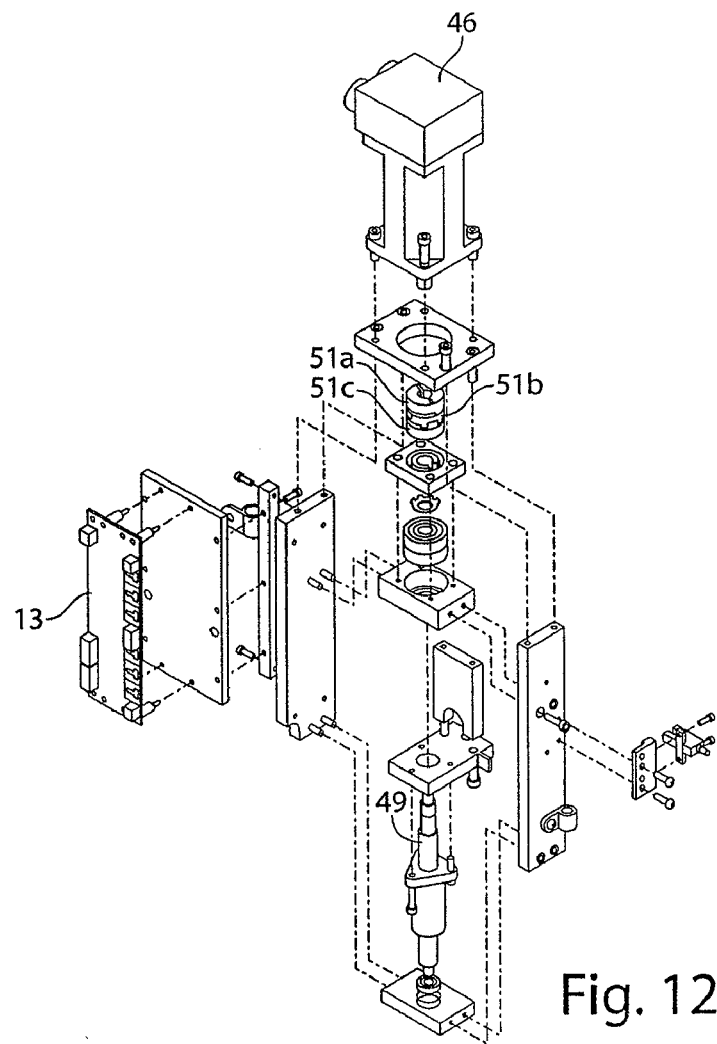
FIG. 12 is another exploded schematic perspective view of portions of FIG. 6 including a linear drive.

With reference to FIGS. 9 and 12, linear-drive motor 46 includes a drive shaft 41 connected via a coupling assembly (including hubs 51a, 51c and disc 51b) to a male/female screw (not shown). The male part of the screw is on a coupler shaft 47 and the female part is on the housing. The male/female screw assembly provides precise position control. The precision control assembly is a conventional assembly. As noted above, support plates 39a, 39b support solenoids 48 to form solenoid banks 39c, 39d. The coupler shaft 47 (see FIG. 10) coming down from the linear motor 46 directly attaches to the support plates 39a, 39b. As noted above, the top support plate 39a has two support shafts and the bottom support plate 39b has two support shafts. The support shafts connect to the support plates with precise bearings to keep the support plates parallel and square with each other so that as the linear-drive motor moves the support plates, it moves both plates simultaneously and in a controlled manner. In other words, in one embodiment the lead screw and motor assembly move the top plate 39a and the bottom plate 39b as a single unit.

In operation, when a user selects a flavor, the flavor module control scheme determines which pump e.g., of twelve available pumps—corresponds with a selected flavor/pump. The flavor module control scheme run by the main controller energizes the solenoid associated with the selected flavor. Energizing the appropriate solenoid 48 locks the solenoid rod 63 extending from the bottom of the solenoid 48. All other solenoids are left in an un-energized state, which allows their rods to move up and down freely. Then the linear-drive motor (actuator) 46 drives the solenoid banks 39c, 39d down into contact with the pump banks 50a, 50b. A flavor-module sub-controller, e.g., an appropriately programmed PC, provides instructions to the linear-drive motor (actuator) 46 on how fast to accelerate, how fast to move through the full acceleration and how long to operate which determines the displacement (length of stroke) of the single linear-displacement motor 46.

The solenoid rod 63 for the energized solenoid 48 is stationary and all the other solenoid rods are free to move longitudinally, e.g., up and down. Thus only the solenoid rod 63 for the energized solenoid 48 pushes down on an associated pump piston 56, which is resisted by spring 54. The other 11 solenoids are at rest and their solenoid rods are thus free to move inside their associated solenoid bodies. In other words, when the metal rod inside the coil of the resting, i.e., non-energized, solenoid 48 encounters a pump piston 56 it merely slides in the solenoid body without displacing the piston 56.

The displacement pumps 50 are already full of flavor because of a previous stroke. The drive shaft 41 of the linear-drive motor 46 downwardly displaces the support plates 39a, 39b and associated solenoid banks 39c, 39d. As a result, the rod 63 of a selected/energized solenoid 48 pushes down on its associated pump piston 56 and, consequently, the associated pump 50 ejects flavor via its outlet to a flavor-selection assembly 208, e.g., a flavor wheel (see FIGS. 32-35). Pushing against piston 56 displaces the lower check valve 171, and drives material out into a flavor-selection assembly 208. Then, as the drive shaft 41 of the linear-drive motor (actuator) 46 moves back in a controlled manner (not an instantaneous release) to its home position, or base position, the check valve 171 on the bottom seats itself, and the inlet check valve 170 on the front of the pump 50 unseats itself creating a suction on an associated flavor storage bag and the pump 50 refills with flavoring. Thus, a singular linear-drive motor 46 pumps at least one of a plurality of, e.g., twelve, different flavors.

The Mix-Ins Module

With reference to FIGS. 13 and 14, one embodiment of a mix-ins module 16 includes a plurality of mix-in assemblies 65. Each assembly 65 includes an auger block 60 forming a storage container orifice 69 (adapted to receive a mix-in storage container, such as bottle 58); an auger passage 71 coterminous with the container orifice 69 so as to allow flow from the container 58 through the container orifice 69 and then through the auger passage 71; and a dispensing orifice 73 coterminous with the auger passage 71 so as to allow flow through the auger passage 71 and then through the dispensing orifice 73. Each assembly 65 further includes an auger 68 adapted to sit in the auger passage 71 of the auger block 60, the auger 68 having an engagable end 67. The mix-ins module 16 includes a plurality of drive assemblies 66 coupled to the engagable end of the augers 68 via auger drive 62 and operative to drive the augers 68.

The mix-ins module 16 includes a trough assembly 64 having a collection slot 64a and a dispensing opening 64b. The collection slot 64a is aligned with the dispensing orifices of the plurality of mix-in assemblies 65 to form a continuous passage therethrough. In one embodiment, the trough assembly 64 includes a trough cover 64c. The trough assembly 64 receives mix-ins from the mix-in assemblies 65 and dispenses the mix-ins via dispensing opening 64b. The mix-ins module 16 further includes a mix-ins-module sub-controller in communication with each of the mix-in assemblies 65. The sub-controller controls the drive assemblies so that, when mix-ins containers are loaded into the mix-ins module 16, the sub-controller drives the engagable ends 67 to turn the augers to dispense mix-ins. In the illustrated embodiment, the mix-ins-module sub-controller includes a motor control board 150 for operating a motor (not shown) that drives the drive assemblies. The mix-ins sub-controller further includes a CANOpen gateway board 151 in communication with the motor control board 150 and with the main controller via a bus.

Food Preparation Apparatus/Assembly

With reference to FIGS. 15-22, one embodiment of an apparatus for preparing food includes a food-surface assembly 70, e.g., a freeze surface assembly, having a central axis and a periphery. The assembly, shown upside down in FIG. 17, includes an upper freeze plate 86 having a first face (i.e., a rotary freeze surface) 70a and a second face 172 (see FIGS. 15-17). In one embodiment, the base material is aluminum, which facilitates heat transfer and is damage resistant and low weight relative to other practical materials. The first face, which is a highly polished nickel-plated surface, forms a non-stick rotary freezing surface that readily releases food products at low temperatures. The nickel plating provides strength and is conventional for food preparation applications. The nickel plating facilitates the system's ability to scrape ice cream off the surface without the ice cream sticking to the surface.

The second face 172 has a refrigerant channel 85 operative to pass refrigerant. The assembly includes a gasket 84 adapted to couple to the upper freeze plate 86 and operative to reduce cross flow of refrigerant. In one embodiment, the gasket 84 is made of a conventional type of neoprene specifically designed for refrigerant applications. The assembly 70 includes a lower freeze plate 82 coupled to the upper freeze plate 86 so as to sandwich the gasket 84 between the lower and upper freeze plates 82, 86. The lower freeze plate 82 has a first face (not shown) and a second face 173. The first face seals the refrigerant channel 85, leaving the refrigerant channel 85 with an entrance orifice 82a and an exit orifice 82b. A number of screws attach the bottom freeze plate 82 to the upper freeze plate 86. Using a pattern of fastening that places screws adjacent to both sides of the refrigerant channel 85 helps to maintain the channel 85 and facilitates the function of gasket 84.

Thus, the food-surface assembly 70 creates refrigerant passages for the refrigerant to enter the food-surface assembly 70, to circulate around the entire channel 85 and then exit. Liquid refrigerant comes in to entrance orifice 82a, moves through the entire channel and then exits via exit orifice 82b. In an alternative embodiment, copper tubes are pressed into features machined into the upper freeze plate 86. However, elimination of the copper tubing improves the heat transfer characteristic. The assembly 70 further includes an insulation plate 87 coupled to the lower freeze plate 82 and operative to provide insulation to the food-surface assembly 70. In one embodiment, the insulation plate 87 is foam insulation that is glued to lower freeze plate 82. The lower freeze plate 82 includes a number of orifices 82c that are not used for fastening, but that are used for pressure relief so that if the system does build up excessive pressure the pressure will be relieved via the orifices in the lower freeze plate 82.

A thermocouple assembly 88 passes through lower freeze plate 82, and is epoxied with silver filled epoxy to upper freeze plate 86 to within between 0.005 and 0.01 of an inch from the top of the rotary freeze surface 70a. The thermocouple 88 is part of a system that measures the surface temperature and acts as one of a plurality of feedback loops for temperature control.

The apparatus for preparing food includes a drive shaft 265 (shown in FIG. 22) coupled to the food-surface assembly 70. With reference to FIG. 15, the apparatus further includes a drive motor 72 coupled to the drive shaft 265 and operative to rotate the drive shaft 265 causing rotation of the rotary surface about the central axis. More specifically, the drive motor 72 drives a pulley 74 that, in turn, drives a timing belt 76 to drive a pulley 78 attached to the drive shaft 265 (shown in FIG. 22) to rotate the food-surface assembly 70. The apparatus further includes a control box 80 (shown in FIG. 15). The control box 80 contains a sub-controller coupled to the drive motor 72 and operative to control the drive motor 72 to control the rate of rotation of the food-preparation assembly 22. The sub-controller can be a conventional motor control card that adheres to the CANOpen specification, such as motor control cards available from Elmo Motion Control, Inc. of Westford, Mass.

Thermocouple Slip Ring

With reference to FIGS. 15-19, a conventional slip ring assembly (typically used for transmitting power) is used for transmitting temperature measurements from the thermocouple assembly 88 to the sub-controller 80. Thus, the system transmits low voltages through the slip ring assembly, which includes a slip ring 15a, a first slip ring mount 77 and a second slip ring mount 83. A plastic collar 81 helps to keep the slip ring assembly from freezing. If the slip ring assembly gets too cold, moisture from the air can condense on the slip ring assembly either causing the assembly to freeze up or resulting in errant temperature readings. Thus the plastic collar acts as an insulator between the slip ring 15a and the shaft 265 eliminating direct metal-to-metal contact.

The system, also uses a conventional seal 20 as a moisture barrier. The seal 20 keeps moisture out of the system and away from the shaft 265 and any housings to prevent moisture from being pulled into the shaft 265 and housings. Moisture in the system, e.g., on the shaft 265, can freeze and ultimately lock the shaft 265, i.e., prevent rotation of the shaft 265.

Rotary Coupling

With reference to FIGS. 17-22, food-surface assembly 70 contains a fluid path 85. The fluid path 85 has ends that are connected by a rotary coupling 261 to fluid lines leading to and from a primary refrigeration system. The rotary coupling includes an upper seal housing 204 and a lower seal housing 205. The housings are modular housings that hold both support bearings and rotating refrigerant shaft seals. The seals themselves are conventional seals.

The modular design facilitates testing prior to assembly. Thus, system assemblers do not have to wait until the food-surface assembly 70 is installed inside the unit (shown as element 200 in FIG. 1) to test for leaks. Having to wait for full assembly to test for leaks means that when a leak occurs the assemblers have to disassemble the unit, a time-consuming task.

More specifically, with reference to FIG. 22, moving from top to bottom of the figure, is shown a drive shaft 265 and a driven gear 78 and, further down, the upper housing module 204 including a large bearing 283, a seal retainer plate 278 with a set of screws, a channel 275, another retainer plate 283 and another bearing 283. This configuration is repeated in the lower seal housing 205. This configuration creates a refrigerant passage and seals the passage so that the refrigerant does not escape.

Thus, the upper seal housing 204 has an inlet 267 for receiving refrigerant. The refrigerant travels along the center of the shaft 265 via channel 269 where it is coupled to the food-surface assembly 70. The refrigerant passes through the serpentine channel 85 milled in the upper freeze plate 86. The refrigerant then exits the food-surface assembly 70 and travels along the shaft 265 via channel 273 and exits via outlet 271 in the lower seal housing 205.

A mount 281 functions to mount the entire assembly 70 to the primary housing 19. A second plate 279 with an associated nut and bolt assembly allows one to adjust for pitch and yaw to help maintain the physical relationship between the freeze plates and a process box/module 24 that resides above the food-surface assembly 70.

With reference to FIGS. 17, 18 and 22, the food-surface assembly 70 further includes a lower shaft 203 and an upper shaft 210. O-rings 202a provide a face seal between the upper shaft 210 and the inlet 82a and outlet 82b. Similarly O-rings 202b provide a face seal between the lower shaft 203 and the upper shaft 210.

Food Zone Cover

With reference to FIGS. 15, and 23-31, one embodiment of a food-zone cover apparatus 93 includes a cover 90 operative to substantially enclose at least a portion of a substantially horizontal, flat rotary surface 73a (shown in FIG. 16) to create a food zone. In the illustrated embodiment, the shape of the cover 90 mimics at least a portion of the rotary surface; e.g., FIG. 26 shows the shape of the periphery of the cover 90 to include a substantially circular arc 90a, the ends of which are connected by a substantially straight edge 90b. The food-zone cover apparatus 93 includes a final mixing conduit interface 92 coupled to the cover 90 and operative to receive liquid via a final mixing conduit 92a (shown in FIG. 24), the final mixing conduit 92a is operative to deposit a selected amount of liquid product mix on the rotary surface 73a while the rotary surface 73a is rotating so that the liquid product mix spreads out on the rotary surface 73a and sets to form a thin, at least partially solidified, product body. More specifically, a conduit assembly couples to inlet 91 to provide aerated (typically flavored) liquid to the rotary freeze surface 73a below the cover 90.

With reference to FIG. 24, the food-zone cover apparatus 93 includes a scraper 96 coupled to the cover 90 and supported above the rotary surface. The scraper 96 has a working edge 96a engaging the rotary surface 73a (see FIGS. 15 and 16) while the rotary surface 73a is rotating to scrap the at least partially solidified product body into a ridge row on the rotary surface 73a.

The apparatus includes a level 94, e.g., a squeegee, coupled to the cover 90 and spaced above the rotary surface 73a to establish a gap. More specifically, the level 94 has a working edge 94a spaced above the rotary surface 73a to establish a gap between the working edge 94a and the rotary surface 73a. With reference to FIG. 31, one embodiment of the squeegee includes feet 162a, 162b that maintain a specified gap between the working edge 94a and the rotary surface 73a. The level 94 resides in proximity to the mixing conduit outlet 92a such that when the rotary surface 73a rotates in its intended direction the level 94 contacts the food product, e.g., aerated, flavored liquid, before the scraper 96 contacts it so as to level the food product to a specified height on the rotary surface 73a while the rotary surface is rotating prior to the formation of the at least partially solidified product. In one embodiment, the gap/spacing between the working edge of the level 94, e.g., squeegee, and the rotary surface 73a is between about 0.005 and 0.030 inches (i.e., between about 0.13 mm and 0.76) mm. In an alternative embodiment, the gap/spacing is between about 0.015 and 0.020 inches (i.e., between about 0.38 and 0.51 mm).

With reference to FIG. 25, the food-zone cover apparatus 93 includes a rack and pinion structure 110, 111 coup led to the cover 90. The rack and pinion structure has a rack 110 and pinion 111. The food-zone cover apparatus 93 includes a plow 100 coupled to the rack 110 and operative to scrape the ridge row from the rotary surface 73a as food product. The food-zone cover apparatus 93 includes a forming cylinder 98 coupled to the cover 90 and operative to receive the food product from the plow 100.

With reference to FIG. 29, the apparatus includes a diaphragm 160 slidably coupled to the inside of the forming cylinder 98 so as to allow the diaphragm 160 to move longitudinally, i.e., up and down, within the cylinder 98. Downward movement of the diaphragm 160 after insertion of food product in the forming/dispensing cylinder 98 forms the food product into a scoop. In the illustrated embodiment, the bottom portion of the diaphragm 160, i.e., the portion of the diaphragm 160 that comes in contact with the food product, is semi-spherical in shape. However, the diaphragm 160 could take other shapes as is obvious to those of ordinary skill in the art. In the illustrated embodiment, the top of the diaphragm 160 has a mushroom-shaped structure 97a with a donut-shaped cutout 97b below the cap of the mushroom-shaped structure 97a. The donut-shaped cutout 97b receives a diaphragm piston to allow movement of the diaphragm 160 from a first retracted position to a second, extended position.

The apparatus includes a packing/cleaning plate 113 rotatably coupled to the cover 90 via shaft 114. With reference to FIG. 29, the packing plate 113 is positioned below the forming cylinder 98 to provide a food-product packing surface. In operation, a driven, rotating piston 102a rotates the packing plate 113 to clear the opening 98a of the forming cylinder 98. Clearing the opening 98a allows the formed/packed ice cream serving to be pushed out of the forming cylinder 98 into a serving cup by longitudinal, i.e., downward, movement of the diaphragm 160 to its extended position.

With reference to FIGS. 23, 26, 30, 37, and 40, one embodiment of the food-zone cover apparatus 93 interfaces with a process box 24 that includes a set of pistons 97a, 99a, 101a, 102a, 103a, 105a, and 107a, e.g., pneumatically driven pistons. In the illustrated embodiment, the process box 24 is located above the food-surface assembly 70. More specifically, in operation, an operator places the food-zone cover apparatus 93 over the rotary surface 73a and the system lowers pistons 97a, 99a, 101a, 102a, 103a, 105a, and 107a from the process box 24 to hold the food-zone cover apparatus 93/cover 90 in place and to operate the elements of the food-zone cover apparatus 93. Thus, in one embodiment, depending on local health department regulations periodic (e.g., daily) cleaning under normal circumstances can be limited to a region confined by the food-zone cover 90. When cleaning is required, the process box 24 raises its pistons 97a, 99a, 101a, 102a, 103a, 5a, and 107a; and an operator can remove the food-zone cover 90 to facilitate cleaning of the cover 90 and the rotary freeze surface 70a.

Thus, in one embodiment, the food-zone cover apparatus 93 includes a level pneumatic piston interface assembly 106 coupled to the level 94 and operative to interface with at least one pneumatic piston 105a to allow control of the level 94. In the illustrated embodiment, as shown in FIGS. 26, 28 and 37, the interface assembly 106 includes downforce interface 105 for interfacing with level downforce piston 105a and cleaning interface 103 for interfacing with cleaning piston 103a. The level downforce piston 105a presses on the interface 105 including a level downforce shaft to cause the level 94 to engage with the rotary freeze surface 70a. The cleaning piston 103a engages the level 94 to press the level 94 against the rotary freeze surface 70a for the purpose of cleaning the level 94 to reduce carry over from one serving to another. Carry over occurs when one flavor of food product, e.g., ice cream, used in a first serving contaminates a subsequently created serving. The feet 162a, 162b (shown in FIG. 31) are flexible such that, with sufficient force, the feet 162a, 162b bend back and the level 94 presses against the rotary freeze surface 70a for cleaning.

The food-zone cover apparatus 93 includes a pinion pneumatic piston interface 107 coupled to the cover 90 and to the pinion 110a and operative to interface with a pneumatic piston 107a. An electric motor 115 rotates the pinion piston 107a to cause rotation of the pinion 110a and consequently movement of plow 100 attached to rack 111.

As noted above, the food-zone cover apparatus 93 includes a diaphragm pneumatic piston interface 97 coupled to the diaphragm 160 and operative to interface with a pneumatic piston 97a to allow control of the diaphragm 160 to form the food product. The food-zone cover apparatus 93 includes a packing plate pneumatic piston interface 102 coupled to the packing plate shaft 114 and operative to interface with a pneumatic piston 102a. A motor rotates the piston 97a to allow operation of the packing plate 113.

The food-zone cover apparatus 93 further includes a plurality of features 99, 101 in the cover 90 operative to interface with pneumatic pistons to hold the food-zone cover apparatus 93 against the rotating freeze surface 70a. More specifically, depression 99 located on the periphery of the top 90c of cover 90 interfaces with hold down piston 99a. Similarly depression 101, also located on the periphery of the top of cover 90 but, when viewed from above, angularly displaced relative to depression 99, interfaces with hold piston 101a.

With further reference to FIG. 23, the illustrated food-zone cover apparatus 93 further includes a mix-ins receiving port 108 coupled to the cover 90. The port 108 receives mix-ins from the dispensing orifice 73 of the mix-ins trough and distributes the mix-ins onto the liquid product after the level 94 has leveled the liquid food product onto the rotary freeze surface 70a.

Flavor-Selection Assembly/Flavor Wheel

With reference to FIGS. 32-34, one embodiment of a flavor-selection assembly 208 includes a pump motor 210 connected to a pulley assembly 212. The pulley assembly 212 includes a driving gear 212c coupled by a belt 212b to a driven gear 212a. The driven gear 212a in turn couples via shaft 214a to a flavor-distribution-wheel assembly 214. The flavor-distribution-wheel assembly 214 includes a wheel 214c with a plurality of fittings 214b, which form a plurality of nozzles 216a, 216b. In the illustrated embodiment, there are twelve nozzles in the wheel 214c; each nozzle is adapted to connect via tubing to an associated displacement pump 50 in the flavor module 14 described above. The flavor-distribution-wheel assembly 214 further includes an outlet 218 that couples to a common flavoring outlet conduit. With reference to FIGS. 32-34, the center 215 of the flavor wheel 214c has a channel 211 (shown in FIG. 33).

The flavor-selection assembly 208 further includes a sub-controller 209 and a conventional sensor 213 coupled to the sub-controller 209. The sub-controller 209 receives signals from the sensor 213 and controls motor 210 to position the flavor wheel 214c in a home position, e.g., rotating the flavor wheel 214c to align the channel 211 so that it is between two nozzles (such as nozzles 216a and 216b). In this position, no flavor can pass through to outlet 218.

In operation, each flavor enters the flavor wheel 214c via one of the plurality of nozzles (e.g., nozzles 216a, 216b). When the system receives a flavor selection signal, the main controller instructs the flavor wheel sub-controller 209, via bus 209a, to drive motor 210 to rotate channel 211 a specified amount to bring channel 211 into alignment with the nozzle associated with the selected flavor, thereby allowing the flavor in the aligned nozzle to flow through to outlet 218.

A fitting 217 also sits on top of shaft 214a to receive compressed air for cleaning out the outlet 118 and the outlet conduit. As shown in FIG. 37, in one embodiment, the flavor-selection assembly 208 resides in a process box 24 that sits above the food-zone cover apparatus 93 and the food-preparation assembly 22 (shown in FIG. 1).

Conduit Assembly

With reference to FIG. 36, one embodiment of a conduit assembly 120 includes a proximal end 120a and a distal end 120b. The proximal end includes a crow's foot junction 122 having three inlets 121, 123, and 125 and an outlet 122a. The first inlet 121 couples to a conduit, not shown, that in turn connects to conduit 32 via bulkhead conduit-to-conduit union 33 (see FIG. 3). In other words, the first inlet 121 receives a first base mix via a conduit line attached to a first base mix container held in a first base mix tray 30a in the base-mix module 12 of FIGS. 2 and 3. Similarly, the third inlet 125 receives a second base mix via a conduit line attached to a second base mix container held in the second base mix tray 30b in the base-mix module 12. The second inlet 123 couples via a one-way valve 129 and via tubing to a pneumatic module 242 (shown in FIG. 41) for receiving air. The crow's foot junction 122 couples via a female luer lock 141 to tubing 120c.

One embodiment of the conduit assembly's distal end 120b includes a barbed rotating male luer lock adaptor 139 coupled to the distal end of tubing 120c. The adaptor 139 couples to a female luer lock 131. The lock 131 couples to a first inlet of a two-inlet, one-outlet tee connection 137. The second inlet couples via a male luer lock 135 to food grade tubing 133, which in turn couples to the output of the flavor-selection assembly 208 of FIGS. 32-34. The outlet of the tee connection 137 couples via tubing 136 to mixing conduit 127. This configuration allows the conduit assembly 120 to combine base mix, air and flavoring to produce a flavored, aerated mix at the output of mixing conduit 127. In one embodiment, flavored aerated mix is ejected from a distal end of mixing conduit 127 onto the rotating freeze surface 70a of the food-surface assembly 70 shown in FIGS. 15 to 19. More specifically, with reference to FIGS. 23 and 24, the conduit assembly 120 couples to the food-zone cover apparatus 93 and sprays the mix from end 92a onto the rotating freeze surface 70a. Element 92, shown in FIG. 23, is the same as mixing conduit 127 shown in FIG. 36.

Process Box

With reference to FIGS. 37-47, which illustrate components in a process box, one embodiment of the process box 24 includes a conventional electrically operated pneumatic solenoid pump bank 232 (shown in FIG. 39), such as those available form SMC Corporation of America of Indianapolis, Ind. In one embodiment, the solenoid pump bank 232 includes an air inlet 231 and a plurality of, e.g., seven, air outlets 233a, 233b. The air inlet 231 couples to a conventional pneumatic module 242, such as a Gast compressor system available from Ohlheiser Corporation of Newington, Conn., USA. The pneumatic module 242 provides regulated compressed air, e.g., at about 80 psi, to the air inlet 231 of the pump bank 232.

As noted above with respect to the food-zone cover apparatus 93, the process box 24 further includes a plurality of, e.g., seven, pneumatically driven piston assemblies 97b, 99b, 101b, 102b, 103b, 105b, 107b. Each assembly has a piston 97a, 99a, 101a, 102a, 103a, 105a, 107a coupled to a pneumatic cylinder 97c, 99c, 101c, 102c, 103c, 105c, 107c. Each pneumatic cylinder couples to an air output of the solenoid pump bank 232. The solenoid pump bank 232 distributes air pressure to the pneumatic cylinders to operate the piston assemblies. Each piston 97a, 99a, 101a, 102a, 103a, 105a, 107a interacts with an associated piston interface 97, 99, 101, 102, 103, 105, 107 on the food-zone cover 90. As noted above, a conventional pneumatic module 242 couples to the air inlet of the solenoid pump bank 232 and provides compressed air to the solenoid pump bank 232 so that the solenoid pump bank 232 can manage operation of the piston assemblies 97b, 99b, 101b, 102b, 103b, 105b, 107b to control interaction of the pistons 97a, 99a, 101a, 102a, 103a, 105a, 107a with associated piston interfaces 97, 99, 101, 102, 103, 105, 107 on the food-zone cover 90.

With reference to FIG. 41, the pneumatic module 242 includes a holding tank 246 that provides food grade air to an air compressor 244. The air compressor 244, in turn, provides compressed air to a first regulator 248 and to a second regulator 250. The first regulator 248 provides regulated air at a specified pressure, e.g., 80 psi, to the solenoid pump bank 232 in the process box 24. The second regulator 250 provides food-grade air at a specified pressure, e.g., 40 psi, to the conduit assembly 120.

Packing-Plate Piston Assembly

Having described the process box 24 in general, with reference to FIGS. 42 and 43, one embodiment of a packing-plate piston assembly 102b located in the process box 24 includes a post 274 coupled to a base 276. The post 274 couples to a proximal end of an arm 268 via a pin 270. A cylinder 102c couples to the base 276 and to a midsection of the arm 268 so as to raise and lower the arm 268. A distal end of the arm 268 couples to a piston shaft 266 via a shaft end 272. Thus, actuating the cylinder 102c lowers the shaft 266. A gear 264 slides onto the shaft 266 and affixes to the shaft 266 in a concentric arrangement. The packing-plate piston assembly 102b further includes a motor 260, which drives a pinion 262. The driven pinion 262, in turn, drives gear 264 to rotate the piston shaft 266.

Thus, with reference to FIGS. 42, 43 and 23, in operation, the process-box sub-controller actuates the cylinder 102c to lower the piston shaft 266, which engages piston 102a with piston interface 102. The process-box sub-controller then energizes motor 260 to rotate the piston shaft 266, which in turn rotates packing plate 113 to operate the packing plate 113.

Packing-Piston Drive Assembly

With reference to FIGS. 44 and 45, one embodiment of a packing-piston drive assembly 97b located in the process box 24 includes a cylinder 97c mounted on a bracket 284, which in turn is mounted on a bottom plate 286. The packing-piston drive assembly 97b also includes a piston guide 288 that also mounts on the plate 286 so as to cover orifice 292. A top plate 290 attaches to cylinder 97c and guide 288. The packing piston 97a slidably engages with the bottom plate 286 and with guide 288 via orifice 292. Attached to the cylinder 97c is a sliding cylinder plate 280. Attached to the cylinder plate 280 is piston-attachment plate 282, which also attaches to piston 97a. Thus, when the process-box sub-controller actuates the cylinder 97c, the cylinder 97c drives the piston 97a down to interact with interface 97 to operate the diaphragm 160 (described above with respect to the food-zone cover 90). In one embodiment, pin 290 (shown in FIG. 38) engages with slot 97b (shown in FIG. 29).

Rack-and-Pinion Drive Assembly

With reference to FIGS. 46 and 47, one embodiment of a rack-and-pinion drive assembly 107b located in the process box 24 includes a post 294 coupled to a base 296. The post 294 couples to a proximal end of an arm 298 via a pin 297. A cylinder 107c couples to the base 296 and to a mid-section of the arm 298 so as to raise and lower the arm 298. A distal end of the arm 298 couples to a piston shaft 107a via a shaft end 295. Actuating the cylinder 107c lowers the piston shaft 107a. A gear 291 slides onto the shaft 107a and affixes to the shaft 107a in a concentric arrangement. The rack-and-pinion drive assembly 107b further includes a motor 289, which drives a pinion 293. The driven pinion 293 in turn drives gear 291 to rotate the piston shaft 107a.

Thus, with reference to FIG. 46, in operation, the process-box sub-controller actuates the cylinder 107c to lower the piston shaft 107a, which engages with piston interface 107. The process-box sub-controller then energizes motor 289 to rotate the piston shaft 107a, which in turn rotates pinion 110a to operate the plow 100 (pinion 110a and plow 100 are shown in FIG. 25).

The other four piston assemblies, i.e., 99b, 101b, 103b, 105b, are conventional piston assemblies Primary Refrigeration System With reference to FIG. 48, one can describe the architecture of one embodiment of the primary refrigeration system 300 for the food-preparation assembly 22 by describing the loop(s) through which refrigerant travels during various modes of operation of the primary refrigeration system 300 under the control of the apparatus controller or a sub-controller governed by the apparatus controller. The controllers and sub-controllers of this apparatus can each include software stored on a computer-readable medium that is coupled with a processor; the software includes code for generating instructions for the components, described below, to carry out the various processes consequent to appropriate input being sent to the controller and sub-controllers.

Cooling

During cooling, i.e., when the primary refrigeration system 300 brings the food-surface assembly 70 down from ambient temperature to a set point, a cooling loop starts when the apparatus controller sends an instruction to the compressor 326 to start pumping to start the refrigerant gas flowing from the compressor 326 via a compressor discharge line 306 to a condenser 302. Stated differently, the compressor 326 discharges refrigerant in the form of relatively hot and high-pressure gas into the condenser 302. The controller also sends an instruction to start a fan that blows ambient air over the condenser 302 transferring heat in the gas to the ambient air; the fan blows the ambient air out of the unit. By cooling the hot gas, the hot gas is changed into a warm liquid. Under normal operation, the controller keeps a defrost solenoid 310 (an alternate loop) closed, which sends all of the refrigerant through the condenser 302.

The liquid flows from the condenser 302 into a receiver 304, which stores liquid for the refrigeration system 300. The liquid flows through a filter drier 308, which removes particulates, acid and moisture from the refrigerant. Then the liquid flows through a coil situated in the bottom of the suction accumulator 324. The warm liquid in the coil boils off any liquid coming into the suction accumulator 324 via suction line 323.

The liquid then flows from the suction accumulator 224 through a liquid solenoid 311, which is governed by the controller to provide on/off control to a liquid thermal-expansion (TX) stepper valve 312. The main (apparatus) controller, using a control algorithm with a wet/dry thermistor 326 as an input, controls the liquid flow into the food-surface assembly 70. As noted above, the apparatus controller communicates via a bus to sub-controllers using a protocol such as the CANOpen protocol. In one embodiment, the primary-refrigeration-system sub-controller includes digital I/O board with an CANOpen gateway and two analog I/O boards. The sub-controller further includes first and second stepper controller boards daisy-chained to the digital I/O board. The controller and sub-controllers are also coupled (e.g., via wires or via wireless communication equipment) with each of the various sensors and control mechanisms in the system 300.

The sub-controller feeds an excess of liquid into the food-surface assembly 70, which keeps the wet/dry thermistor 326 at the food-surface assembly exit wet, i.e., the refrigerant passing the thermistor 326 is at least partially in a liquid state. As the liquid refrigerant passes through the food-surface assembly 70, it boils, cooling the food-surface assembly 70. More specifically, when the refrigerant passes through the liquid-stepper expansion valve 312, the refrigerant experiences a pressure drop that turns the liquid into a cold liquid with some gas. The system injects the refrigerant in this state into the food-surface assembly 70, where the cold liquid chills the food-surface assembly 70. In the process of cooling the food-surface assembly 70, much of the liquid boils off into a gas. The liquid and gas mixture leaves the food-surface assembly 70 and passes through the suction accumulator 324. The excess liquid collects in the bottom of the accumulator 324 where it is boiled by the warm liquid coil. The refrigerant gas leaves the accumulator 324 and returns to the compressor 326.

More specifically, the liquid stepper valve 312 is a conventional electronically controlled needle valve. The liquid stepper valve 312 passes the liquid refrigerant, via a liquid stepper discharge line 313 and via a rotary coupling 314a, into the food-surface assembly 70. A thermocouple 318 facilitates measurement of the temperature of the food-surface assembly 70. The refrigerant then exits the food-surface assembly 70 via a rotary coupling 314b and travels back to suction accumulator 324 via a food-surface assembly discharge line 321. In the illustrated embodiment, the discharge line 321 has a serpentine section 325 having a length of about 8 feet or more with a plurality of turns, e.g., four to eight bends. A pressure transducer 320 measures the pressure just prior, i.e., just upstream, to the serpentine section 325. The thermistor 326, mentioned above, measures the temperature in the discharge line on the downstream side of the serpentine section 325. In one embodiment, the primary refrigeration system 300 uses a conventional refrigerant, such as R404A. However, the primary refrigeration system can use other refrigerants, such as R507.

After a period of time, the food-surface assembly 70 temperature sensor (e.g., thermocouple 88) measures that the food-surface assembly 70 has reached a set point. The thermocouple 88 communicates this reading to the sub-controller, which is programmed with software stored on a computer-readable storage medium. The processor in the controller, when processing this code in combination with the reading from the thermocouple 88, initiates operation of a temperature-control loop.

Temperature Control

In order to artificially reduce the cooling capacity of the cooling loop (to maintain the set-point temperature), the controller causes a false load to be introduced. Thus, with reference to FIG. 49, the controller, in addition to governing the cooling loop (the inner loop, shown as loop 1), also governs a temperature-control loop (the outer loop, shown as loop 2), wherein hot gas from the compressor discharge line is sent through a hot-gas solenoid 327. The hot gas then travels through a hot-gas stepper valve 322 (a proportionally controlled valve) and enters the cooling loop (loop 1) at a point 323 proximate to the beginning of the serpentine section 325. In the illustrated embodiment the hot gas from the hot-gas stepper valve 322 enters the food-surface assembly discharge line 321 downstream from the location of the pressure transducer 320. The controller governs the hot-gas stepper valve 322 to control the amount of hot gas that passes into the food-surface assembly discharge line 321.

A hot-gas valve control scheme controls on temperature. If the temperature of the food-surface assembly 70, as measured by thermocouple 88, is below the set point, the controller sends an instruction to the hot-gas valve 322 to open by an amount that is proportional to how far the temperature of the food-surface assembly 70 is below the set point and proportional to how long the temperature of the food-surface assembly 70 has been below the set point. The software run by the controller utilizes a Proportional Integral and Derivative (PID) loop. Thus, the temperature-control loop (loop 2) applies a false load to the compressor 326 reducing the capacity of the cooling loop to cool the food-surface assembly 70.

Modes/Control States

Pull Down

The controller governs the primary refrigeration system 300 to operate in a variety of modes. In pull-down mode, the mode in which the temperature of the food-surface assembly 70 is brought down from ambient temperature to a set point, the controller sends commands to the refrigeration system 300 to bring the temperature of the food-surface assembly 70 to the temperature that is needed to make ice cream. In one embodiment, the goal for pull-down mode is to achieve the set-point temperature, e.g., 12 degrees Fahrenheit, to within plus or minus one degree for 30 seconds. The pull-down modes starts with the hot-gas valve 322 in the off position, the liquid stepper valve 312 is at a boosted set point, e.g., about 280 steps where the valve 312 ranges from 0 to 380 steps (380 steps being completely open). Once the system is within a specified range, e.g., within 10 degrees, of the set-point temperature, the controller sets the liquid stepper valve 312 to a normal set value, e.g., 135 steps.

Idle/Standby

Once the system achieves the set point to within plus or minus one degree for 30 seconds, the controller (based on the communication of the temperature to it) instructs the system to transition from pull-down mode to idle mode. Idle mode is a mode in which the system is ready to make food product, e.g., ice cream. Once the system starts spraying liquid onto the food-surface assembly 70, within less than a ten second interval, the primary refrigeration system 300 sees a large heat load because the primary refrigeration system 300 changes the state of the sprayed material from a liquid (mostly water) to an at least partially frozen food product, e.g., ice cream. In other words, in one embodiment, the primary refrigeration system 300 freezes a serving's worth of water, which involves a change of state of the water, requiring a large amount of energy in a very short period of time relative to maintaining the temperature of the food-surface assembly 70 in an idle state.

Once, in idle mode, the controller no longer controls the system based on a direct measurement of the temperature of the food-surface assembly 70. Rather, the controller controls based on readings communicated to the controller from the pressure transducer 320.

The pressure transducer 320 is used to determine the refrigerant temperature in the food-surface assembly 70. The refrigerant for any given pressure only boils at one temperature. So if one measures the pressure in the food-surface assembly discharge line, then one can determine the temperature of the refrigerant. Pressure/temperature curves for various refrigerants, such as R404A and R507, are well known and readily obtained. The controller also controls the hot-gas stepper valve 322 based on readings received from the pressure transducer 320 rather than on readings from the thermocouple 88 because of the sensitivity of the temperature of the food-surface assembly 70 to the food product when food product is placed on the food-surface assembly 70 during an ice-cream-making mode.

The control scheme is self-correcting. Once the primary refrigeration system 300 transitions into idle mode, the controller determines saturation temperature, the boiling temperature of the refrigerant, based on the first measurement of pressure by the pressure transducer 320. The controller then uses that saturation temperature as a set point.

The controller controls transition from pull-down mode to idle mode and controls the hot-gas valve 322 in idle mode in an effort to directly control the temperature. In contrast, the controller controls the liquid thermal-expansion stepper valve 312 so that the thermistor 326 indicates that the refrigerant is in a wet state, i.e., the refrigerant passing the thermistor 326 is at least partially in a liquid state.

In one embodiment, the controller causes flooding of the food-surface assembly 70 so that the system has excess liquid at the exit from the food-surface assembly 70. Flooding the food-surface assembly 70 ensures that the food-surface assembly 70 is fully active with refrigerant boiling across the whole food-surface assembly 70. To achieve a flooded food-surface assembly 70, the controller monitor readings from the thermistor 326 to monitor the state of the refrigerant.

More specifically, in order to maintain the refrigerant in a wet state, the controller evaluates the resistance across the thermistor 326 periodically, e.g., every thirty seconds, and controls the liquid stepper valve 312 in response to those measurements. The thermistor 326 is a a type of resistor used to measure temperature changes, relying on the change in its resistance with changing temperature.

If one assumes that the relationship between resistance and temperature is linear, then one can state the following:

$$\Delta R = k \Delta T$$

where
$\Delta R$=change in resistance
$\Delta T$=change in temperature
k=first-order temperature coefficient of resistance When the refrigerant transitions from a dry state to a wet state, it becomes colder. Assuming k is positive, when the temperature of the refrigerant becomes colder, the resistance measured by the thermistor 326 drops. Assuming a constant current source, a drop in thermistor resistance results in a voltage drop across the thermistor 326. In one embodiment, a refrigerant dry state is defined as corresponding to a 5-volt drop, and a refrigerant wet state is defined as corresponding to a 2-3 volt drop. Thus, the controller monitors readings from the thermistor 326 periodically, e.g., every 30 seconds, and if the thermistor voltage drop does not indicate a wet state, the controller adjusts the liquid stepper valve 312 in an attempt to return the refrigerant to a wet state.

Stated differently, the controller uses the liquid stepper valve 312 to control the quantity of liquid at the wet/dry thermistor 326 to keep the food-surface assembly 70 flooded. When the liquid stepper valve 312 opens up, it increases the quantity of refrigerant in the system, which in turn raises the pressure in the food-surface assembly discharge line measured by the pressure transducer 320, which in turn changes the temperature, which causes the hot-gas valve 322 to react. Thus, the liquid stepper valve 312 and hot-gas valve 322 systems are interdependent.

When a system designer designs a typical refrigerant system, generally the designer does not care much about where the position of liquid refrigerant is in the system, other than not wanting it in the compressor 326. Other than that, all a designer is typically trying to do is to maintain some temperature in some environment.

In the present invention, it is helpful to maintain the food-surface assembly 70 in a flooded state. In other words, in one embodiment, the system attempts to ensure that at least some refrigerant remains in liquid state during the refrigerant's path through the serpentine channel in the food-surface assembly 70.

Maintaining the food-surface assembly 70 in a flooded state has advantages. When a temperature change of a liquid, e.g., refrigerant, involves boiling, i.e., the state transition of a liquid to a gas, the temperature change involves a large energy transfer relative to a similar temperature change not involving a state transition. By maintaining the refrigerant in a liquid state, the controller maintains the ability to have a relatively large influence on the temperature of the food-surface assembly 70 in a relatively short amount of time.

In addition, maintaining a flooded state helps maintain temperature stability across the entire rotating freeze surface 70a [e.g., one embodiment of the food-surface assembly 70 has a 19-inch diameter (48-cm) freeze surface], and it provides the controller with relatively precise control of the temperature because the controller does not need to adjust the system for the possibility that the refrigerant might turn completely to gas in the evaporator/food-surface assembly 70; the refrigerant is always in an at least partially liquid state. In one embodiment, the controller maintain the temperature in the primary refrigeration system within +/−1 degree Fahrenheit (F) (+/−0.55° C.) and maintains uniformity of the temperature across the freeze surface 70a to within +/−1° F.

As noted above, when the system 300 first enters pull-down mode, the controller sets the liquid valve at a boosted set value, e.g., 280 steps in a range of 0-380 steps. Once the system is within a specified range, e.g., within 10 degrees, of the set-point temperature, the controller sets the liquid valve to a normal set value, e.g., 135 steps. Once the system transitions into idle mode, the controller adjusts the liquid valve setting to maintain the refrigerant at the thermistor 326 in a wet state.

Making Ice Cream

When the system 300 is in idle mode, it is ready to make ice cream. With reference to FIG. 53, at state 0, a user indicates via user controls, e.g., a graphical user interface, that the user wants the unit to make a selected ice cream serving. In response, after a predetermined amount of time and before, the controller generates instructions to cause the spraying of food product onto the food-surface assembly 70; and the main controller enters a pre-cold stage, state 1. The food product is only on the food-surface assembly 70 for about ten seconds. At state 1, the main controller shuts down the hot-gas valve 322 and sets the liquid valve 312 to the boosted set value, e.g., about 280 steps. At state 2, the food product is sprayed onto the food-surface assembly 70. At state 3, the food product, now in the form of frozen food product, e.g., ice cream, leaves the food-surface assembly 70.

Once the food product leaves the food-surface assembly 70, the controller monitors the temperature of the food-surface assembly 70. The controller transitions the system 300 to the next state, state 4, once the temperature of the food-surface assembly 70 is below the food-surface assembly temperature set point, e.g., 12° F. (−11° C.). If the food-surface assembly temperature is below the set point when the food product comes off the food-surface assembly 70, then the controller automatically transitions the system to state 4. Otherwise, the controller waits until the temperature of the food-surface assembly 70 is below the set point to intitiate the transition. The controller polls the thermocouple 88 periodically to monitor the food-surface assembly temperature, e.g., every 100 ms+/−30 ms, to determine when to make transitions that depend on the temperature of the food-surface assembly 70. At the transition, the controller sends an instruction to the hot-gas valve 322 to open to the value it had at state 0. A predetermined amount of time is taken for the hot-gas valve 322 to achieve the state 0 value. When the hot-gas valve 322 achieves the state 0 value, the controller transitions the system to state 5.

The controller transitions the system to the next state, state 6, when the controller determines, by monitoring the pressure transducer 320, that the saturation temperature has recovered (e.g., when the saturation temperature is greater than or equal to the original saturation temperature set point plus some predetermined amount). Once the system is transitioned to state 6, the controller instructs the liquid stepper valve 312 to return to the value it had at state 0, the state 0 value or normal set point value (e.g., about 130 steps). As with the hot-gas valve 322, a predetermined amount of time is utilized for the liquid stepper valve 312 to achieve the normal set-point value.

As noted above, the main controller communicates with sub-controllers including the primary-refrigeration-system sub-controller using a protocol such as the CANOpen protocol. One can refer to each sub-controller or module with which CANOpen communicates as a node. There are stepper controllers for the hot-gas valve 322 and for the liquid thermal-expansion valve 312. There are different processes running on the host computer that will tell each different node what to do.

In one embodiment, the program that controls the main controller is written in the C programming language and follows the CANOpen specification to achieve communication with sub-controllers including the primary-refrigeration-system sub-controller.

Defrost Loop/Mode

With reference to FIG. 50, the defrost loop begins with refrigerant gas flowing from the compressor 326 through the discharge line 306 to the defrost solenoid 310. The defrost solenoid 310 couples the compressor discharge line 306 with the liquid stepper discharge line 313. The defrost mode thaws the food-surface assembly 70 out. In other words, in defrost mode the system raises the food-surface assembly temperature so that the food-surface assembly 70 can be cleaned. During defrost mode, the main controller closes the liquid solenoid 311 and the hot-gas solenoid 327 so there is no flow down the cooling loop and the temperature-control loop. The defrost solenoid 310 is open so refrigerant gas, which is hot from the compressor, is directed into the food-surface assembly 70. The hot refrigerant gas returns through suction line 323 and through the suction accumulator 324 back to the compressor 326. Thus, the defrost loop provides a loop of warm gas that flows through the food-surface assembly 70 warming the food-surface assembly 70 to a defrost set-point temperature. Over a period of time, e.g., three to five minutes, the food-surface assembly 70 warms up, when the food-surface assembly thermocouple 88 determines that the food-surface assembly 70 has reached a set point, e.g., 48 degrees Fahrenheit, the main controller terminates defrost mode and turns the defrost solenoid 310 off. Once the food-surface assembly 70 portion of the food-preparation assembly 22 has reached the defrost set-point temperature, an operator can then clean the food-surface assembly 70 and associated areas, e.g., the operator can wipe down the rotary freeze surface 70a.

Depending on the requirements of the user of a system according to the invention, the user can instruct the system via user controls, e.g., a graphical user interface, to enter the defrost mode periodically, e.g., once a day typically at the end of the day.

Controls

With reference to FIG. 51, the primary refrigeration system 300 includes a hot-gas valve sub-controller 328 for controlling the temperature of the food-surface assembly 70. As noted above, the sub-controller 328 monitors the surface temperature of the food-surface assembly 70 via thermocouple 318 and the suction pressure via pressure transducer 320.

With reference to FIG. 52, the primary refrigeration system 300 includes a liquid stepper control 330 for controlling the flow of liquid refrigerant into the food-surface assembly 70. As noted above, the control 330 monitors thermistor 326 and opens and closes the liquid stepper valve 312 to keep the thermistor 326 in what is referred to as a "wet zone."

Control States

In one embodiment, the control states for the primary refrigeration system 300 are the following: initialization; stopped; pull down (startup); standby; ice cream cycle (7 steps); defrost; fault; and override/diagnostics.

"Initialization" is the process of turning the machine on. "Stopped" involves stopping the primary refrigeration system. "Pull down" occurs when the food-surface assembly 70 is above the set-point temperature, e.g., at ambient temperature, and the primary refrigeration system pulls the food-surface assembly 70 down to the set point. In one embodiment, the pull down process from room temperature takes about twenty minutes.

The primary refrigeration system 300 uses conventional proportional integral and derivative control. Proportional integral and derivative control is a form of control appropriate for a system that cannot move from a given environmental condition to the set point simply as a step function. In other words, proportional integral and derivative control is a form of control appropriate for a primary refrigeration system that cannot move the food-surface assembly 70 from 85° F. (29° C.) linearly and directly to 12° F. (−11° C.). Proportional integral and derivative control typically achieves a set point via a sinusoidal closed wave function. A primary refrigeration system using proportional integral and derivative control and having a 12° F. (−11° C.) set point starts with the food-surface assembly 70 at ambient temperature, e.g., 85° F. (29° C.). The temperature of the food-surface-assembly 70 starts coming down. The food-surface-assembly temperature passes below the set point, e.g., 12° F. (−11° C.). The food-surface-assembly temperature then oscillates up and down around the set point. Thus, the temperature of the food-surface assembly 70 as a function of time resembles a dampened harmonic oscillator oscillating around the set-point temperature. The amplitude of the oscillations becomes smaller and smaller and eventually the wave dampens itself out.

The idle/standby, ice cream cycle/making, and defrost states/modes were described above. The other states are conventional states used in controlling food preparation machines.

With reference to FIG. 54, many of the elements of the primary refrigeration system are conventional. The following is a list of parts and associated manufacturers and suppliers for one embodiment of the primary refrigeration system.

| Item | Description | Manufacturer | Part number | Supplied By | DCI Part # | Lydall Part # |
|---|---|---|---|---|---|---|
| 326, 302 & 304 | Condensing Unit | Tecumseh | AWA2464ZXDXC | DCI | 61872 | |
| 308 | Filter drier | Sporlan | C-083-S | Lydall | 61872 | 9476 |
| 329 | Sight glass | Sporlan | SA13S | Lydall | 68119 | 2546 |
| 312 | TX valve | Emerson Flow Control | ESVB-1 24 | DCI | 61873 | |
| | Connector, stepper, 4 wire for TX | Alco | 62093 | DCI | 61874 | |
| 322 | Hot-gas valve | Sporlan | SEI 11 3X4 ODF-10-S | Lydall | 72525 | 13072 |
| 324 | Suction accumulator | Refrigeration Research | HX 3738 | Lydall | 72529 | 32660 |
| 326 | Thermistor Adapter 7/8 | Parker | 040935-04 | DCI | 72539 | |
| | Thermistor | Parker | 040930-150 | DCI | 72537 | |
| 310 | Solenoid valve 1-Defrost | Sporlan | E5S130 | Lydall | | 33101 |
| | Solenoid coil | Sporlan | MKC1-208-240/50-60 | DCI | 74169 | |
| 331 | 5/8 Ball valve refrigeration grade | Various | | Lydall | 72890 | 6095 |
| 333 | 7/8 Ball valve refrigeration grade | Various | A17264 | Lydall | 74004 | 6096 |
| 314A | 5/8 Tube fittings (2) | Parker | 12-10L0HB3-S | DCI | 72639 | |
| | Liquid hose | Parker | 73499 | DCI | 73499 | |
| 314B | 5/8 Tube fittings (2) | Parker | 12-10L0HB3-S | DCI | 72639 | |
| | Suction hose | Parker | 73501 | DCI | 73501 | |
| 321 | Suction line mixing line 7/8 | Lydall | 32722 | Lydall | 74013 | 32722 |
| 323 | Suction riser 7/8 | Lydall | 32724 | Lydall | 74012 | 32724 |
| 335 | Suction line 7/8 | Lydall | 32723 | Lydall | 74009 | 32723 |
| 320 | Pressure transducer | MSI | MSP-300-250-P-4-N-1 | DCI | 73021 | |
| 327 | Solenoid valve 2-Hot gas | Sporlan | B6S1 1/2ODFx5/8ODM | Lydall | | 33102 |
| 311 | Solenoid valve 3-Liquid | Sporlan | E5S130 | Lydall | | 33101 |
| 337 | Pressure switch | Emerson Flow Control | PS1-X5K | Lydall | | 5704 |
| | Refrigerant R404a | | | Lydall | 74016 | 28124 |

DCI is DCI Automation, Inc. of Worcester, Mass. Lydall is Lydall, Inc. of Manchester, Conn. Tecumseh is Tecumseh Products Company of Tecumseh, Mich. Sporlan is Sporlan Valve Company of Washington, Mo. Parker is the climate and industrial controls group of Parker Hannifin Corporation located in Broadview, Ill. Emerson Flow Control is the flow controls division of Emerson Climate Technologies of St. Louis, Mo. Refrigeration Research is Refrigeration Research, Inc. of Brighton, Mich.

Timing Diagrams

Having provided an overview of the structure and operation of the unit 200, shown in FIG. 1, and having described the structure and operation of the components that make up that unit, a description of the timing diagrams provided in FIG. 55 for various system sequences is now provided. Each of the timing diagrams lists the following items (and operational state) on the vertical (y) axis: $1^{st}$ cover hold-down (up/down); $2^{nd}$ cover hold-down (up/down); packing plate engagement (up/down); packing plate position (delivery/forming/home); pinion engagement (up/down); horizontal pinion drive (forward/back/home); vertical forming piston (up/neutral/down); cup lift (up/neutral/down); leveling squeegee cleaning (up/down); leveling squeegee downforce (up/down); base pump (running/stopped); aeration (on/off); flavor pump (running/stopped); flavor purge (on/off); and mix-in motor (running/stopped). The horizontal (x) axis denotes time. Thus, the timing diagrams indicate the time of state transitions during various system activities for the items listed on the vertical axis.

The labels, "cover hold-down #1," "cover hold-down #2," "packing plate engagement," "packing plate position," "pinion engagement," "horizontal pinion drive," "vertical forming piston," "cup lift," "leveling squeegee cleaning," and "leveling squeegee downforce," refer to the up/down or engagement state of the pistons shown in FIGS. 37-40 and 42-47. The main controller, via the process sub-controller, controls the pump bank and piston assembly motors to achieve the desired states. Similarly, the labels, "base pump," "aeration," "flavor pump," "flavor purge," and "mix-in motor," respectively refer to the on/off or running/stopped states of the base pump, the food grade portion of the pneumatic module, the flavor pump, the flavor purge portion of the pneumatic module, and the mix-ins motor. The main controller either directly and/or via various component sub-controllers controls the states of these components.

With reference to FIG. 55, one embodiment of a sequence for serving food product, e.g., ice cream, starts in the following state: cover hold-down #1 (down); cover hold-down #2 (down); packing plate engagement (down); packing plate position (forming); pinion engagement (down); horizontal pinion drive (back); vertical forming piston (up); cup lift (down); leveling squeegee cleaning (up); leveling squeegee downforce (up); base pump (stopped); aeration (off); flavor pump (stopped); flavor purge (off); and mix-in motor (stopped). A variety of conventional sensors determine that the food service machine proceeds through the following process prior to initiating the serving sequence: delivery door interlock (disengaged); delivery door sensor (open); user installs cup; cup sensor (yes); delivery door sensor (closed); deliver door interlock (engage); and start freeze surface rotation.

The illustrated serving sequence is the following, each numbered step occurring later in time than the prior numbered step: 1) at time TS2 the leveling squeegee moves down; 2) the base pump starts running, and the aeration is turned on; 3) the flavor pump starts running (at this point, the mixing conduit is spraying a mixed, aerated composition (typically flavored mix onto the rotating freeze surface); 4) the mix-in motor starts running (causing the mix-ins module 16 to deposit selected mix-ins onto the leveled food product sitting on the rotating freeze surface); 5) the base pump stops; 6) the flavor pump stops, and the flavor purge is turned on; 7) the flavor purge ends, and the aeration ends; 8) the mix-in motor stops; 9) the leveling squeegee downforce piston disengages (moves up); 10) the leveling squeegee cleaning piston moves down to cause cleaning of the squeegee; 11) the leveling squeegee cleaning piston moves up, the cup lift moves up, and the freeze surface stops rotating (the food product is now accumulated as a ridge row on the scraper of the food zone cover); 12) the horizontal pinion drive moves to the forward position (pushing the food product into the forming cylinder); 13) the vertical forming piston moves down (to pack the food product); 14) the vertical forming piston moves to a neutral position; 15) the packing plate position moves from forming to delivery; 16) the product deposits into a cup; 17) the cup lift moves from up to neutral position; 18) the packing plate position moves from delivery to forming; and 19) a variety of conventional sensors determine that the food service machine proceeds through the following process: (a) delivery door interlock (disengage); (b) delivery door sensor (open); (c) the user removes the cup; (d) cup sensor (clear/no cup); (e) delivery door sensor (close); and (f) delivery door interlock (engaged). The serving sequence completes with the following steps: 20) the packing plate position moves from forming to home and then to delivery to achieve a wiping action and the vertical forming piston moves from down to up; 21) the horizontal pinion drive moves from forward to home and then, after a period, to back position; 22) the vertical forming piston moves from up to down and then, after a period, to up position again; 23) finally, the packing plate position moves from delivery to forming.

Having thus described at least one illustrative embodiment of the invention, various alterations, modifications and improvements are contemplated by the invention. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. Apparatus for producing a food product, the apparatus comprising:
a frame;
a base-mix module coupled to the frame and operative to provide a base mix;
a flavor module coupled to the frame and operative to provide flavoring;
a flavor-selection assembly coupled to the frame and having an outlet and a plurality of flavoring inlets, each inlet operative to receive a flavoring, the flavor selection assembly operative to allow passage of a flavoring from an inlet to the outlet;
a conduit assembly having a proximal end including a first opening coupled to the base-mix module and a second opening for receiving air, the conduit assembly having a distal end coupled to the outlet of the flavor-selection assembly, the conduit assembly operative to combine base mix, air and flavoring to produce a flavored aerated mix;
a food-preparation assembly coupled to the frame and configured to receive the flavored, aerated mix from the distal end of the conduit assembly and to prepare food from the flavored aerated mix; and an apparatus controller in communication with each of a plurality of sub-controllers and operative to provide instructions to the sub-controllers so in order to operate the apparatus.

2. The apparatus of claim 1, wherein the base-mix module comprises:
a base-mix holding bay suited for holding a base-mix container;
a pump coupled to the conduit assembly; and
a source of compressed air coupled to the conduit assembly, the source of compressed air having an air-control valve operative to control the amount of air provided to the conduit assembly;
wherein the plurality of sub-controllers includes a base-mix-module sub-controller coupled to the pump and operative to control the pump and the air-control valve so that when base mix is loaded into the base-mix holding bay the base-mix-module sub-controller controls the amount of base mix and the amount of air injected into the conduit assembly.

3. The apparatus of claim 1, wherein the flavor module comprises:
a plurality of flavor-packet holding bays operative to hold flavor packets;
a plurality of positive-displacement pumps coupled to the plurality of holding bays and operative to receive flavoring from flavor packets held in the holding bays;
plurality of electrical solenoids coupled to a slidable support plate, each solenoid operative to engage with an associated displacement pump to cause the displacement pump to dispense flavoring; and
a linear-drive motor, the linear drive coupled to the slidable support plate;
wherein the plurality of sub-controllers includes a flavor-module sub-controller in communication with each of the solenoids and with the linear-drive motor, the sub-controller being operative to control each of the solenoids and the linear-drive motor so as to select and energize a solenoid and to operate the linear-drive motor to drive the slidable support plate moving the solenoids relative to the displacement pumps such that the energized solenoid causes an associated displacement pump to dispense flavoring.

4. The apparatus of claim 1, further comprising a mix-ins/dried-goods module comprising:
a plurality of mix-in assemblies, each assembly comprising:
  a) an auger block defining:
    i) a storage container orifice configured to receive a mix-in storage container;
    ii) an auger passage connected to the container orifice; and
    iii) a dispensing orifice connected to the auger passage; and
  b) an auger configured to sit in the auger passage of the auger block, the auger having an engagable end;
a plurality of drive assemblies coupled to the engagable ends of the augers and operative to drive the augers;
a trough assembly having a collection slot and a dispensing opening, the collection slot being coupled to the dispensing orifices of the plurality of mix-in assemblies, the trough assembly operative to receive mix-ins from the mix-in assemblies and to dispense the mix-ins;
wherein the plurality of sub-controllers includes a mix-ins-module sub-controller in communication with each of the drive assemblies, the sub-controller operative to control the drive assemblies so that, when mix-ins containers are loaded into the mix-ins module, the sub-controller drives the engagable ends to turn the augers to dispense mix-ins.

5. The apparatus of claim 1, further comprising a food-zone apparatus comprising:
a food-surface assembly having a flat surface mounted for rotation about an axis;
a cover positioned to substantially enclose at least a portion of the flat rotary surface to create a food zone;
a final mixing conduit interface coupled to the cover and configured to receive base mix from the base-mix module and flavoring from the flavor module via a final mixing conduit and to deposit the mix on the flat surface while the flat surface is rotating;
a scraper coupled to the cover and supported above the flat surface, the scraper having a working edge positionable to engage the rotary surface while said rotary surface is rotating so as to be able to scrape the deposited mix into a ridge row on the rotary;
a level coupled to the cover and spaced above the rotary surface to establish a gap, the level being positioned ahead of the scraper so as to be able to level the mix to a specified height on the rotary surface while the rotary surface is rotating.

6. The apparatus of claim 5, further comprising
a rack and pinion structure coupled to the cover, the rack and pinion structure having a rack and pinion;
a plow coupled to the rack and pinion structure and operative to scrape the ridge row from the rotary surface as food product;
a forming cylinder coupled to the cover and operative to receive the food product from the plow;
a diaphragm resting inside the forming cylinder operative to form the food product into a scoop;
a packing/cleaning plate rotatably coupled to the food cover via a packing plate shaft, the packing plate positioned under the forming cylinder to provide a food product packing surface and to clean the forming cylinder between cleanings;
a level pneumatic piston interface coupled to the level and operative to interface with at least one pneumatic piston to allow control of the level;
a pinion pneumatic piston interface coupled to the cover and to the pinion drive and operative to interface with a pneumatic piston, the piston rotated by a motor to cause rotation of the pinion;
a diaphragm pneumatic piston interface coupled to the diaphragm and operative to interface with a pneumatic piston to allow control of the diaphragm to form the food product;
a packing plate pneumatic piston interface coupled to packing plate shaft and operative to interface with a pneumatic piston, the piston rotated by a motor to allow positioning of the packing plate; and
a plurality of features in the cover operative to interface with pneumatic pistons to hold the cover against the rotating surface.

7. The apparatus of claim 5, further comprising a process box including:
an electrically operated pneumatic solenoid bank having an air input and a plurality of air outputs;
a plurality of pneumatically driven piston assemblies, each assembly having a piston coupled to a pneumatic cylinder, each pneumatic cylinder coupled to an air output of the solenoid bank, the solenoid bank operative to control air pressure in each pneumatic cylinder, each piston configured to interact with an associated piston interface on a food zone cover; and an air compressor coupled to the air input of the solenoid bank and operative to provide compressed air to the air input of the solenoid bank so that the solenoid bank can manage operation of the piston assemblies to control interaction of the pistons with associated piston interfaces on the cover.

8. The apparatus of claim 5, wherein the food-surface assembly has a central axis and a periphery, and wherein the food-surface assembly comprises:
a) an upper freeze plate of which the flat surface is one face, the freeze plate also having a second face, the flat surface forming a non-stick rotary freezing surface that can readily releases food products at low temperatures, the second face defining a portion of a refrigerant channel operative to pass refrigerant;
b) a gasket configured to couple to the second face of the freeze plate and operative to contain the refrigerant within the refrigerant channel;
c) a lower freeze plate configured to couple to the upper freeze plate and having a first face and a second face, the first face operative to seal the refrigerant channel leaving the refrigerant channel with an entrance orifice and an exit orifice; and
d) an insulation plate configured to couple to the lower freeze plate and operative to provide insulation to the food-surface assembly;

and wherein the apparatus further comprises:
a) a drive shaft coupled to the food-surface assembly; and
b) a drive motor coupled to the drive shaft and operative to rotate the drive shaft causing rotation of the rotary surface about the central axis;

and wherein the plurality of sub-controllers includes a sub-controller coupled to the drive motor and operative to control the drive motor to control the rate of rotation of the food-surface assembly.

9. The apparatus of claim 5, further comprising a refrigeration system, wherein the flat surface is a freeze surface and the food-surface assembly includes an inlet and an outlet coupled with the refrigeration system, the refrigeration system including:

a compressor having an inlet and an outlet, the outlet providing compressed refrigerant;

a compressor discharge line attached to the compressor outlet;

a condenser having an inlet coupled to the discharge line;

a liquid-gas separator having first and second inlets and first and second outlets, the first inlet configured to receive liquid refrigerant from the condenser, the first outlet coupled to the inlet of the compressor;

a liquid stepper having an inlet and an outlet, the inlet coupled to the second outlet of the liquid-gas separator and the outlet coupled to the inlet of the food-surface assembly;

a food-surface-assembly discharge line attached to the food-surface-assembly outlet and to the second inlet of the liquid-gas separator;

a pressure sensor coupled to the food-surface-assembly discharge line and operative to provide a pressure signal representative of the pressure in the food-surface-assembly discharge line;

a thermistor coupled to the food-surf ace-assembly discharge line and operative to provide a temperature signal representative of the thermistor's temperature; and a hot-gas stepper valve coupled to the food-surface-assembly discharge line and to the compressor discharge line;

wherein the plurality of sub-controllers includes a refrigeration-system sub-controller in communication with the liquid stepper, the pressure transducer, the thermistor, and the hot-gas stepper valve, the refrigeration-system sub-controller being operative to receive a pressure signal from the pressure sensor and a temperature signal from the thermistor and to control at least one of the liquid stepper and the hot-gas stepper valve.

10. The apparatus of claim 1, wherein the apparatus further includes a detector for reading a product-indicator label, and wherein at least one of the apparatus controller and the sub-controllers includes a processor coupled with a computer-readable storage medium storing software code that provides instructions for identifying a base mix or a flavoring based on a reading of the product-indicator label and for controlling operation of the apparatus based on the identification.

11. The apparatus of claim 10, wherein the apparatus further comprises:

a display screen, wherein at least one of the apparatus controller and the sub-controllers includes a processor coupled with a computer-readable storage medium storing software code that provides instructions as to which options to display for available base mixes and flavorings on the display screen; and an input mechanism that a user can operate to select from the options that are displayed on the display screen.

12. The apparatus of claim 11, wherein the computer-readable storage medium further stores software code that determines which options are to be displayed based on the readings of a plurality of product-label indicators on containers for base mixes or flavorings.

13. The apparatus of claim 12, wherein the software code includes instructions that will cause an option to be removed from the display screen if the remaining supply of a base mix or flavoring is determined to be below a minimum threshold.

14. The apparatus of claim 13, further comprising a detector for detecting whether the remaining supply of one or more base mixes or flavorings is below a minimum threshold.

15. The apparatus of claim 12, wherein the software code includes instructions for removing an option from the display screen when a base mix or a flavoring in the apparatus fails to meet a freshness criterion based on a reading of the product-indicator label.

16. The apparatus of claim 15, wherein the software code instructions for determining whether a base mix or flavoring meets the freshness criterion based on a manufactured-on date or an expiration date incorporated into the product-indicator label.

17. The apparatus of claim 15, wherein the software code includes instructions for determining whether a base mix or flavoring meets the freshness criterion by tracking the time since the product-indicator label was first detected.

18. The apparatus of claim 12, wherein the software code includes instructions for recognizing when a plurality of product-indicator labels refer to the same base mix or flavoring and for displaying a single option for that base mix or flavoring on the display screen.

19. The apparatus of claim 18, where the software code includes instructions for comparing the freshness of the base mix or flavoring associated with each of the identical product indicator labels and dispensing from the base mix or flavoring that is nearest its expiration.

20. The apparatus of claim 10, wherein the computer-readable storage medium also stores a database including data used in formulating processing instructions associated with information found in the product-indicator labels.

21. The apparatus of claim 10, wherein the computer-readable storage medium also stores software code for halting operation of the apparatus upon detection of an event or absence of an event.

22. The apparatus of claim 21, wherein the event is unauthorized physical or electronic tampering with the apparatus.

23. The apparatus of claim 22, wherein the event is removal of apparatus components for cleaning within a specified time period.

24. The apparatus of claim 10, wherein the computer-readable storage medium also stores software code for generating an advertisement for a product or service on the display screen while the apparatus is producing the food product.

25. The apparatus of claim 10, wherein the computer-readable storage medium also stores software code for generating trivia relating to the food product on the display screen while the apparatus is producing the food product.

26. An automated method for producing a food product, the method comprising:
    providing a vending machine in a facility, the vending machine including:
        a display screen;
        a base-mix module including a container containing base mix;
        a flavor module including a container containing flavoring;
        a flavor-selection assembly having an outlet and a plurality of flavoring inlets, each inlet operative to receive a flavoring, the flavor-selection assembly operative to allow passage of a flavoring from an inlet to the outlet;
        a food-preparation assembly configured to receive the flavored, aerated mix from the distal end of the conduit assembly and to prepare food from the flavored aerated mix;
        an apparatus controller in communication with each of the plurality of sub-controllers and operative to provide instructions to each of the sub-controllers in order to operate the apparatus; and
        an input mechanism that a user can operate to select from base-mix and flavoring options that are displayed on the display screen;
    presenting selectable options for ice-cream ingredients on the display screen and enabling a user to operate the input mechanism to select desired options;
    in response to selected options for the base mix and flavoring from the user, producing ice cream having ingredients corresponding to the selected options;
    issuing local instructions for operating the base-mix module, the flavor module, the flavor-selection assembly, and the food-preparation assembly from the sub-controllers; and
    governing the sub-controllers using the apparatus controller.

27. The method of claim 26, further comprising automatically communicating information between the vending machine and a remote controller apart from the facility in which the vending machine is provided.

28. The method of claim 27, further comprising automatically detecting errors in the operation of the vending machine and communicating information about detected errors to the remote controller and trouble-shooting the errors using the remote controller and sending instruction from the remote controller back to the vending machine to a) stop production of the food product and generate a signal requesting on-site service, b) ignoring the error and continuing production of the food product, or c) performing a repair function inside the vending machine and then resuming production of the food product.

29. The method of claim 27, further comprising generating new instructions for operating the vending machine to produce a new or modified food product and downloading those instructions from the remote controller to the vending machine.

30. The method of claim 26, further comprising testing the base-mix module, the flavor module, the flavor-selection assembly, and the food-preparation assembly using the sub-controllers before assembly inside the vending machine.

* * * * *